US010289990B2

(12) United States Patent
Rizzolo et al.

(10) Patent No.: US 10,289,990 B2
(45) Date of Patent: May 14, 2019

(54) STORE SHELF IMAGING SYSTEM AND METHOD

(71) Applicant: Conduent Business Services, LLC, Dallas, TX (US)

(72) Inventors: Charles D. Rizzolo, Fairport, NY (US); Dennis L. Venable, Marion, NY (US); Wencheng Wu, Webster, NY (US); Thomas F. Wade, Rochester, NY (US); Peter Paul, Penfield, NY (US); Ethan Shen, Toronto (CA); Lee Anne Williams, Pittsford, NY (US); Daniel S. Hann, Williamson, NY (US)

(73) Assignee: Conduent Business Services, LLC, Dallas, TX (US)

( * ) Notice: Subject to any disclaimer, the term of this patent is extended or adjusted under 35 U.S.C. 154(b) by 130 days.

(21) Appl. No.: 15/295,031

(22) Filed: Oct. 17, 2016

(65) Prior Publication Data
US 2018/0107999 A1   Apr. 19, 2018

(51) Int. Cl.
G06Q 20/20         (2012.01)
G06K 19/06         (2006.01)
(Continued)

(52) U.S. Cl.
CPC ..... G06Q 20/201 (2013.01); G06K 19/06028 (2013.01); G06Q 10/087 (2013.01); G06T 7/73 (2017.01); H04N 5/23245 (2013.01); H04N 5/247 (2013.01); H04W 4/04 (2013.01); B65G 1/0492 (2013.01); G05D 1/021 (2013.01); G06K 9/00664 (2013.01); G06T 7/74 (2017.01);
(Continued)

(58) Field of Classification Search
CPC ......... G06K 19/06028; G06K 9/00664; G06Q 10/087; G06Q 20/201; H04N 5/23245; H04N 5/247; H04W 4/04; B65G 1/0492; G05D 1/021; G06T 2207/20016; G06T 2207/30252; G06T 7/74; G06T 7/0042
See application file for complete search history.

(56) References Cited

U.S. PATENT DOCUMENTS 5,512,739 A    4/1996 Chandler et al.
6,473,122 B1  10/2002 Kanekal
(Continued)

OTHER PUBLICATIONS

U.S. Appl. No. 15/295,634, filed Oct. 17, 2016, Venable et al.
(Continued)

Primary Examiner — Mekonen T Bekele
(74) Attorney, Agent, or Firm — Fay Sharpe LLP

(57) ABSTRACT

A store profile generation system includes a mobile base and an image capture assembly mounted on the base. The assembly includes at least one image capture device for acquiring images of product display units in a retail environment. A control unit acquires the images captured by the at least one image capture device at a sequence of locations of the mobile base in the retail environment. The control unit extracts product-related data from the acquired images and generates a store profile indicating locations of products and their associated tags throughout the retail environment, based on the extracted product-related data. The store profile can be used for generating new product labels for a sale in an appropriate order for a person to match to the appropriate locations in a single pass through the store.

17 Claims, 30 Drawing Sheets

(51) Int. Cl.
| | |
|---|---|
| *H04N 5/232* | (2006.01) |
| *H04N 5/247* | (2006.01) |
| *H04W 4/04* | (2009.01) |
| *G06Q 10/08* | (2012.01) |
| *G06T 7/73* | (2017.01) |
| *B65G 1/04* | (2006.01) |
| *G05D 1/02* | (2006.01) |
| *G06K 9/00* | (2006.01) |

(52) U.S. Cl.
CPC ............... *G06T 2207/20016* (2013.01); *G06T 2207/30252* (2013.01)

(56) References Cited

U.S. PATENT DOCUMENTS

| | | | |
|---|---|---|---|
| 6,814,290 | B2 | 11/2004 | Longacre |
| 7,066,291 | B2 | 6/2006 | Martins et al. |
| 7,290,707 | B2 | 11/2007 | Sawasaki |
| 7,386,163 | B2 | 6/2008 | Sabe et al. |
| 7,574,378 | B2 | 8/2009 | Lipowitz et al. |
| 7,693,757 | B2 | 4/2010 | Zimmerman |
| 8,189,855 | B2 | 5/2012 | Opalach et al. |
| 8,296,259 | B1 | 10/2012 | Trandal et al. |
| 8,326,069 | B2 | 12/2012 | Maslov et al. |
| 8,429,004 | B2 | 4/2013 | Hamilton et al. |
| 9,015,072 | B2 * | 4/2015 | Wu ............... G06Q 10/087 705/28 |
| 9,623,561 | B2 * | 4/2017 | Stephens, Jr. .......... B25J 9/1689 |
| 2002/0141640 | A1 | 10/2002 | Kraft |
| 2002/0165790 | A1 | 11/2002 | Bancroft et al. |
| 2002/0196979 | A1 | 12/2002 | Yen et al. |
| 2003/0154141 | A1 * | 8/2003 | Capazario ............ G06Q 10/087 705/26.1 |
| 2004/0013295 | A1 | 1/2004 | Sabe et al. |
| 2004/0233278 | A1 | 11/2004 | Prudhomme et al. |
| 2005/0063608 | A1 | 3/2005 | Clarke et al. |
| 2006/0072176 | A1 | 4/2006 | Silverstein et al. |
| 2006/0202032 | A1 | 9/2006 | Kricorissian |
| 2008/0077511 | A1 * | 3/2008 | Zimmerman .......... G06Q 10/00 705/28 |
| 2008/0306787 | A1 | 12/2008 | Hamilton et al. |
| 2009/0059270 | A1 | 3/2009 | Opalach et al. |
| 2009/0192921 | A1 * | 7/2009 | Hicks ................... G06F 3/0312 705/28 |
| 2009/0212113 | A1 | 8/2009 | Chiu et al. |
| 2009/0248198 | A1 * | 10/2009 | Siegel .................. G06Q 10/08 700/231 |
| 2010/0039513 | A1 * | 2/2010 | Glickman ............... G06K 9/00 348/143 |
| 2010/0070365 | A1 | 3/2010 | Siotia et al. |
| 2010/0171826 | A1 | 7/2010 | Hamilton et al. |
| 2011/0298939 | A1 | 12/2011 | Melikian |
| 2013/0030915 | A1 | 1/2013 | Statler et al. |
| 2013/0103608 | A1 | 4/2013 | Scipioni et al. |
| 2013/0193211 | A1 | 8/2013 | Baqai et al. |
| 2013/0229517 | A1 | 9/2013 | Kozitsky et al. |
| 2013/0300729 | A1 | 11/2013 | Grimaud |
| 2013/0342706 | A1 | 12/2013 | Hoover et al. |
| 2014/0003727 | A1 * | 1/2014 | Lortz .................. G06Q 10/087 382/218 |
| 2014/0218553 | A1 | 8/2014 | Deever |
| 2014/0304107 | A1 | 10/2014 | McAllister |
| 2014/0363625 | A1 | 12/2014 | Huang et al. |
| 2015/0046299 | A1 | 2/2015 | Yan |
| 2015/0363758 | A1 * | 12/2015 | Wu ..................... G06Q 20/201 705/20 |
| 2015/0365660 | A1 | 12/2015 | Wu et al. |
| 2015/0365669 | A1 | 12/2015 | Wu et al. |
| 2016/0110633 | A1 * | 4/2016 | Moore .................. G06K 9/78 348/207.2 |
| 2016/0119540 | A1 | 4/2016 | Wu |
| 2016/0260051 | A1 | 9/2016 | Wu et al. |
| 2017/0032311 | A1 * | 2/2017 | Rizzolo ............... G06Q 20/201 |
| 2018/0108120 | A1 * | 4/2018 | Venable ................ G01S 17/88 |

OTHER PUBLICATIONS

U.S. Appl. No. 15/295,498, filed Oct. 17, 2016, Wu et al.
U.S. Appl. No. 15/295,306, filed Oct. 17, 2016, Rizzolo et al.
U.S. Appl. No. 15/294,937, filed Oct. 17, 2016, Venable et al.
U.S. Appl. No. 14/521,996, filed Oct. 23, 2014, Wencheng Wu.
U.S. Appl. No. 14/637,830, filed Mar. 4, 2015, Wu et al.
U.S. Appl. No. 14/643,721, filed Mar. 10, 2015, Wu et al.
U.S. Appl. No. 15/066,392, filed Mar. 10, 2016, Venable et al.
Adelmann et al., "Toolkit for Bar Code Recognition and Resolving on Camera Phones—Jump-Starting the Internet of Things", Informatik Workshop on Mobile and Embedded Interactive Systems, pp. 1-7 (2006).
Bailey, "Super-Resolution of Bar Codes", Journal of Electronic Imaging, vol. 10, No. 1, pp. 213-220 (2001).
Ballard, "Generalizing the Hough Transform to Detect Arbitrary Shapes", Pattern Recognition, vol. 13, No. 2, pp. 111-122 (1981).
Bodnár et al., "Barcode Detection With Uniform Partitioning and Morphological Operations", Conf. of PhD Students in Computer Science, pp. 4-5 (2012).
Bodnár et al., "Improving Barcode Detection With Combination of Simple Detectors", Int'l Conf. on Signal Image Technology and Internet Based Systems, pp. 300-306 (2012).
Canny, "A Computational Approach to Edge Detection", IEEE Transactions on Pattern Analysis and Machine Intelligence, vol. PAMI-8, No. 6, pp. 679-698 (1986).
Ebner et al., "Development and Testing of a Color Space (IPT) With Improved Hue Uniformity", Proceedings of IS&T/SID's Sixth Color Imaging Conf., pp. 8-13 (1998).
Felzenszwalb et al., "Distance Transforms of Sampled Functions", Cornell Computing and Information Science, Tech. Rep., pp. 1-15 (2004).
Gonzalez et al., "Digital Image Processing", $3^{rd}$ Edition, Prentice Hall, pp. 1-22 (2008).
Hodges, "An Introduction to Video and Audio Measurement", Elsevier, p. 173-185 (2004).
Hunt, "The Reproduction of Colour", John Wiley & Sons, p. 48 (2004).
Jain et al., "Bar Code Localization Using Texture Analysis", Proceedings of the Second Int'l Conf. on Document Analysis and Recognition, pp. 41-44 (1993).
Joseph et al., "Bar Code Waveform Recognition Using Peak Locations", IEEE Transactions on Pattern Analysis and Machine Intelligence, vol. 16, No. 6, pp. 630-640 (1994).
Juett, "Barcode Localization Using a Bottom Hat Filter", NSF Research Experience for Undergraduates, pp. 1-26 (2005).
Katona et al., "A Novel Method for Accurate and Efficient Barcode Detection With Morphological Operations", Eighth Int'l Conf. on Signal Image Technology and Internet Based Systems, pp. 307-314 (2012).
Kiryati et al., "A Probabilistic Hough Transform", Pattern Recognition, vol. 24, No. 4, pp. 303-316 (1991).
Kuroki et al., "Bar Code Recognition System Using Image Processing", Hitachi Process Computer Engineering, Inc., pp. 568-572 (1990).
Lin et al., "Multi-Symbology and Multiple 1D/2D Barcodes Extraction Framework", Advances in Multimedia Modeling, pp. 401-410 (2011).
Lin et al., "Real-Time Automatic Recognition of Omnidirectional Multiple Barcodes and DSP Implementation", Machine Vision and Applications, vol. 22, pp. 409-419 (2011).
Liyanage, "Efficient Decoding of Blurred, Pitched, and Scratched Barcode Images", Second Int'l Conf. on Industrial and Information Systems, pp. 1-6 (2007).
McKesson, "Linearity and Gamma—Chapter 12—Dynamic Range", arcsynthesis.org, pp. 1-7 (retrieved Jul. 11, 2013).
Muniz et al., "A Robust Software Barcode Reader Using the Hough Transform", Int'l Conf. on Information Intelligence and Systems, pp. 313-319 (1999).
Normand et al., "A Two-Dimensional Bar Code Reader", $12^{th}$ Int'l Conf. on Pattern Recognition, vol. 3, pp. 201-203 (1994).

(56) References Cited

OTHER PUBLICATIONS

Ohbuchi et al., "Barcode Readers Using the Camera Device in Mobile Phones", Proceedings of the 2004 Int'l Conf. on Cyberworlds, pp. 1-6 (2004).

Oktem et al., "A Superesolution Approach for Bar Code Reading", Electrical and Engineering Department, Atilim University, Turkey, pp. 1-4 (2002).

Oktem, "Bar Code Localization in Wavelet Domain by Using Binary", Proceedings of the IEEE $12^{th}$ Signal Processing and Communications Applications Conference, pp. 499-501 (2004).

Pavlidis et al., "Fundamentals of Bar Code Information Theory", IEEE Transactions on Pattern Analysis and Machine Intelligence, vol. 16, No. 6, pp. 630-640 (1994).

Poynton, "Digital Video and HDTV: Algorithms and Interfaces" Morgan Kaufman Publishers, pp. 260 and 630 (2003).

Poynton, "Frequently Questioned Answers About Gamma", poynton.com, pp. 1-3 (2010).

Reinhard et al., "High Dynamic Range Imaging: Acquisition, Display, and Image-Based Lighting", Morgan Kaufmann Publishers, p. 82 (2010).

Tuinstra, "Reading Barcodes From Digital Imagery", Ph.D. dissertation, Cedarville University, pp. 1-18 (2006).

Wittman et al., "Super-Resolution of 1D Barcode Images", University of Minnesota, pp. 1-41 (2004).

Wu et al., "Automatic Thresholding of Gray-Level Using Multi-Stage Approach", Proceedings of the Seventh Int'l Conf. on Document Analysis and Recognition, pp. 493-497 (2003).

Youssef et al., "Automated Barcode Recognition for Smart Identification and Inspection Automation", Expert Systems with Applications, vol. 33, No. 4, pp. 968-977 (2007).

Zhang, "Flexible Camera Calibration by Viewing a Plane From Unknown Orientations", Int'l Conf. on Computer Vision, Corfu, Greece, pp. 666-673 (1999).

Husky et al., "Unmanned Ground Vehicle, Clearpath Robotics," pp. 1-2 (2013).

The Hague, Dec. 19, 2017, Extended European Search Report for EP 17 19 6200, 12 pages, dated Jan. 8, 2018.

\* cited by examiner

STORE SHELF IMAGING SYSTEM AND METHOD

CROSS REFERENCE TO RELATED PATENTS AND APPLICATIONS

U.S. patent application Ser. No. 14/303,809, filed Jun. 13, 2014, Publication No. 2015/0363758, Published Dec. 17, 2015, by Wu et al., and entitled "STORE SHELF IMAGING SYSTEM", is incorporated herein by reference in its entirety.

BACKGROUND

The exemplary embodiment relates to product location mapping and finds particular application in connection with a system and method for determining the spatial layout of product content in a product facility, such as a store or other retail environment.

Retail chains, such as pharmacy, grocery, home improvement, and others, may have a set of product facilities, such as stores, in which products are presented on product display units, such as shelves, cases, and the like. Product information is generally displayed close to the product, on pre-printed product labels. The product labels indicate the price of the item and generally include a unique identifier for the product, e.g., in the form of a barcode, which is often used by the store for restocking and other purposes. Periodically, stores place some of the items on sale, or otherwise adjust prices. This entails printing of sale item labels and/or associated signage and manual replacement of the product labels and/or addition of associated signage. The printing and posting of such sale item signage within each store often occurs at weekly intervals.

It would be advantageous to each store if the signage was printed and packed in the order in which a store employee encounters the sale products while walking down each aisle. However, retail chains generally cannot control or predict the product locations across each of their stores. This may be due to a number of factors, such as store manager discretion, local product merchandising campaigns, different store layouts, and so forth. Thus, individual stores may resort to manually pre-sorting the signage into the specific order appropriate for that store, which can be time consuming and not always accurate.

Current approaches for documenting product locations on shelves include sending one or more persons through the store taking pictures along the store aisles with a mobile device, such as a cell phone camera. Post-processing of the captured images is then used in an attempt to identify each product and its location on a shelf. This approach suffers because of significant variations, including product packaging changes, product orientation on the shelf, motion blur, lighting variations, and the like.

It would be advantageous to a chain of stores to be able to collect product location data substantially automatically across its stores. Each store could then receive signage which has been automatically packaged in an appropriate order to avoid a pre-sorting step.

INCORPORATION BY REFERENCE

U.S. Patent Publication No. 2015/0363758, Published Dec. 17, 2015, by Wu et al., and entitled "STORE SHELF IMAGING SYSTEM";

U.S. Patent Publication No. 2015/0365660, Published Dec. 17, 2015, by Wu et al., and entitled "METHOD AND SYSTEM FOR SPATIAL CHARACTERIZATION OF AN IMAGING SYSTEM";

U.S. patent application Ser. No. 14/521,996, filed Oct. 23, 2014, by Wencheng Wu, and entitled "MODEL-BASED PLANE-LIKE PANORAMA AND RETAIL APPLICATIONS";

U.S. Patent Publication No. 2014/0363625, Published Dec. 17, 2015, by Wu et al., and entitled "IMAGE PROCESSING METHODS AND SYSTEMS FOR BARCODE AND/OR PRODUCT LABEL RECOGNITION";

U.S. Patent Publication No. 2016/0110633, published Apr. 21, 2016, by Moore et al., and entitled "ON-DEMAND SHELF SIGNAGE PRINTING";

U.S. patent application Ser. No. 14/643,721, filed Mar. 10, 2015, by Wu et al., and entitled "PRINTED TAG INFORMATION RECOGNITION USING MULTI-POSE ILLUMINATION TO MITIGATE GLARE";

U.S. patent application Ser. No. 14/637,830, filed Mar. 4, 2015, by Wu et al., and entitled "SYSTEM AND METHOD FOR RETAIL STORE PROMOTIONAL PRICE TAG DETECTION AND MAINTENANCE VIA HEURISTIC CLASSIFIERS";

U.S. patent application Ser. No. 15/066,507, filed Mar. 10, 2016, by Wu et al., and entitled "HIGH ACCURACY LOCALIZATION SYSTEM AND METHOD FOR RETAIL STORE PROFILING VIA PRODUCT IMAGE RECOGNITION AND ITS CORRESPONDING DIMENSION DATABASE";

U.S. patent application Ser. No. 15/066,392, filed Mar. 10, 2016, by Venable et al., and entitled "SYSTEMS AND METHODS FOR ROBOT MOTION CONTROL AND IMPROVED POSITIONAL ACCURACY";

U.S. patent application Ser. No. 15/294,937, filed Oct. 17, 2016, by Venable et al., and entitled "STORE SHELF IMAGING SYSTEM AND METHOD";

U.S. patent application Ser. No. 15/295,498, filed Oct. 17, 2016, by Wu et al., and entitled "SYSTEM AND METHOD FOR RETAIL STORE PROMOTIONAL PRICE TAG DETECTION";

U.S. patent application Ser. No. 15/295,306, filed Oct. 17, 2016, by Rizzolo et al., and entitled "STORE SHELF IMAGING SYSTEM AND METHOD";

U.S. patent application Ser. No. 15/295,634, filed Oct. 17, 2016, by Venable et al., and entitled "STORE SHELF IMAGING SYSTEM AND METHOD USING A VERTICAL LIDAR"; and U.S. Pat. No. 8,429,004, by Hamilton et al., issued Apr. 23, 2013, and entitled "METHOD AND SYSTEM FOR AUTOMATICALLY MEASURING RETAIL STORE DISPLAY COMPLIANCE", are incorporated herein by reference in their entirety.

BRIEF DESCRIPTION

In one embodiment of this disclosure, described is a store profile generation system comprising a mobile base including an operatively associated primary navigation component configured to determine a location of the mobile base within a retail environment, the retail environment including a plurality of product display units arranged in a plurality of aisles, each product display unit including a plurality of product display fixtures, a plurality of products arranged on one or more of the product display fixtures, and a plurality of tags attached to the product display fixtures, each tag including product-related data including a barcode associated with a respective product proximately located on the product display fixture near the tag; a high resolution (HR) image capture assembly mounted on the mobile base, the image capture assembly including a plurality of high resolution (HR) image capture devices configured at a first resolution and a first field of view (FOV) to acquire HR images of the product display units; a low resolution (LR) image capture device configured at a second resolution and a second FOV to acquire LR images of the product display units, the second resolution less than the first resolution associated with the HR image capture devices and the second FOV horizontally wider and vertically higher than the first FOV associated with the HR image capture devices; and a master control unit operatively associated with the mobile base, the plurality of HR image capture devices; and the LR image capture device, the master control unit including an operatively associated memory configured to store instructions and an operatively associated processer configured to execute the instructions, the master control unit instructions configured to process the acquired HR images from the plurality of HR image capture devices and the acquired LR images from the LR image capture device at one or more sequential locations of the mobile base along one or more of the plurality of aisles, the process using the acquired HR images to identify the barcodes associated with the plurality of tags and generate a store profile indicating locations of the plurality of tags and their respective products in the retail environment, and the process using the acquired LR image to generate a full planogram image of the product display units, the full planogram image including a display facing profile indicating the presence or non-presence of the plurality of products and their respective locations in the retail environment.

In another embodiment of this disclosure, described is a store profile generation system comprising a mobile base including an operatively associated primary navigation component configured to determine a location of the mobile base within a retail environment, the retail environment including a plurality of product display units arranged in a plurality of aisles, each product display unit including a plurality of product display fixtures, a plurality of products arranged on the product display fixtures and a plurality of tags attached to the product display fixtures, each tag including product related data including a barcode associated with a respective product proximately located on the product display fixture near the tag; an image capture assembly mounted on the mobile base, the image capture assembly including a plurality of image capture devices vertically arranged to acquire images of the product display fixture and cover an entire vertical height of the product display fixture; a plurality of distributed controllers, each of the distributed controllers operatively associated with one of the plurality of image capture devices and operatively associated with the master control unit, the distributed controllers configured to operate in parallel and independently drive a respective image capture device, store acquired images of the product display units, and communicate the stored acquired images of the product display units to the master control unit; a secondary navigation component, the secondary navigation component configured to perform image-based accuracy corrections of a location of the mobile base along an aisle of the retail environment reported by the primary navigation component operatively associated with the mobile base, the image-based accuracy corrections including processing sequentially acquired images of a product display unit which includes an overlapping portion and a non-overlapping portion, and determining a shift distance associated with aligning the overlapping portions of the two sequentially acquired images, the shift distance applied to the mobile base location reported by the primary navigation component operatively associated with the mobile base to generate a corrected location of the mobile base.

In still another embodiment of this disclosure, described is a store profile generation system comprising a mobile base including an operatively associated primary navigation component configured to determine a location of the mobile base within a retail environment, the retail environment including a plurality of product display units arranged in a plurality of aisles, each product display unit including a plurality of product display fixtures, a plurality of products arranged on one or more of the product display fixtures, and a plurality of tags attached to the product display fixtures, each tag including product related data including a barcode associated with a respective product proximately located on the product display fixture near the tag; a high resolution (HR) image capture assembly mounted on the mobile base, the image capture assembly including a plurality of high resolution (HR) image capture devices configured at a first resolution and a first field of view (FOV) to acquire HR images at the product display units; a low resolution (LR) image capture device configured at a second resolution and a second FOV to acquire LR images of the product display units, the second resolution less than the first resolution associated with the HR image capture devices and the second FOV horizontally wider and vertically higher than the first FOV associated with the HR image capture devices; and a master control unit operatively associated with the mobile base, the plurality of HR image capture devices; and the LR image capture device, the master control unit including an operatively associated memory configured to store instructions and an operatively associated processer configured to execute the instructions, the master control unit instructions configured to process the acquired HR images from the plurality of HR image capture devices and the acquired LR image from the LR image capture device at one or more sequential locations of the mobile base along one or more of the plurality of aisles, the process using the acquired HR images to identify the barcodes associated with the plurality of tags and generate a store profile indicating locations of the plurality of tags and their respective products in the retail environment, and the process using the acquired LR image to generate a full planogram image of the product display units, the full planogram image including a display facing profile indicating the presence or non-presence of the plurality of products and their respective locations in the retail environment, wherein the product display fixtures includes one or more of shelving and pegboards, wherein the image-based accuracy correction includes processing two sequentially acquired images of a product display unit which include an overlapping portion and a non-overlapping portion, and determining a shift distance associated with aligning the overlapping portions of the two sequentially acquired images, the shift distance applied to the location of the mobile base reported by the navigation component operatively associated with the mobile base to generate a corrected location of the mobile base, and wherein the image-based accuracy correction performs one or more of a cross correlation function between the two sequentially acquired images and a Harris Corners Detector function to identify a most frequent shift distance associated with the two sequentially acquired images.

DETAILED DESCRIPTION

Applications of the store shelf imaging systems described herein include automated, shelf-level retail prescriptive analytic services which utilizes a mobile image capture system to capture and store images of the display areas tagged with location information, analyze the images with location data and return the detailed store spatial layout and classification of (1) regular shelf signage (e.g., regular price labels with barcodes), (2) promotional shelf signage, and (3) products at the shelf display facings. This output can be used on its own for generating detailed views of current store product and signage layout, identifying misplaced or out of stock products or printing signage updates in store-walk order. This output can also be used in comparison with retailer standards or plan reference information to generate views of display conformance to aid in tracking and improving retailer operations.

With reference to FIGS. 1-5, where the same numbers are used for similar elements, a mobile profile generation system 10 is configured for determining a spatial layout 12 (FIG. 5) of the product content of a product facility, such as a retail store, warehouse, or the like. The spatial layout may be referred to herein as a store profile. The store profile 12 may be in the form of a 2-dimensional or 3-dimensional plan of the store which indicates the locations of products, for example, by providing product data for each product, such as an SKU or barcode, and an associated location, such as x,y coordinates (where x is generally a direction parallel to an aisle and y is orthogonal to it), a position on an aisle, or a position on a predefined path, such as a walking path through the store. In some embodiments, the store profile may include a photographic panorama of a part of the store generated from a set of captured images, or a graphical representation generated therefrom.

Figure 1:
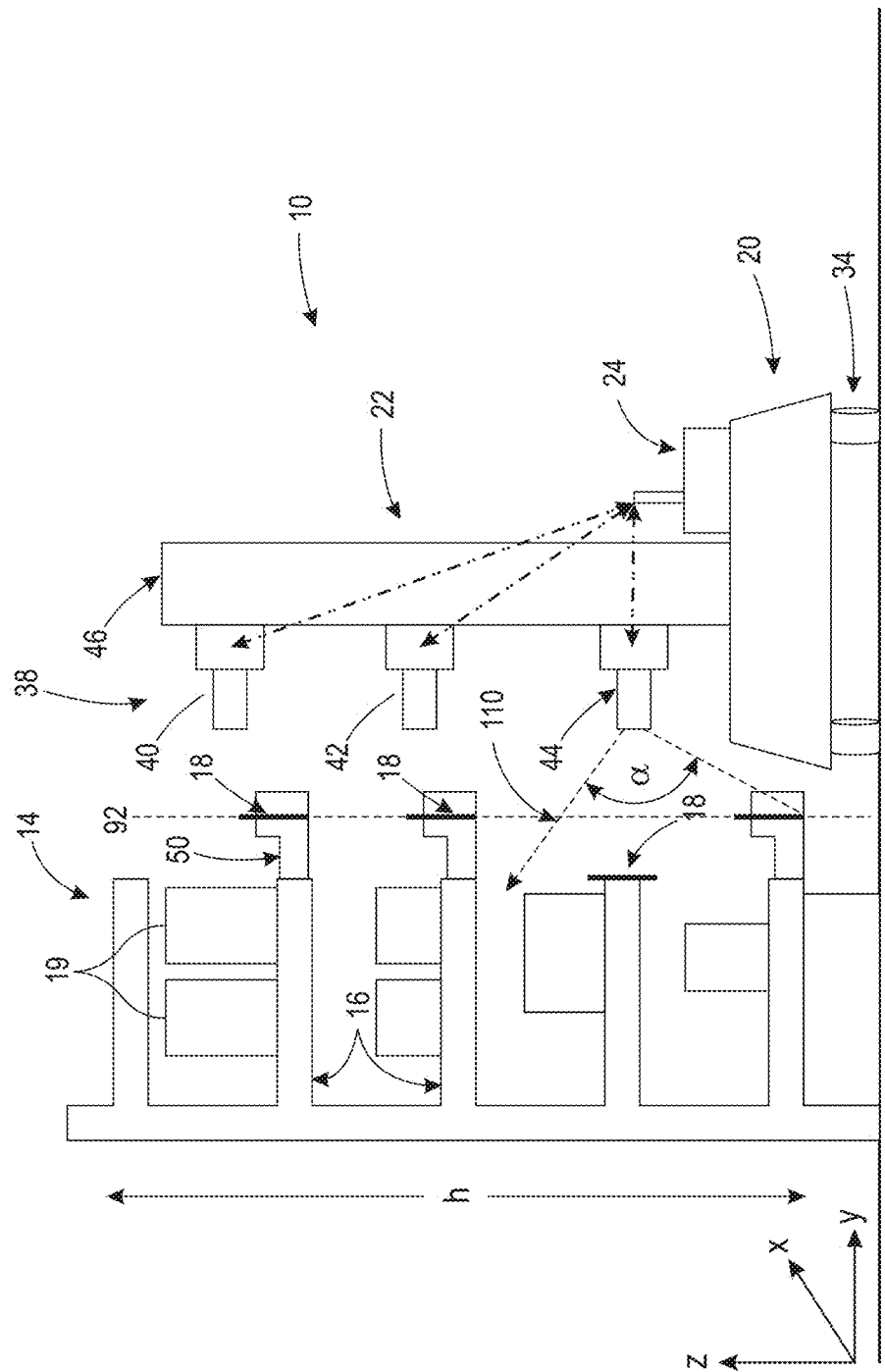
FIG. 1 is a schematic elevational view of a store profile generation system in accordance with one aspect of the exemplary embodiment.

The store profile 12 is generated by capturing images of product display units 14, such as store shelf units, at appropriate locations with appropriate imaging resolutions. As illustrated in FIG. 1, each shelf unit 14 may include two or more vertically-spaced shelves 16, to which product labels 18, such as product price tags, displaying product-related information, are mounted, adjacent related products 19. In the exemplary embodiments, the price labels are not on the products themselves, but on the shelf units, e.g., in determined locations. Thus, for example, a portion of a shelf which is allocated to a given product may provide for one (or more) price labels to be displayed for that product. In other embodiments the product labels 18 may be displayed on an adjacent pegboard or be otherwise associated with the respective display unit 14.

The exemplary profile generation system 10 includes a mobile base 20, an image capture assembly 22, and a control unit 24, which are moveable as a unit around the product facility. The exemplary system 10 captures images within a product facility, such as a retail store, with the image capture assembly 22 at a sequence of locations of the mobile base 20, extracts product-related data 26 (e.g., printed barcodes and/or text from the captured product price labels) and location information from the images and the mobile base location, and constructs a store profile 12 (e.g., a 2D map, as discussed above) which defines a spatial layout of locations of the shelf labels 18 within the store.

Figure 5:
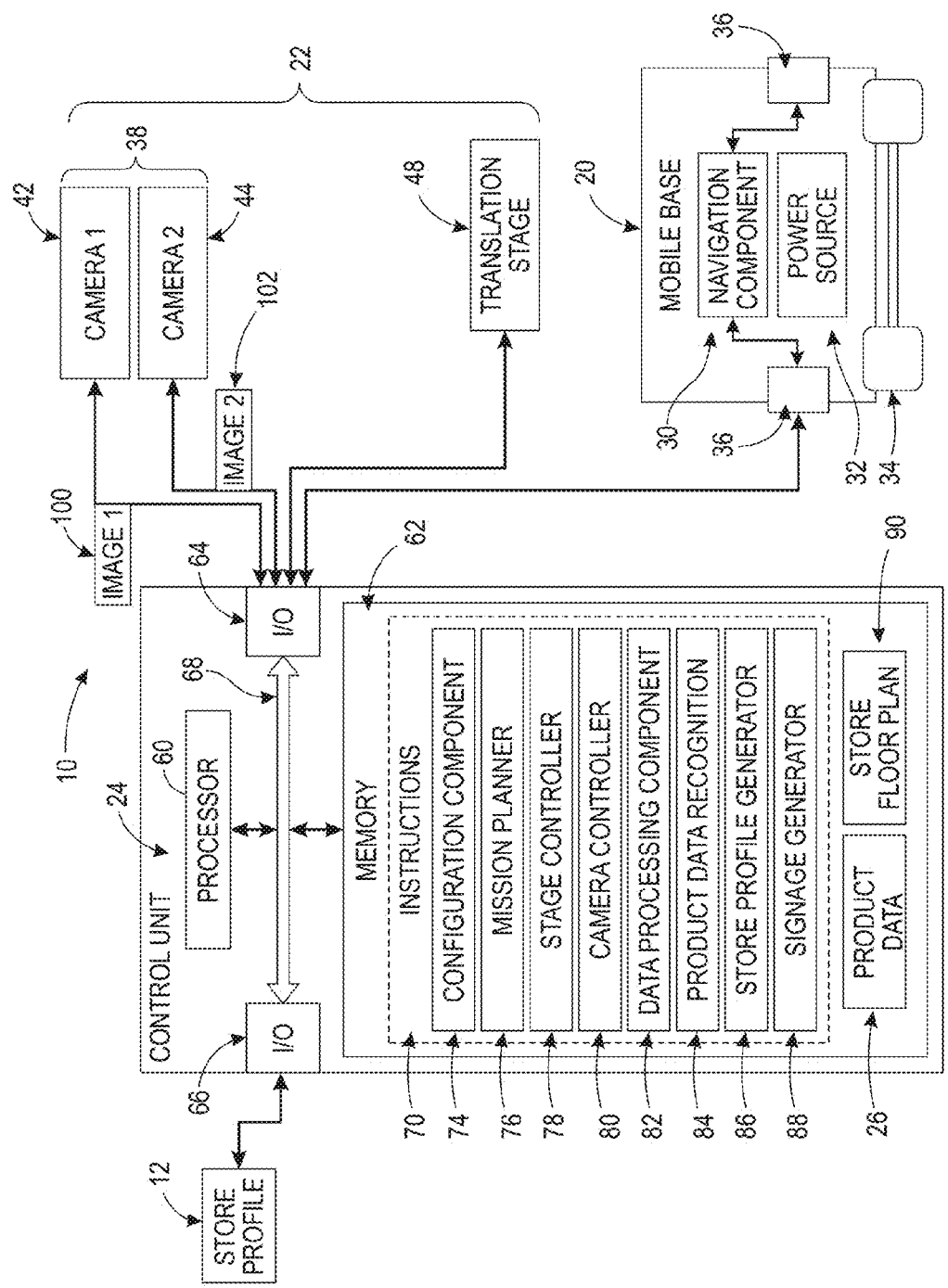
FIG. 5 is a functional block diagram of the store profile generation system of FIGS. 1-4 in accordance with one aspect of the exemplary embodiment.

The mobile base 20 serves to transport the image capture assembly 22 around the product facility and may be fully-autonomous or semi-autonomous. In one embodiment, the mobile base 20 is responsible for navigating the system 10 to a desired location with a desired facing (orientation), as requested by the control unit 24, and reporting back the actual location and facing, if there is any deviation from the request. As illustrated in FIG. 5, in a fully-autonomous mode, the motorized mobile base 20 may include a navigation component 30 and an associated power source 32, such as a battery, motor, drive train, etc., to drive wheels 34 of the of the mobile base in order to move the system 10 to a desired location with desired facing according to a request from the control unit 24. The navigation component 30 may be similarly configured to the control unit 24 and may include memory and a processor for implementing the instructions provided by the control unit and reporting location and orientation information back to the control unit. Position and/or motion sensors 36 provide the navigation component 30 with sensing capability to confirm and/or measure any deviation from the requested location and orientation. These may be used by the navigation component for identifying the location, orientation, and movement of the mobile base for navigation and for store profile generation by the control unit. One suitable mobile base which can be adapted to use herein is a Husky™ unmanned ground vehicle obtainable from Clearpath Robotics Inc., 148 Manitou Dr., Kitchener, Ontario N2C 1L3, Canada, which includes a battery-powered power source.

In a semi-autonomous mode, the mobile base 20 is pushed by a person (e.g., as a cart), and thus the power source and optionally also the navigation component may be omitted. In some embodiments, the navigation component and sensors may be used in the semi-automated mode to confirm and/or measure any deviation from a requested location and orientation (e.g., by using voice feedback to confirm the aisle/shelf information or using image features of the scene).

The image capture assembly 22 includes an imaging component 38 which includes one or more image capture devices, such as digital cameras 40, 42, 44, that are carried by a support frame 46. The image capture devices capture digital images, such as color or monochrome photographic images. The support frame may be mounted to the mobile base 20 and extend generally vertically (in the z-direction) therefrom (for example, at an angle of from 0-30° from vertical, such as from 0-20° from vertical). The cameras are configured to capture images of a full height h of the shelf unit, or at least that portion of the height h in which the labels 18 of interest are likely to be positioned throughout the facility.

Figure 3:
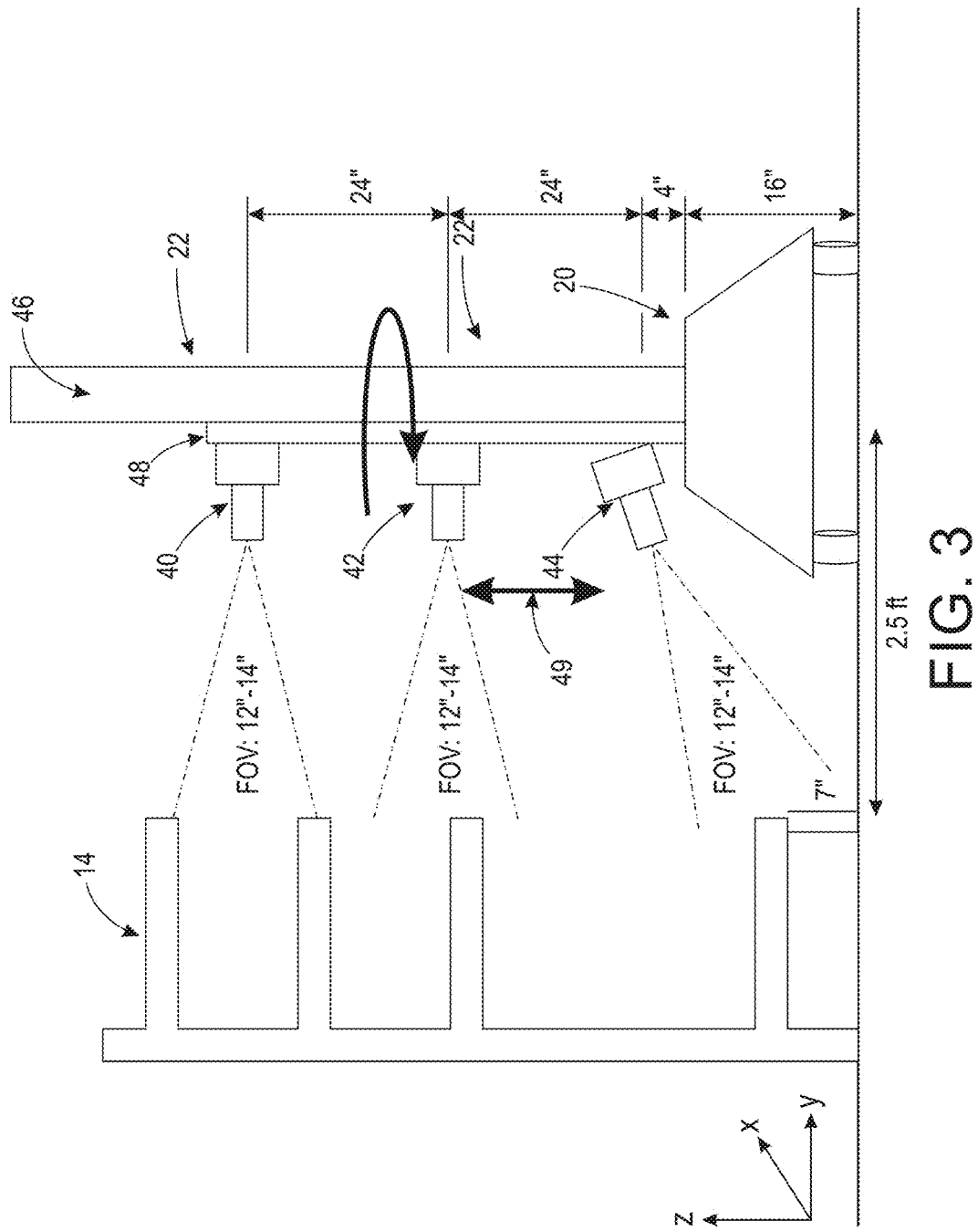
FIG. 3 is a schematic elevational view of a store profile generation system in accordance with another aspect of the exemplary embodiment.
Figure 4:
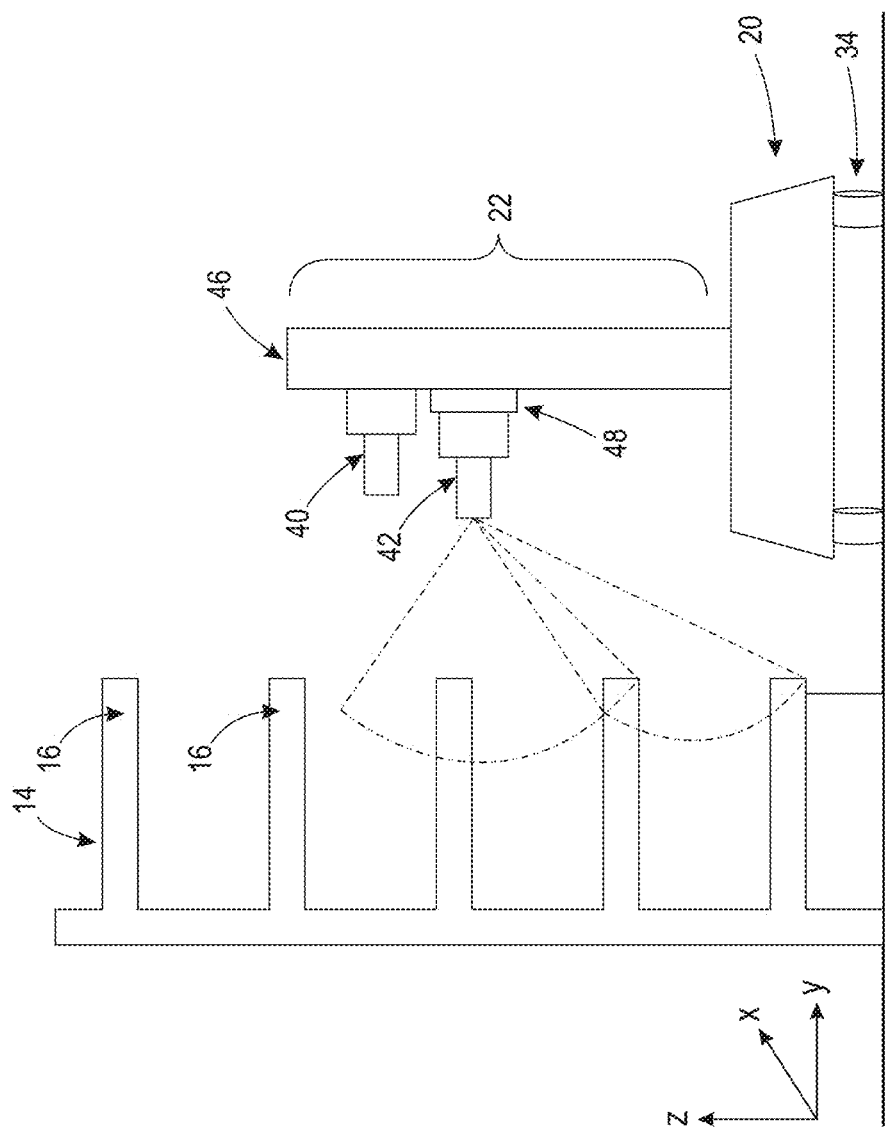
FIG. 4 is a schematic elevational view of a store profile generation system in accordance with another aspect of the exemplary embodiment.

One or more of the camera(s) 40, 42, 44 may be moveable, by a suitable mechanism, in one or more directions, relative to the support frame 46 and/or mobile base 20. In one embodiment, at least one of the cameras has a first position and a second position, vertically-spaced from the first position, allowing the camera to capture images in the first and second positions. In the embodiment illustrated in FIGS. 2 and 3, for example, the support frame 46 includes a translation stage 48 for moving one or more of the camera(s) in at least one direction, such as generally in the z (vertical) direction, as illustrated by arrow 49. The direction of movement need not be strictly vertical if the support translation stage is mounted to an angled support frame, as noted above. Optionally, the translation stage 48 provides for rotation of one or more of the cameras in the x,y plane and/or tilting of one or more of the cameras, relative to the translation stage/support frame. In another embodiment, the cameras, and/or their associated mountings, may provide the cameras with individual Pan-Tilt-Zoom (PTZ) capability. The pan capability allows movement of the field of view (FOV) relative to the base unit in the x direction; the tilt capability allows the field of view to move in the z direction as illustrated for camera 44 in FIG. 3; the zoom capability increases/decreases the field of view in the x,z plane (which may be measured in units of distance, such as inches or cm, as illustrated in FIG. 3, or angle $\alpha$, as illustrated in FIG. 1). In some embodiments, only some, i.e., fewer than all, of the cameras are moveable and/or have PTZ capability, as illustrated in FIG. 4, where only camera 42 has such capabilities. The incremental movement of the mobile base 20 allows images to be captured along the length of the shelf unit 14 (in the x direction).

Figure 6:
FIG. 6 illustrates an exemplary price tag.

The image capture assembly 22 serves to capture a series of images containing shelf product labels 18 (FIG. 1), such as product price tags, at sufficient resolution for analysis and product recognition. The product price or tags 18 may be located on the outer edge of a shelf or at the end of a pegboard hook 50, or other product label mounting device. As illustrated in FIG. 6, each price tag 18 generally includes a unique identifier 54 for the product, such as a 1 or 2-dimensional barcode or stock keeping unit (SKU) code. As an example, a 1D EAN-13 code may be printed on or otherwise affixed to the product label. 2D barcodes are commonly referred to as QR codes or matrix codes. In addition, a human-readable price 56 and optionally some descriptive text 58 may be printed on or otherwise affixed to the product label.

A width w of the barcode 54 in the y direction may be about 20-25 mm on many price tags. However, the barcode width may not be uniform throughout the store or from one store to another. In order to allow accurate imaging and decoding of such barcodes, a minimum resolution of approximately 200 pixels per inch (ppi) (78 pixels per centimeter) at the object plane with sufficient depth of focus to allow for differences in x direction position or tilt of the price tags relative to the camera is desirable. For smaller barcodes and 2D barcodes, a higher resolution may be appropriate. A digital camera mounted to a support frame 46 so that it can be relatively stationary while capturing images is thus more suited to this task than a hand-held smartphone camera or inexpensive webcams, unless the acquisition is performed close up (e.g., one barcode at a time with the camera placed very close to the barcode) and the camera is held sufficiently steady. Furthermore, although the locations of price tags are somewhat systematic, there are large variations from shelf to shelf, store to store, and chain to chain, as well as differences in lighting conditions, print quality, transparency of the product label mounting device 50 (if it overlays the product label 18), and so forth. Thus, it may be appropriate to change the design and/or adjust the configuration of the cameras, depending on the expected conditions within the store or portion thereof. An exemplary image capture assembly 22 is adaptable to accept different numbers of cameras and/or different camera capabilities, as described in further detail below.

The exemplary control unit 24 provides both control of the system and data processing. The control unit 24 includes one or more dedicated or general purpose computing devices configured for performing the method described in FIG. 7. The computing device may be a PC, such as a desktop, a laptop, palmtop computer, portable digital assistant (PDA), server computer, cellular telephone, tablet computer, pager, combination thereof, or other computing device capable of executing instructions for performing the exemplary method. As will be appreciated, although the control unit 24 is illustrated as being physically located on the mobile base 20 (FIG. 1), it is to be appreciated that parts of the control unit may be in the image capture assembly 22 or located on a separate computer remote from the mobile base and image capture assembly.

The control unit 24 illustrated in FIG. 5 includes a processor 60, which controls the overall operation of the control unit 24 by execution of processing instructions which are stored in memory 62 communicatively connected with the processor 60. One or more input/output interfaces 64, 66 allow the control unit to communicate (wired or wirelessly) with external devices. For example, interface 64 communicates with cameras 42, 44, 46 to request image capture, and/or adjustments to the PTZ settings, and to receive captured digital images from the cameras; with translation stage 48, where present, to adjust camera position(s); with mobile base 20 for movement of the system as a whole, relative to the shelf unit, and the like. Interface 66 may be used for outputting acquired or processed images, a store profile 12, and/or information extracted therefrom, such as to an external computing device and/or a printer (not shown) for printing and/or packaging sale signage in an appropriate order to match the store profile.

The various hardware components 60, 62, 64, 66 of the control unit 24 may be all connected by a bus 68.

The memory 62 may represent any type of non-transitory computer readable medium such as random access memory (RAM), read only memory (ROM), magnetic disk or tape, optical disk, flash memory, or holographic memory. In one embodiment, the memory 62 comprises a combination of random access memory and read only memory. In some embodiments, the processor 60 and memory 62 may be combined in a single chip. The interface 64, 66 allows the computer to communicate with other devices via a wired or wireless links or by a computer network, such as a local area network (LAN) or wide area network (WAN), or the internet, and may comprise a modulator/demodulator (MODEM), an electrical socket, a router, a cable, and and/or Ethernet port. Memory 62 stores instructions for performing the exemplary method as well as the processed data 12.

The digital processor 60 can be variously embodied, such as by a single-core processor, a dual-core processor (or more generally by a multiple-core processor), a digital processor and cooperating math coprocessor, a digital controller, or the like. The digital processor 60, in addition to controlling the operation of the computer 62, executes instructions stored in memory 62 for performing the method outlined in FIGS. 7 and/or 11.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 7:
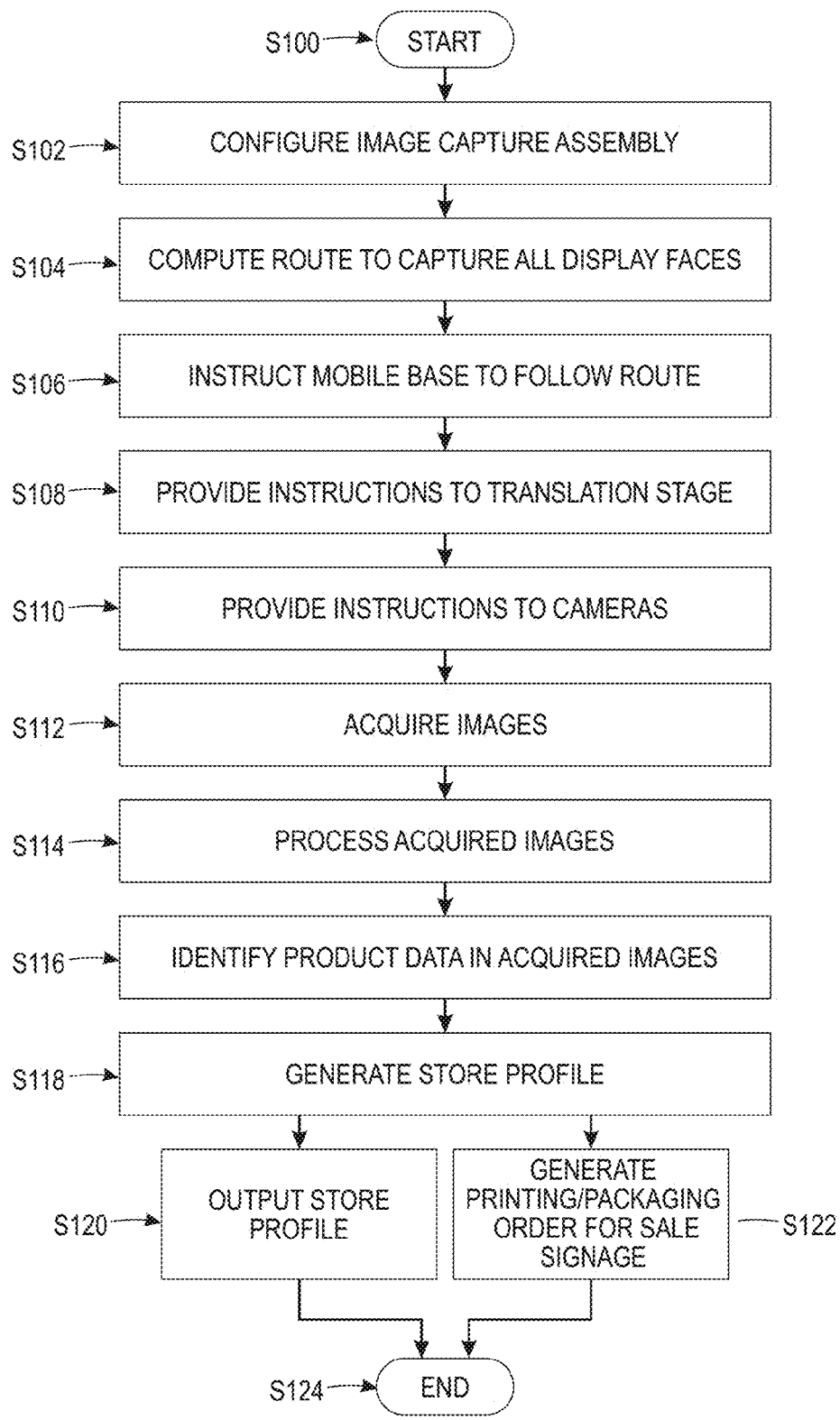
FIG. 7 is a flow chart illustrating a store profile generation method in accordance with another aspect of the exemplary embodiment.

The processor 60 executes instructions 70 stored in memory 62 for performing the method outlined in FIGS. 7 and/or 11. In the illustrated embodiment, the instructions include a configuration component 74, a mission planner 76, a translation stage controller 78, a camera controller 80, an image data processing component 82, a product data recognition component 84, a store profile generator 86, and a signage generator 88. Fewer than all these components may be included in some embodiments. In other embodiments, some or all of the components may be located on a separate computing device, i.e., one which is not carried by the mobile base, as discussed above.

The configuration component 74 is used prior to a mission to configure the image capture assembly 22 (e.g., determine FOV and position(s) of the camera(s) and to provide a spatial characterization of the image capture assembly, such as a spatial profile for each camera. Each camera may have at least one camera spatial profile. A camera may have two or more spatial profiles if the camera is to be moved, relative to the mobile base, and/or its FOV adjusted, for acquiring more than one image at the same mobile base location. The camera spatial profile may be a mapping between pixel location and a location in an x,z plane to enable a mapping between pixels of each image captured at a respective camera position and a position in the x,z plane corresponding to a portion of a shelf face where the images are captured. Note that in the case of multiple spatial profiles for a camera, these spatial profiles may be related and may be derived from some operational parameters, such as the distance that the camera has been moved. Hence in some cases, these multiple spatial profiles may be stored as one spatial profile plus the relations among this given profile and the operational parameters.

The mission planner 76 has access to a store floor plan 90 (layout of aisle and shelves and its facing) and the purpose of each mission. A mission may be for example, to capture all price tags throughout the store, or limited to only a part of the store, etc. Using the information in the store floor plan 90, the mission planner determines the path that the mobile base 20 should follow and communicates with the mobile base to provide the path and appropriate stop positions (where the images should be acquired by the image capture assembly). The instructions may be provided to the mobile base in a step-by-step fashion or in the form of a full mission.

The translation stage controller 78 determines the translations of the translation stage to achieve desired camera positions and communicates them to the translation stage 48. The camera controller 80 determines the camera parameters (e.g., shutter speed, aperture, ISO number, focal length, . . . ) and optionally position parameters (e.g., pan, tilt, zoom, or vertical translation amount . . . ) of the cameras in the image capture assembly for each position that requires image acquisition. These parameters may be fixed throughout the mission and/or adjusted dynamically based on current location information of the mobile base (e.g., distance to the shelf to be imaged, the facing angle, height of the shelf . . . ). As will be appreciated, translation stage controller 78 and camera controller 80 may form parts of a single component for controlling the acquisition of images by the image capture assembly 22.

The image data processing component 82 processes the images acquired by all the cameras and uses the mapping provided by the configuration component and position information provided by the mobile base to map pixels of the captured image to locations in 3D space.

The product data recognition component 84, which may be a part of the image data processing component 82, analyses the processed images for detecting price tag locations, extracting product data 26, such as price tag data, and performs image coordinate conversion (from pixel position to real-world coordinates).

Outputs of the data processing component 82 and/or product data recognition component 84 may be used by the store profile generator 88 to determine the store profile 12 (e.g., the real-world coordinates of detected and recognized UPC codes). In some cases, outputs of the data processing component 82 and/or product data recognition component 84 are used by the translation stage controller 78 and/or camera controller 80 to determine what should be the appropriate camera parameters and/or position parameters for the next image capture. Some outputs of the data processing component 82 and/or product data recognition component 84 may be used by the mission planner 76 to determine the next positional move for the mobile base 20.

With reference now to FIG. 7, a method for generating (and using) a store profile 12 is shown, which can be performed with the system of FIGS. 1-5. As will be appreciated, some or all of the steps of the method may be performed at least partially manually and need not be performed in the order described. The method begins at S100.

At S102, the image capture assembly 22 is configured. Briefly, the configuration component 74 identifies suitable positions for the cameras 42, 44, 46, and optionally a suitable range of camera parameters (e.g., field of view, exposure time, ISO number, etc.), in order to capture the full height h of each shelf unit face from a set of overlapping images acquired at one single position of the moveable base (i.e., without gaps in the z direction). The configuration component 74 optionally extracts information from test images which enables it to associate each (or some) pixels of a captured image with a point in yz space and/or to generate a spatial characterization of the image capture assembly which may include a spatial profile for each camera.

Figure 8:
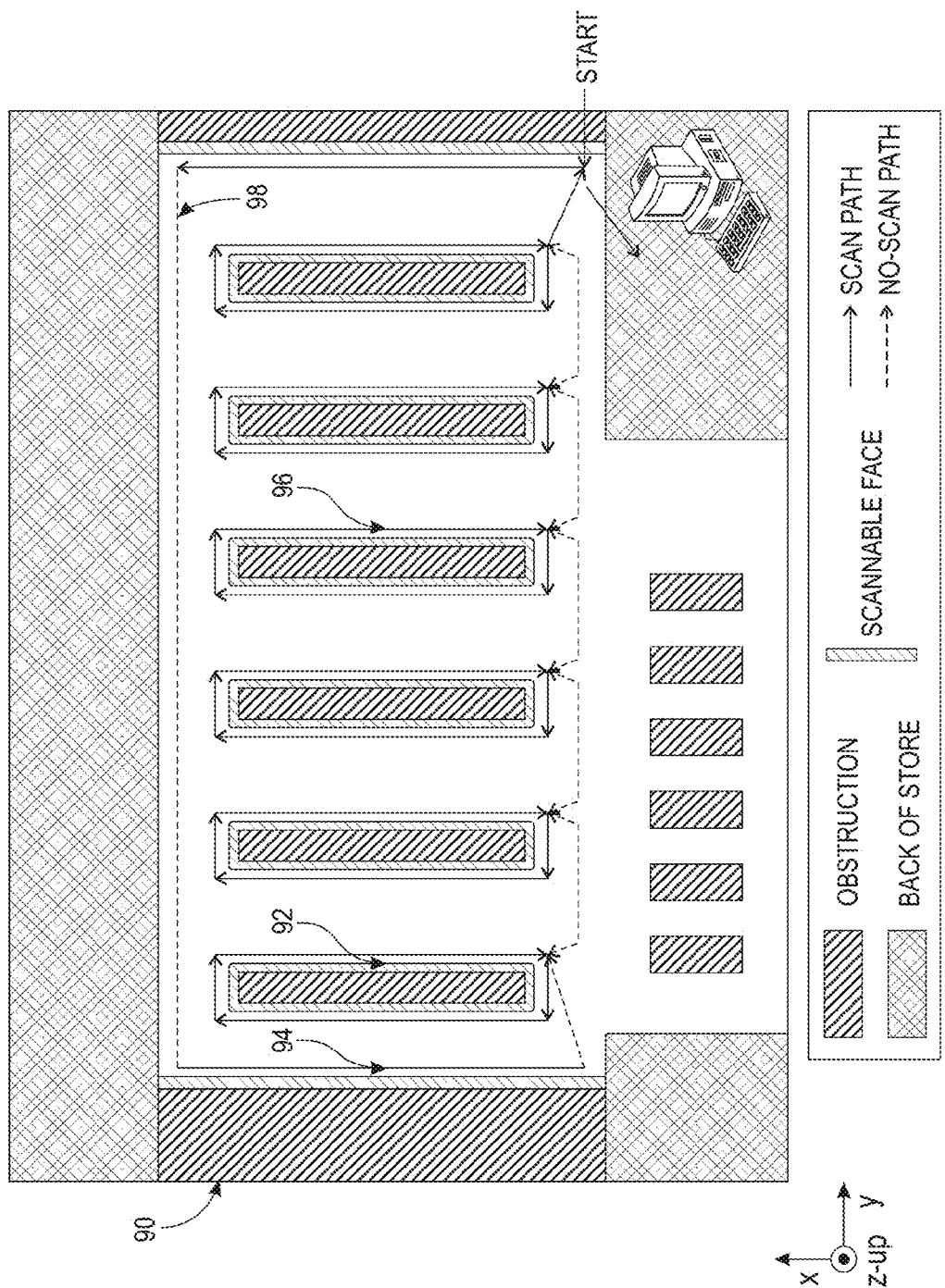
FIG. 8 illustrates a map of a store with a route for the store profile generation system identified.

At S104, a route for scanning the store shelves is computed. In particular, the mission planner 76 computes a route for the mobile base around the facility, based on a store floor plan 90. The floor plan identifies obstructions, particularly locations of shelf units. The store plan may have been generated partially automatically, from a prior traversal of the facility by the system 10, for identifying the location of obstructions. For example, as shown in FIG. 8, the obstructions may be identified on the floor plan 90 and locations of scannable faces 92 on each shelf unit identified (e.g., by a person familiar with the store). The mission planner 76 computes a route 94, which includes all the faces 92 and designates parts of the route as a scan path 96 (where images of scannable faces 92 are to be acquired) and parts of the route as a no-scan path 98 (where no images are to be acquired).

At S106, the mission planner 76 communicates the computed route 94 to the navigation component 30 of the mobile base, and optionally designating stop positions, which may be located at approximately equal intervals along the scan path 96. During the mission, the mission planner 76 receives information from the navigation component 30 from which any deviations to the planned route are computed. The mobile base 20 is then responsible for navigating the system 10 to a desired location with desired facing (orientation) requested by the control unit 24 and reporting back the actual location and facing if there is any deviation from the request.

At S108, as the mobile base 20 traverses the route 94, instructions are provided to the translation stage 48 at each predetermined stop on the scan path 96 for positioning the cameras. The translation stage controller 78 communicates instructions to the translation stage 48 when the camera position(s) is/are to be adjusted and may provide the translation stage 48 with directions for achieving predetermined camera positions, based on the information generated by the configuration component 74.

At S110, at each predetermined stop on the scan path 96, instructions are provided to the cameras 40, 42, 44 themselves for positioning and image acquisition. In particular, the camera controller 80 communicates instructions for adjusting position and/or focal plane to the camera's PTZ components and provides instructions for data acquisition to provide the optimal coverage of the shelf, using the position information identified by the configuration component 74. The translation stage controller 78 and camera controller 80 may work in cooperation to achieve desired positions of the cameras.

At S112 images 100, 102, are acquired by the cameras at a given position of the mobile base. The image capture assembly (iteratively) acquires images based on the requests by the control unit and the camera parameters and (optionally) position parameters provided.

At S114, the acquired images 100, 102 are transferred from the camera memory to the data processing component 82. The data processing component 82 receives the images acquired by the cameras and stores them in memory, such as memory 62, and may perform preliminary processing, such as adjustments for blur, color, brightness, etc. A composite image or panorama of the shelf face may be computed by performing a union of multiple images captured by the image capture assembly. In forming the composite image, pixels of one or more of the acquired images may be translated to account for each camera's spatial profile.

At S116, the product data recognition component 84 processes the acquired images 100, 102 or panorama to identify product data 26 from the captured shelf labels 18, where present, in the images. In an exemplary embodiment, the acquired images and a corresponding coarse location and facing information are analyzed to determine the product layout information (e.g., via barcode recognition of price tags and knowledge of the camera spatial profile).

The process repeats until the mission is completed (e.g., all aisles of interest have been scanned). For a typical mission, the mobile base moves along each store aisle to enable images of the scannable faces of each shelf unit to be captured. From the captured images, each shelf price tag is detected and its location determined within the image.

By measuring the mobile base's current position in the store floor plan, its position data can then be associated with the images being captured at that position, based on the time of capture. Candidate regions of each image 100, 102 which have at least a threshold probability of including a barcode 54 are identified and processed to extract the barcode information, which may be output as an SKU code which uniquely identifies the product. Associated information, such as price and product information 56, 58, particular colors used in the product label 18, and the like, may also be used to locate the barcode and/or to decipher it, particularly where the product data recognition component has difficulty in doing so based on the barcode alone. The location of the barcode in three dimensional space can be determined based on the location of the mobile base at the time the image was captured and the spatial characterization of the image capture assembly.

At S118, a store profile 12 is generated based on the identified barcode information 26 and computed barcode locations. In particular, the store profile generator 86 generates a store profile 12 which identifies locations of the price tags 18, based on the extracted barcode information and optionally information provided by one or more of the configuration component 74, mission planner 76, and navigation component 30, through which pixels of identified barcodes in the captured images are associated with a point in real (xyz or xy) space or otherwise generally located with respect to the store floor plan 90. An accurate store profile 12 identifying product locations/locations of price tags in a store can thus be reconstructed.

At S120, the store profile 12 may be output from the system.

At S122, information on signage to be mounted throughout the store may be received and a packaging order for the particular store computed, based on the store profile 12. In particular, the signage generator 88 receives information on signage to be printed for an upcoming sale in which only some but not all of the price tags may need to be replaced. The signage generator uses the store profile 12 to identify the locations of only the price tags/products to which the sale relates. From this information, a printing and/or packaging order for the signage is generated. When the signage is packaged and provided to an employee, the order in which the signage is packed in accordance with the computed printing and/or packaging order enables the person to traverse the store in the order in which the signage is packaged to replace/add the new signage, generally in a single pass through the store. The route defined by the packing order minimizes the amount of backtracking the employee needs to do and/or provides for a shorter path (in time or distance) to complete the task than would be achievable without the computed store-specific packaging order, and avoids the need for the store to resort the signage into an appropriate order. In this way, for each store in a chain, a store profile can be generated (e.g., periodically), allowing a store-specific packaging order for signage to be computed each time a set of shelf labels 18 and/or other signage is to be mounted throughout the store.

The method ends at S124.

Further details of the system and method will now be described.

While in one embodiment, the store profile 12 is used for defining an appropriate sequence for printing/packaging of sale signage, the store profile has other applications, including validating that the store product layout complies with a pre-defined planogram. A planogram is a predefined product layout for a slice of about 0.5 meters or more of length along an aisle. The captured images can also be processed to extract any 1D or 2D barcodes and/or text data from regions that comply with the price tag format. Data such as the product UPC and the price tag location within the image are extracted.

Image Capture Assembly

To accommodate different shelf configurations and/or acceptable acquisition times, different configurations of the image capture assembly 22 are contemplated. In one embodiment, each camera 40, 42, 44 provides for high resolution imaging in a field of view (FOV) 110 (FIG. 1) defined by an angle α at the lens or by a vertical distance at the shelf face. In another embodiment, the cameras provide a mixture of high resolution imaging (one or more cameras) and low resolution imaging (one or more cameras capturing images at a lower resolution than the high resolution camera(s)), referred to as multi-resolution imaging. The high-resolution imaging embodiment has the advantages of simpler and faster acquisition, single pass processing, and facilitation of off-line image processing. The multi-resolution imaging embodiment has the advantage of lower cost. More detailed examples of each are now discussed.

1. High Resolution Imaging for Barcode Detection and Recognition in Retail Applications For this imaging option, few assumptions need to be made about the potential locations of price tags 18. For example, the only information needed may be the maximum height h of shelves of interest in the store. For this imaging option, there is also no iterative processing needed to estimate the barcode locations before next imaging. As a result, designing this imaging option entails confirming that the system, in aggregate, has sufficient field of view to cover the maximum height of shelves of interest in the store at the desired resolution (typically 200 ppi or above).

As an example, a DSLR camera with horizontal and vertical sensor dimensions of about 22 and 15 mm (a 3:2 aspect ratio) which has a high pixel resolution of at least 100 or at least 200 pixels/mm at the sensor (e.g., a 10 Mpixel camera or higher) can provide a minimum object plane resolution of 100 or 200 pixels/inch in a plane FOV of about 68.5 cm×45.5 cm (± about 5 or ± about 10 cm).

Since a shelving unit 14 may be around 180 cm tall, a single camera generally cannot capture it fully with a single image while meeting the resolution requirements. Several embodiments of the image capture assembly that can meet these goals are given, by way of example:

A. Multi-Camera Array

In the embodiment of FIG. 1, for example, two or more (optionally identical) cameras 40, 42, 44 are located in fixed relation to each other and to the mobile base. Each camera can have different poses (rotation, focus length etc.) if needed. The FOV of each camera is vertically spaced from its neighbor and overlaps that of its neighbor by a known amount. "Vertically spaced FOVs" means that the FOVs are spaced from each other at least partially in the z direction. Thus, a composite image of a full 180 cm tall shelving unit can be extracted from three cameras (with capabilities as described above) oriented in portrait mode spaced 60 cm apart. For different heights/camera capabilities, a different number of cameras could be used, the aim being to have enough cameras to cover the entire vertical FOV (height h) of the shelving unit faces with desired resolution in one position while the navigation of the mobile base offers the scanning needed to cover the horizontal FOV (i.e., store aisles). Since this embodiment over-specifies the image resolution requirement (i.e., to achieve high resolution everywhere, regardless the locations of barcodes in each store) and each camera operates independently, all images can be captured in a pass through the store and be processed later. Hence this embodiment offers a rapid and non-iterative acquisition. The image processing can be done in an off-line fashion allowing the system to acquire all images needed quickly and then process them later, e.g., on the same or a different computing device which may be in the back office of the store. Advantages of running the system in such a manner include (1) less disruption to store hour operation and (2) computational costs may be cheaper when the analysis of the captured images is performed on a back office computer than on an on-board computing device. A disadvantage is that more cameras may be needed than for other embodiments.

B. Camera(s) with a Moveable Positioning Unit

Figure 2:
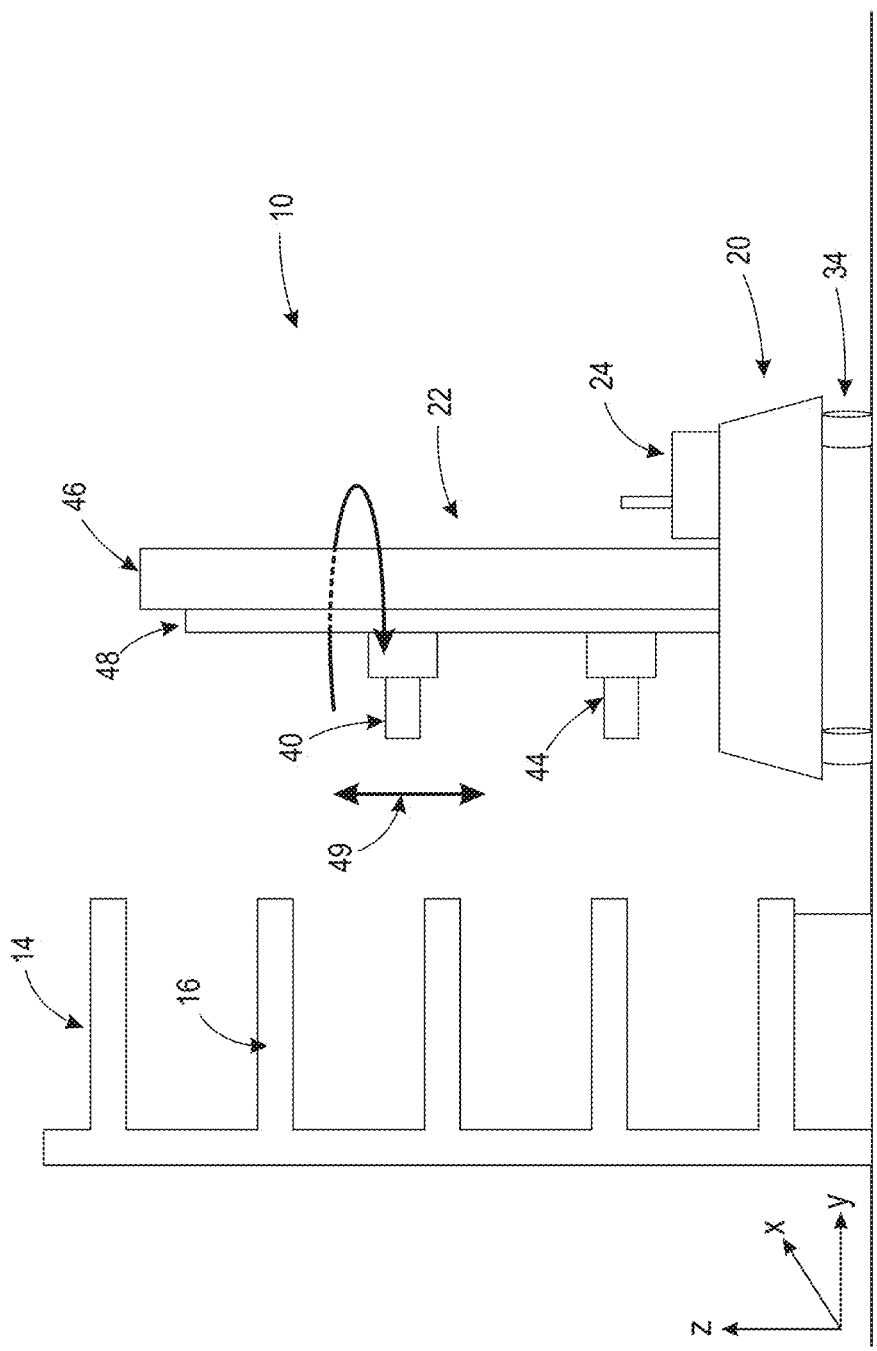
FIG. 2 is a schematic elevational view of a store profile generation system in accordance with another aspect of the exemplary embodiment.

As illustrated in FIG. 2, fewer cameras can be used to capture the full height shelving unit than for embodiment 1A by using a vertical translation stage 48. In the embodiment, two cameras with two-position (or more) capability are used. In a first position, each camera 40, 42 captures an image, and then the translation stage moves the cameras to a second position, vertically spaced from the first position, where two more images are captured. The benefits of off-line processing and faster and non-iterative acquisition (compared to other embodiments discussed later) are retained in this embodiment. However, this embodiment, may incur the expense of additional imaging time and slight increase of system complexity. From the perspective of images captured, this embodiment is very similar to multi-camera array of embodiment 1A with lower cost but lower acquisition rate. This option can offer a flexible trade-off between cost and acquisition time. The number of positions can be extended to the extent where only a single camera is needed. In the exemplary embodiment, pictures are captured while the camera is stationary (i.e., stopped at desired positions), rather than while moving between positions, since even a slight motion during the imaging may inhibit or prevent accurate recognition of barcodes unless sophisticated motion compensation algorithms are employed. Accordingly, adding more stops by decreasing the number of camera positions/decreasing the number of cameras may increase acquisition time.

As with embodiment 1A, the system over-specifies the requirement of the imaging device/configuration such that high resolution is achieved everywhere (within the potential space of interest, e.g., no more than 2 m high in store aisles). This makes the system very adaptable to any store configuration, makes the image acquisition non-iterative and faster, and makes the processing simpler and independent from image acquisition. Given that the resolution is sufficient and the FOV covers all possible regions of interest, the data processing component 82 can focus on detecting, localizing, and recognizing the product identity through price tag recognition. Embodiment 1A is simpler but embodiment 1B may be suited to stores with specific configurations, such as taller shelves and/or those with sparse and discrete potential locations of barcodes. For this type of store, the second embodiment can cope easily with this by replacing an attempt to cover all vertical FOVs up to the maximal height with pre-programming a few discrete positions for imaging that can cover those sparse and discrete potential locations of barcodes in the selected stores. For example, in FIG. 3, cameras 40 and 42 may move between first and second positions to capture upper shelves while a third camera is tilted downward to capture a shelf near the floor level.

The pre-determined FOVs for each camera in the embodiment 1B system can be achieved by a combination of selecting a suitable distance to the shelf from the mobile base 20 and/or through the zooming capability of the cameras.

In one embodiment, the control unit 24 instructs the mobile base 20 to navigate to a fixed distance to the shelf face and keep the focus length of each camera fixed. In another embodiment, the control unit only provides the mobile base with a range of distances to the shelf for it to navigate to. Each camera then adjusts its zoom parameter to maintain the FOVs based on the actual distance to the shelf reported back from mobile base. This may be a somewhat more expensive option, due to the cost of a controllable zoom lens, but can be more adaptable. A combination of the two embodiments is also contemplated.

2. Multi-Resolution Imaging for Barcode Detection and Recognition in Retail Applications In this embodiment, multi-resolution imaging is used to accomplish the task of identifying the store profile 12. In this embodiment, the system first captures low resolution, large FOV images, analyzes them to identify regions of interest (ROIs) that may require high imaging resolution (i.e., may include barcodes). The system then acquires high resolution images of those regions, and analyzes them for extracting product identification information, where present. The spatial information for these ROIs can be determined based on a combination of the camera spatial profiles of the low resolution images and mobile base location information or a combination of camera spatial profiles of the high resolution images and mobile base location information. The former may be a better and easier option since the camera spatial profiles of the high resolution images may be more dynamic and vary from acquisition to acquisition.

The terms low and high resolution are used herein in a relative sense. High resolution generally refers to a sufficient resolution to recognize a barcode robustly (e.g., 200 ppi or higher), while low resolution refers to sufficient resolution to detect candidate/potential locations of a barcode (e.g., 30 ppi or higher). The desired resolution can be achieved in a number of ways. For example, the high and low resolutions can be achieved by a same type of camera but with different FOVs. In another example, the high and low resolution can be achieved primarily by the use of high vs. low camera sensor resolutions (e.g., using 20 Mega-pixel camera for high resolution imaging and a 2 Mega-pixel camera for low resolution imaging). In another example, a combination of FOV and camera sensor resolution can be used to achieve the high and low resolution imaging system.

A. Single Camera with PTZ Capability

In one embodiment (not illustrated), the image capture assembly 22 includes only a single camera with PTZ capability as the image capture device. The camera may be a PTZ camera or a regular camera with PTZ base. In this embodiment, the camera may first zoom-out and take a picture or pictures with a large FOV to cover the full height of the shelf. The images are analyzed to find candidate regions of interest (ROIs) which are more likely to include price tags than other regions of the images. In general, finding potential locations of price tags requires much less resolution than extracting the product information from each price tag. The camera then zooms in to various identified ROIs to acquire high resolution images to be used for extracting product identification information. The mobile base 20 is then moved to its next position along the shelf face and the process is repeated. Since the camera FOVs are constantly changing, it can be difficult to keep track of the spatial profiles of the camera and/or to ensure that the store has been completely scanned (for at least those regions of interest). The imaging may also take a long time since the imaging is in iterative fashion (the low resolution images are first acquired and analyzed before performing high resolution imaging) and many camera zoom-ins and zoom-outs may be needed. However, this embodiment can be constructed at relatively low cost. A person could walk around the store taking close-up pictures of the shelf labels 18 in a similar fashion. However, the system offers the automation and location tracking (through the mobile base navigation and control unit's mission planning) that could not be performed easily by a person.

B. High/Low Camera Combination with PTZ Capability

In the embodiment shown in FIG. 4, two cameras 40, 42 having different imaging parameters are used. A first camera 40 is used to acquire low resolution, but large FOV images of the entire shelf face. As for embodiment 2A above, the purpose of this camera is to allow the control unit 24 to identify local ROIs where shelf price tags are suspected of being present. Given one or more of these ROIs, the second camera 42 is used to acquire high resolution images of the identified ROIs before the mobile base 20 is moved to its next position along the shelf face. The second camera 42 may have PTZ capability (a PTZ camera or a regular camera mounted on a PTZ motorized base 48). The first camera generally does not need such capability if the FOV is sufficient to cover the shelf height at the lowest resolution needed for prediction of ROIs. The imaging parameters of the first camera 40 may be fixed throughout the mission (no need for PTZ capability). This helps to ensure that the spatial profile of the first camera is constant (and thus can be derived offline) throughout the mission. By doing so, it is easy to determine the spatial layout of those identified ROIs based on the combination of the camera spatial profiles of the low resolution images and mobile base location information. This also avoids the need to keep track of the imaging parameters of the second camera when scanning through those identified ROIs.

This imaging embodiment reduces the need for processing high resolution images since processing is performed only on images captured of the ROIs, rather than of the entire shelf face. It may need to use more complex and iterative imaging acquisition modes to process the mixed resolution images. The cost and image processing time may be reduced (since for most of the time, many small images with high resolution are processed rather than a one extremely large composite high resolution image or set of images). However, it adds complexity to the method by increasing image acquisition time and may require on-line image processing.

In practice, the imaging embodiment selected may be application dependent. For example, a store with densely-populated price tags may benefit from high resolution imaging of the entire shelf face. In contrast, a store with sparse and irregularly-placed price tags may benefit from multi-resolution imaging. Mission time and cost also play a role for the selection of imaging options. The exemplary system can be configured to cover the typical spectrum experienced by a majority of the retail stores.

Although the imaging is described above as being high-resolution or multi-resolution, it should be appreciated that the imaging system may provide a combination of these approaches. For example, it may be beneficial to have PTZ camera(s) mounted on a moveable translation stage. In this embodiment, the translation stage is responsible for moving the PTZ camera to various coarse positions, while the PTZ capability of the camera is responsible for fine-tuning the FOVs to the desired resolution specification, focus, and the like.

Configuration

The configuration component 74 of the system 10 provides for automatic characterizing of the spatial characteristics of the image capture assembly 22 and for configuring of the data processing component 82. The outputs, e.g., spatial profiles of the imaging system, may be used by the store profile generator 86 for determining product layout in terms of real-world coordinates, for determining the path/pace of the mobile base 20, and the like. The configuration component can be applied iteratively to configure/optimize the image capture assembly 22 for the specific setting of each retail application.

Figure 9:
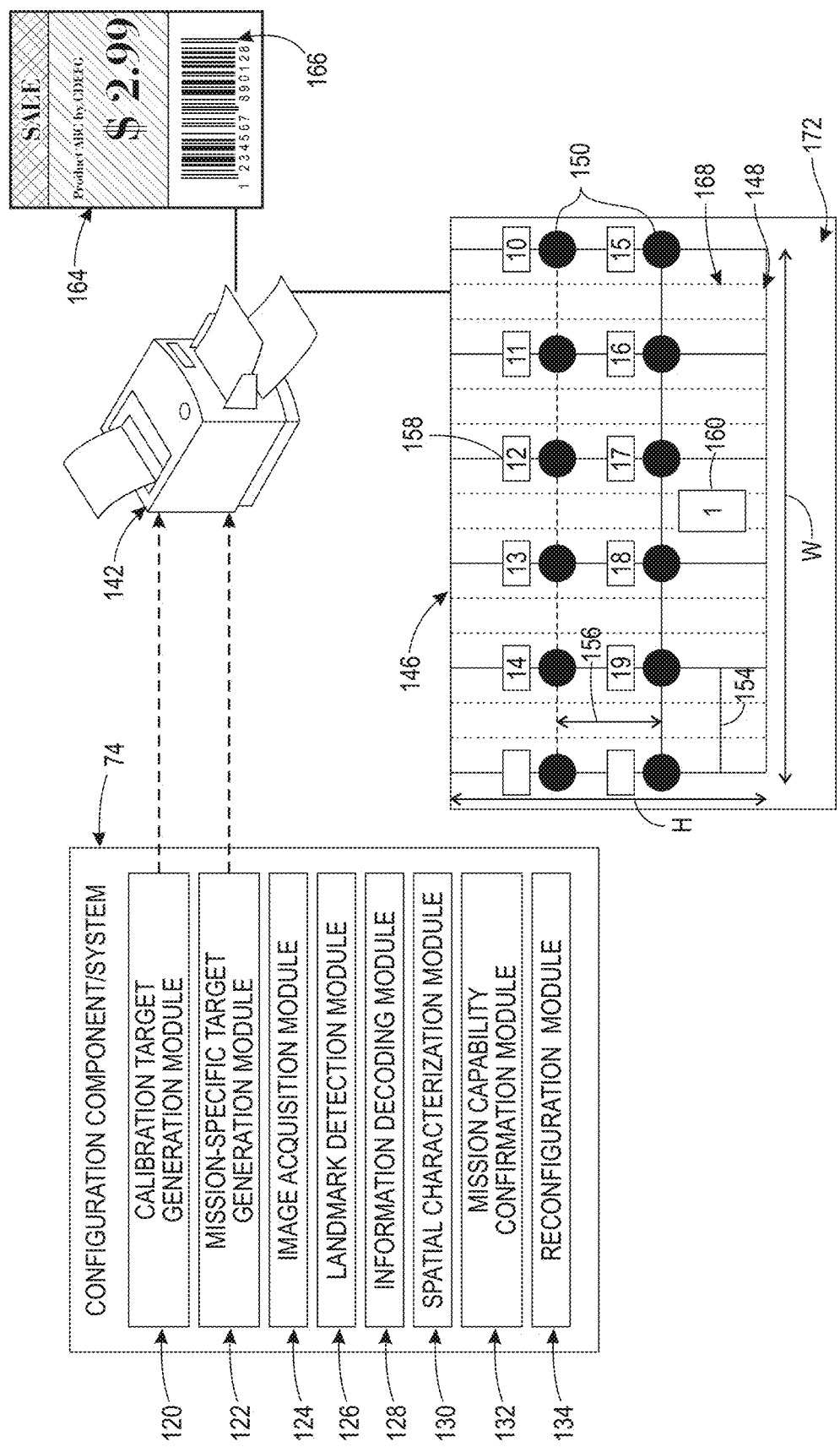
FIG. 9 illustrates a configuration component, a section of a modular calibration target, and a mission-specific target.

As illustrated in FIG. 9, the configuration component may include a calibration target generation module 120, a mission-specific target generation module 122, an image acquisition module 124, a landmark detection module 126, an information decoding module 128, a spatial characterization module 130, a mission capability confirmation module 132, and a reconfiguration module 134, although fewer than all of these modules may be provided in some embodiments.

The calibration target generation module 120 includes instructions (e.g., a template) for generating a spatially-characterized calibration target 140 (FIG. 10), when printed on sheets of paper by a communicatively linked printer 142, or otherwise output in tangible form. The calibration target 140 may be sectional and composed of a plurality of sections 146 (FIG. 9), which when assembled sequentially in a predefined order, form a target 140 of sufficient height to cover the portion h of the shelf face where product tags 18 are expected to be found. In other embodiments, the target 140 may be printed as a continuous length which may be cut to size at the store.

Figure 10:
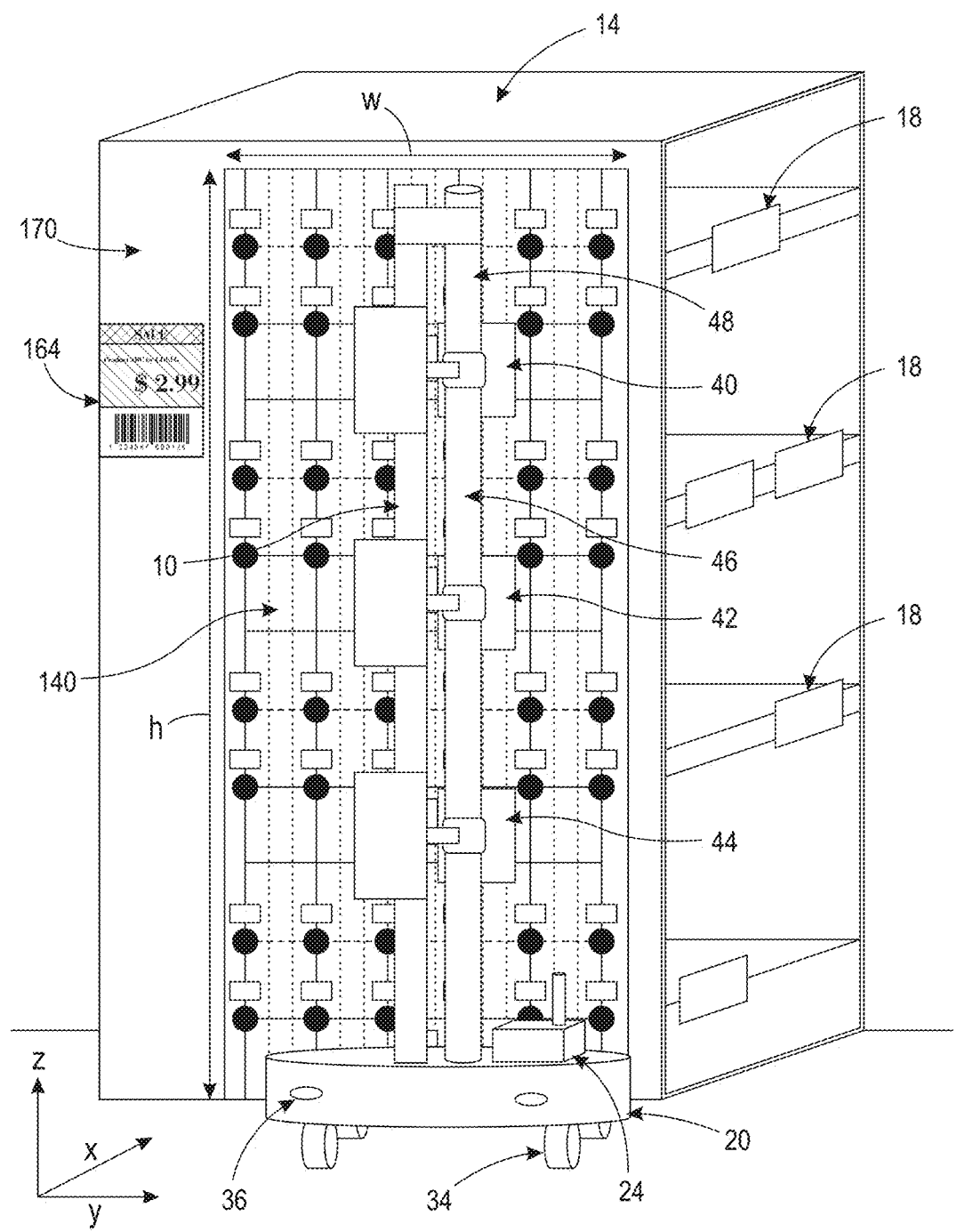
FIG. 10 illustrates a calibration target mounted to a vertical surface being used in configuration of the exemplary store profile generation system.

As illustrated in FIG. 9, each of the sections 146 has a width W (in a direction corresponding to the x direction, during a mission) and a height H in the z direction. The sections 146 may be taped or otherwise joined together to overlap at 148 to form a target 140 with a width W and a height h (FIG. 10). Each section 146 includes a plurality of machine-readable, visually-identifiable landmarks 150 with known positional information. In the illustrated embodiment, the landmarks are equally sized and spaced at predetermined intervals 154, 156 in W and H directions, respectively, to form a grid. Each section 146 includes an identical set of landmarks 150. The positional information may be encoded by a set of machine readable and visually recognizable location-encoding marks 158 which encode locations of the landmarks 150. The marks 158 may each be located adjacent the corresponding landmark 150 or positioned on the landmark itself. In the exemplary embodiment, the locations of the landmarks are encoded by human-readable identifiers, such as numbers, in the location-encoding marks 158. Each section 146 may include a human readable identifier 160, such as the section number, which assists a person in assembling the sections in the correct order and orientation to form the target.

The mission-specific target generation module 122 includes instructions for generating examples of one or more printable mission-specific targets 164, which may be combined with the calibration target 140. Additionally, known target information may be encoded by a second set of machine readable and visually recognizable marks (mission-info-encoding marks). In particular, the target 164 may be representative of the product tags to be identified in the store, and include, for example, a barcode 166 similar in size to the barcodes on the product tags 18, and/or or other machine readable information. The mission-specific targets 164 may be printed on one or more of the sections 146 or on separate sheets of paper, to be positioned, for example, adjacent to or on the target (FIG. 10). As will be appreciated, the generation of the calibration target and mission specific targets may be performed offline, prior to configuration of the system, and these components may be part of a separate computing device and not resident on the moveable system.

The image acquisition module 124 acquires test images using the image capture assembly 22 to be spatially characterized and/or configured. As will be appreciated, the camera controller 80 and stage controller 78 (FIG. 5) may serve as the image acquisition module 124 and/or may communicate with module 124 for acquiring the test images of the target(s) 140, 164.

The landmark detection module 126 detects the identifiable landmarks 150 and their positions on the acquired images of the target 140.

The information decoding module 128 detects the set(s) of machine readable and visually-recognizable marks 158, 166 on the acquired images of the target(s) 140, 164 and then decodes the corresponding locations of identifiable landmarks 150 from the associated location-encoding marks. Information 166 from the mission-specific targets in the images may also be decoded.

The spatial characterization module 130 matches the positions of landmarks 150 detected by module 128 to the actual positions on the target 140 and then derives absolute and relative spatial profile(s) and other characteristics of the imaging system.

The mission capability confirmation module 132 analyzes the acquired images to extract information from the mission-specific image targets 164, such as from the example barcodes 166, and compares this against the known information of the image targets, to determine whether the information matches (e.g., determine if the barcode captured in the image can be read to generate a SKU number corresponding to the known SKU number of the printed barcode 166). This allows the module 132 to confirm/assess the capability of the system to perform the mission. In the case where the barcode cannot be read correctly, the module 132 outputs information to the configuration computation module 134.

The reconfiguration module 134 may utilize some or all of the following information to compute a new configuration for the image capture assembly 22: the characterized spatial profile(s) of the imaging system, the knowledge of the parameters of the current configuration of the imaging system, and the knowledge of the system requirements (which may be mission dependent, store dependent, application-dependent, etc.). The module 134 may compute a modified (improved) configuration for the image capture assembly 22, e.g., one which is able to capture more of the shelf face 92 and/or provide sufficient resolution to capture barcode information from the product price tags 18.

Figure 11:
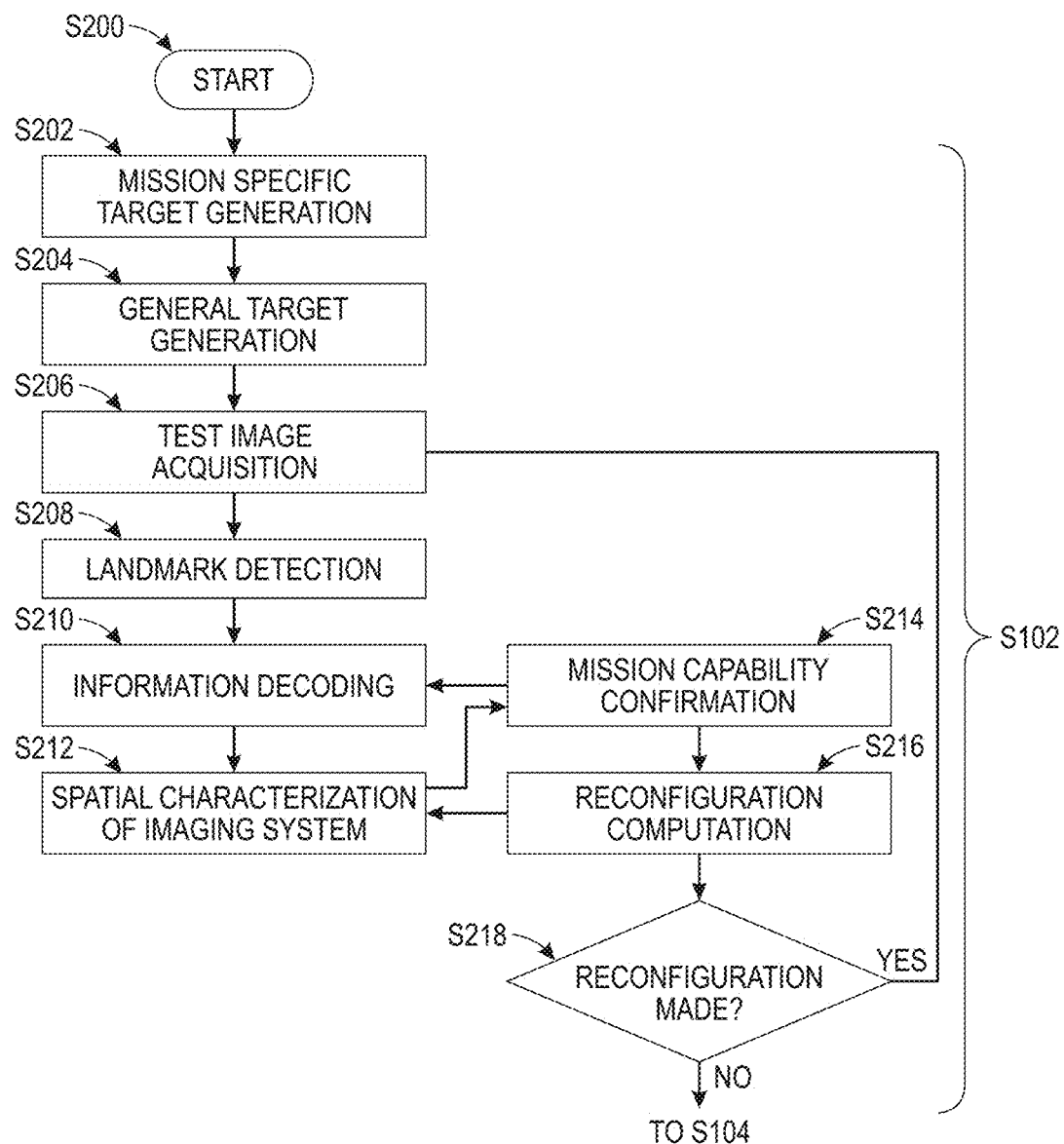
FIG. 11 is a flow chart illustrating a method for configuration and/or characterization of the image capture assembly of the store profile generation system in accordance with another aspect of the exemplary embodiment.

FIG. 11 illustrates an exemplary configuration process, which can be performed with the modules of FIG. 9. The method begins at S200.

At S202, mission-specific targets 164 may be generated by module 122, in cooperation with an associated printer 142. At S204, a calibration target 146 is generated by module 120, in cooperation with an associated printer 142. Step S202 may be incorporated into the generation of a calibration target which includes the mission specific target(s).

At S206, test images are acquired by module 124, in cooperation with the image capture assembly 22.

At S208, landmarks are detected in the acquired test images by the module 126.

At S210, the information 158, 166 in the acquired test images is decoded, where possible, by the module 128.

At S212, the image capture assembly 22 is spatially characterized, by the module 130.

At S214, the capability of the system 10 for performing the mission is assessed, by the module 132, based on information provided by the modules 128, 130.

At S216, a reconfiguration of the image capture assembly 22 is computed by the component 134, which may be output to the stage controller 78 and/or camera controller 80 for reconfiguring the image capture assembly 22. If at S218, a reconfiguration of the image capture assembly 22 has been made, the method may then return to S206 for another iteration of the system configuration, otherwise, the method may proceed to S104, where a mission is commenced.

Further details of the configuration of the image capture assembly 22 will now be described.

Calibration Target Generation (Off-Line Process)

Module 120 generates sections (e.g., in the form of printer recognizable instructions) which are used for forming a spatially characterized target 140 (FIG. 9), which includes an arrangement (e.g., an array) of identifiable landmarks 150 with known positional information encoded by a set of machine readable and visually recognizable marks 158. The physical calibration target 140 is generated for characterizing the image capture assembly 22, including cameras 40, 42, 44 and moveable components 48.

The modularity of the target facilitates scalability and ease of deployment in different facilities. For example, one store may have a maximum shelf face of about 100 cm and may use from 3 to 6 sections 146 (depending on their height) to form the calibration target 140. Another store may have a maximum shelf face of 180 cm and may use from 7 to 10 sections 146 to form the calibration target 140. The use of marks 158 which are both machine readable and visually recognizable allows for automation or human operation and allows for reduction in human and/or algorithmic errors.

As an example, the modular sections 146 may be designed to fit on sheets of paper which are a standard paper size, such as A3 (29.7×42 cm), A4 (29.7×21 cm), tabloid (27.94×43.18 cm), or letter-size (21.59×27.94 cm), used by the printer 142.

The landmarks 150 may be circular black dots or other regular shapes of the same size and shape, which are easily identifiable marks for a computer and a human to recognize. Their corresponding known relative locations are encoded by a corresponding set of machine readable and visually recognizable marks 158 which may be made more-recognizable by a colored box in which a number is located. The color choices for the marks 150, 158 may be selected to facilitate automated image processing. A first digit of the location-encoding mark 158 may correspond to a number of the section 146 (section 1 in the illustrated embodiment, with each section having a different number in sequence). A second digit or digits may provide a unique identifier for the landmark which is associated in memory 62 with a location of the corresponding landmark on the target. However, other machine-readable marks are also contemplated. For example, the location-encoding marks 158 could each be implemented as a 1D or 2D barcode. Optionally, horizontal and vertical grid lines 168 are provided to help human operators to perform measurements visually.

A calibration target 140 which is a composite of four sections 146 is shown in FIG. 10. The four sections may have been taped together to form the target which is then temporarily affixed to a shelving unit 14, wall, or other suitable vertical planar surface 170. Each section includes an identical set of landmarks 150 in which each column of landmarks is vertically aligned with the corresponding column of landmarks from the adjacent section(s). However, the location-encoding marks 158 are different in each section to reflect the different starting height of each the sections.

A template for generating the sections 146 may be designed using Microsoft PowerPoint or other suitable software, where the relative position encoding and ID 160 of the section is implemented as a page number variable.

The maximal height h that the image capture assembly 22 to be characterized needs to capture in a single position of the mobile base is determined and an n-page document is created using the template by printing or copying the page. The sections are taped, glued or otherwise assembled together and the target is mounted to the wall 170, e.g., with tape. In some cases, a bottom blank region 172 of the lowermost section may be trimmed so that the first row of black dots is a predetermined height above, or level with, the floor or other predetermined position. Alternatively, an offset may be used in computation to allow for the bottom blank region of this section. The bottom blank regions 172 of the rest of the pages may be used as the interface region to attach the pages together.

The exemplary calibration target 140 is assembled in order of the page numbers, starting from the bottom of the wall. The relative and absolute location information of each of the black dots in the final composite target can then be decoded. For example, the images are processed using optical character recognition (OCR) software to identify the marks 158 within the detected boxes just above each dot and a formula is applied to compute the actual location, in the x,z plane, of each dot. In an example embodiment, for the target illustrated in FIG. 10, the following formula may be used:

$$x = \begin{cases} -3d_0 & d_0 = 0 \sim 4 \\ -3(d_0 - 5) & d_0 = 5 \sim 9 \end{cases} \text{(for horizontal direction)} \quad \text{Eq. (1)}$$

$$z = \begin{cases} 6 + 9(d_1 - 1) & d_0 = 0 \sim 4 \\ 3 + 9(d_1 - 1) & d_0 = 5 \sim 9 \end{cases} \text{(for vertical/height direction)}$$

where, $d_0$ is the last digit of the numerical text in each colored box and $d_1$ are the remaining digit(s) of the numerical text in the colored box. This equation is suited to the case where the relative positions of 10 black dots arranged in two rows are encoded in the last digit in the template using $d_0=0\sim9$, while $d_1$ is encoded as the page number. $d_1$ automatically increases by one for each page of the multiple-page document. As will be appreciated, for different arrangements and locations, different formulae may be used to compute the actual locations of each of the landmarks detected in test images of the target. In general, each section may include at least two vertically spaced rows, each row comprising at least 2 or at least 3 landmarks that are horizontally spaced.

The modular design and encoding scheme for the example target 140 make it easy to deploy in any retail store, since it can be readily generated using a standard printer and tape. In one embodiment, the template for forming the sections may be stored on a portable memory storage device, such as a disk, flash memory, or downloaded to a local computer, allowing it to be used at the store location to generate the template. With distinct colors and shapes for the marks 150, 158, the detection module 126 can detect the marks robustly.

By making the targets human readable as well as machine readable, a human is able to assist in the reconfiguration of the image capture component 22. For example, the image capture assembly 22 may provide for live view of the captured images. A human can use the camera live view of the calibration target to roughly reconfigure the image capture assembly 22 close to desired state, with the assistance of the ruler-like target and some easily understood marks. After that, the automated control unit 24 can characterize or fine-tune the system.

Mission-Specific Target Generation (Off-Line Process)

The module 122 generates mission-specific targets 164 with known product-related information. By imaging and analyzing these targets, the configuration component 74 is able to confirm whether the image capture assembly 22 being characterized is capable of performing the desired mission.

In the case of a mission which involves barcode localization and recognition, the requirements of the image capture assembly 22 can be evaluated from the resolution on the object plane, FOV, and/or image blur (due to undesired motion, vibration . . . ). While this may be achieved using the calibration target alone, having a target 164 which is specific to the store allows the assembly 22 to be specifically characterized for the store in which it will be used. For example, barcode size, encoding type (e.g., EAN-13 vs. Code39), and the like may differ from store to store and these, as well as environmental conditions, such as lighting may influence the desired resolution. For example, as the barcode width increases, the minimal resolution needed for recognition decreases, i.e., it is easier to image and decode a larger barcode. The relationship, however, is often neither linear nor straight-forward. The contrast of the printed barcode also plays a role on the minimal resolution needed. Hence the use of a mission-specific target is an effective way to characterize the resolution capability of the image capture assembly 22 for a given mission. In some embodiments, the mission-specific target(s) may include one or more actual price tags of interest which may be positioned on top of or adjacent the calibration target on the wall. Since the exemplary calibration target has redundancies embedded, there is considerable flexibility on the placement of posting the additional samples 164 on the calibration target 140.

Image Acquisition

The image acquisition module 124 acquires images using the image capture assembly 22 to be characterized at the settings that the imaging system is intended to be used for the retail application. For example, the imaging component 38 may be intended to operate at a distance of 0.5-1 meters away from the shelf face and with direct facing to the shelf face. Accordingly, it is positioned in a similar relationship to the calibration target on the wall. Test images may be acquired over a range of positions which may be used to mitigate errors or adapt the system to position variations in a real mission where a predetermined distance to the shelf face cannot be maintained throughout.

Landmark Detection

The landmark detection module 126 detects the identifiable landmarks 150 on the acquired images (e.g., black dots). This can be achieved with a variety of techniques, such as thresholding on one or more color channels (e.g., the green channel), morphological filtering and connected-component analysis, and thresholding on size, or a combination thereof. In general, each captured image includes only a subset (fewer than all) of the landmarks that are visible on the target. The module 126 therefore keeps track of the images in which a detected landmark was found. The module 126 may output a list of data that corresponds to the pixel location and image ID for each detected landmark 150.

Information Decoding

The image decoding module 128 detects the set(s) of location-encoding marks 158 (colored blocks with text in the example embodiment) on the acquired images and then decodes their corresponding location and/or mission information. In one embodiment, a color-based segmentation method may be used to identify candidate regions that are of approximately the same color as the colored blocks. Morphological filtering, connected-component analysis, and thresholding on size may then be used to further refine the set of candidate regions. Finally, a sub-image of each candidate region with numerical text is analyzed by an OCR engine to extract the digits or other location-encoding information. If the digits match those of the calibration target 146, the corresponding localization information is extracted using the appropriate formula (e.g., Eqn. 1). The output of the module 126 is data that corresponds to the pixel location and encoded location information for each detected location-encoding-mark 158.

Spatial Characterization

The spatial characterization module 130 matches the detected landmarks and detected location-encoding marks output from modules 126, 128, and then derives absolute and relative spatial profile(s) and other characteristics of the image capture assembly 22. In one embodiment, the matching is performed by finding a pair of marks 150, 158 with minimal Euclidean distance in the pixel space and meeting the constraint that the colored block is positioned above the black dot. Due to the cameras often being titled or otherwise angled relative to the x,z plane, the images may be skewed.

For generating a spatial profile corresponding to each of the images acquired, model fitting may be used to find the best projective transformation for the image into real space. Relative characteristics of each image spatial profile, such as extent of vertical overlap or vertical spacing between adjacent FOVs and/or relative center misalignment between each pair of images are also derived. The output of the module 130 may include a set of spatial profiles, e.g., as projection matrices and their relative characteristics. The number of spatial profiles depends on the number of cameras and camera positions used. For example, for a 3-camera, single position assembly, 3 spatial profiles may be generated. For a 2-camera, two position assembly, 4 spatial profiles may be provided. However, in this case two of the spatial profiles may be very close to a translated version of the other two. Also in this case, the amount of translation in the camera positions may be characterized as an additional output. For the application of store profiling discussed above, obtaining individual spatial profiles for each image and determining whether the overlap FOV of adjacent images is great than a threshold value (e.g., zero) or not is generally sufficient for characterizing the image capture assembly 22. However, additional information may be extracted for configuring/reconfiguring the image capture assembly 22 if the configuration has not been determined or optimized or has been adjusted for a different retail application of interest.

Mission Capability Confirmation

The module 132 analyzes the acquired test images to extract information from the example mission-specific targets 164, compares the extracted information with the intended information of the targets 164, and confirms/assesses the capability of the system to perform the intended mission. For detection and decoding, it may reuse the process in landmark detection and information decoding, but here applied to different marks 166 and may employ a different decoding tool. In one embodiment, barcode localization and recognition is employed on the acquired images and a check is performed to determine if all barcodes are correctly recognized. If so, then the capability is confirmed. Additionally, if barcodes are easily recognized, the resolution may be decreased and/or the FOV increased to allow the mission to proceed faster. If the barcodes are not all recognized, the FOV could be decreased (increasing the resolution), or other reconfiguration of the image capture assembly 22, such as adding camera, may be performed. The output of module 132 may be fed to the reconfiguration module 134 to make suggestions for reconfiguration.

Reconfiguration

The module 134 utilizes the characterized spatial profile(s), the knowledge of the parameters of the current configuration, and the knowledge of the system requirements (which may be mission dependent, store dependent, application-dependent etc.) to compute an improved configuration for the image capture assembly 22. For example, if the overlapping FOVs among pairs of images are not evenly distributed, it may be desirable to readjust relative camera positions. The characterized misalignment/offset amounts between cameras can be computed to align them. If the resolution is more than sufficient, FOVs may be increased or the number of cameras or position-translations may be reduced to decrease the mission time or lower the cost. The reconfiguration component may implement a new configuration automatically.

The configuration component 74 thus described may be implemented in a store profile generation system, as described with respect to FIG. 5. However, it also finds application in other systems, such as a system for confirming whether a part of a store display unit complies with a predefined planogram, a system for generating composite images of display units, in other multi-camera/multi-position imaging systems, and the like. As will be appreciated, such a configuration system may include some or all of the components of FIG. 5, including memory 62 and processor 60.

The method illustrated in FIGS. 7 and/or 11 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method(s) may be implemented in transitory media, such as a transmittable carrier wave in which the control program is embodied as a data signal using transmission media, such as acoustic or light waves, such as those generated during radio wave and infrared data communications, and the like.

The exemplary method(s) may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 7 and or 11, can be used to implement the methods described herein. As will be appreciated, while the steps of the method may all be computer implemented, in some embodiments one or more of the steps may be at least partially performed manually.

EXAMPLE

A prototype system 10 with software forming a configuration component 74 was implemented with a combination of MATLAB and OpenCV C++. The system was used for both characterizing and configuration of an image capture assembly 22 with three cameras and a translation stage 48, providing two position capability, as exemplified in FIG. 3. In some configurations, the translation stage moved all cameras up or down by about 30 cm. In some configurations, the lowermost camera 44 was able to tilt to a position in which the camera lens pointed downward.

The system 10 was intended to cover a store shelf face up to maximal height of about 183 cm. A calibration target 140 was generated using nine units of the template and posted on a wall, covering approximately 206×43 cm. Additionally, actual on-sale price tags used in a real retail application were posted on the calibration target as mission-specific targets 164. The image capture assembly 22 could first be roughly configured using a combination of minimal imaging resolution requirement calculation, knowledge of maximal shelf height, knowledge of the dimension of the mobile base, manual set-up of FOV via camera view-finder, etc.

It can be assumed, for example, that an imaging system consisting of a 3-camera array with 2-positional capability is equivalent to a system with a 6-camera array with cameras that are 30.5 cm apart if their FOVs are evenly distributed and facing orthogonal to the shelf face. A FOV of about 30-36 cm in the short direction of the camera was found to provide sufficient imaging resolution for recognizing a target EAN-13 barcode with a width larger than 2.5 cm. The mobile base for an initial test was about 23 cm in height, while the lowest shelf was at about 18 cm above the floor. For this configuration, the lowest camera did not need to be tilted in order to provide a field of view to capture the lowest shelf. Two camera positions could capture the full height of the shelf face. For a taller mobile base (about 40 cm), the lowest camera could be arranged to point down at an angle and translated vertically, providing two tilted positions for the lowest camera.

Figure 12:
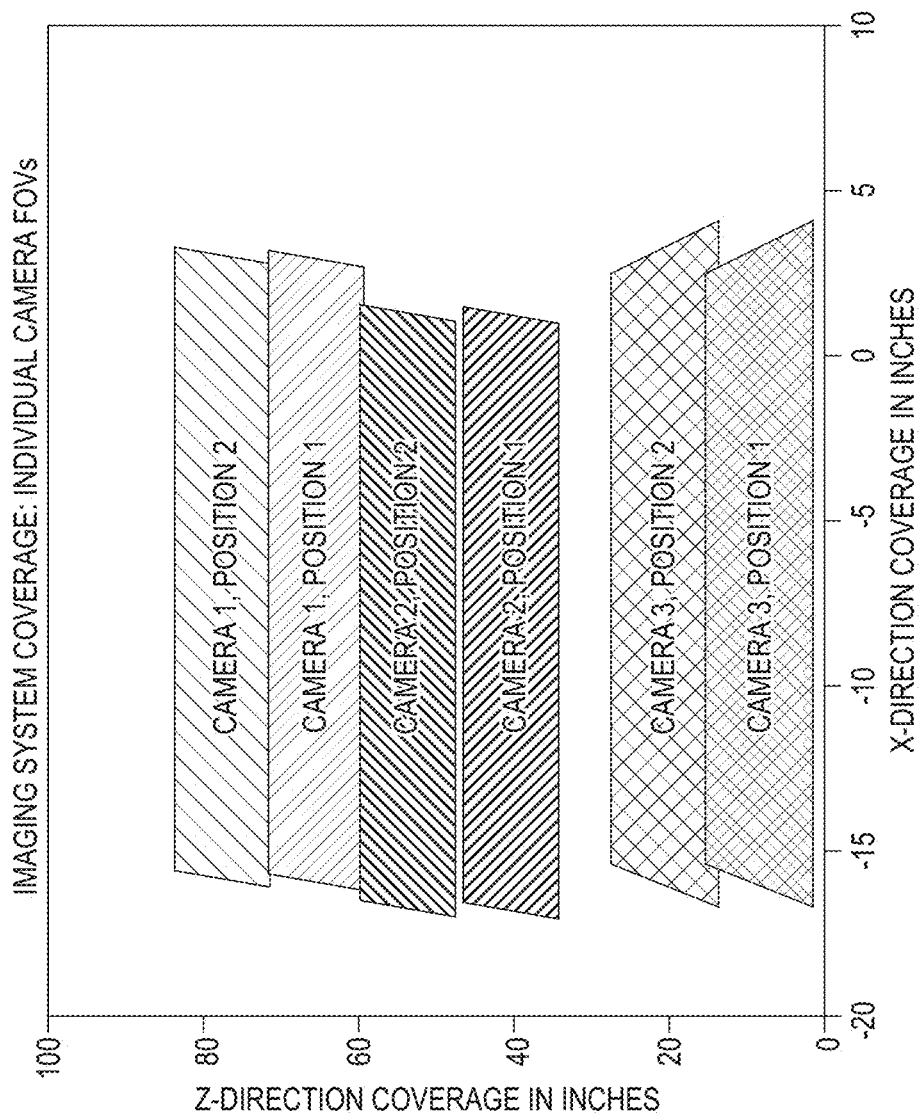
FIG. 12 illustrates a representation of an initial configuration of the image capture assembly.

After initial configuration of the image capture assembly 22 the method of FIG. 11 was used for acquiring test images (3 cameras, 2 positions) (S206), detecting landmarks and mission-specific marks (S208), decoding location or barcode information (S210), and characterizing the six camera spatial profile (3 camera×2 position) (S212). A representation of the intermediate graphical results of the camera FOVs in the x,z-plane from the MATLAB implementation is shown in FIG. 12. There is a noticeable gap of about 18 cm between the camera 2, first position and the camera 3, first position. This could be manually adjusted, at least partially. However, other characteristics can be captured from the analysis, such as individual differences in camera FOVs, misalignment among cameras, the exact amount of overlap or gaps, amount of distortions due to camera poses, etc., which are not readily detectable manually For example, camera 2, positions 1 and 2, are only marginally overlapped. If the FOV changes even slightly during the mission, a gap could be created. Camera 2 is also offset from the center, relative to the other two cameras and has the smallest FOV. Table 1 shows example raw characteristics of the cameras in the imaging system. From this data, an improved configuration of the cameras can be analytically determined of using the reconfiguration module.

TABLE 1

Example initial characteristics of the cameras in the imaging system

| Camera | center X | center Z | max X | min X | max Z | min Z | FOV1 | FOV2 | Overlap in Z |
|---|---|---|---|---|---|---|---|---|---|
| 1-up | −6.42 | 77.36 | 3.41 | −16.02 | 84.02 | 70.66 | 19.44 | 13.35 | 0.96 |
| 1-down | −6.52 | 65.05 | 3.26 | −16.05 | 71.62 | 58.34 | 19.31 | 13.28 | 1.37 |
| 2-up | −7.72 | 53.42 | 1.56 | −16.85 | 59.71 | 47.08 | 18.41 | 12.62 | 0.19 |
| 2-down | −7.80 | 41.10 | 1.44 | −16.83 | 47.27 | 34.80 | 18.28 | 12.47 | −7.18 |
| 3-up | −6.40 | 21.15 | 4.33 | −16.55 | 27.62 | 13.63 | 20.88 | 13.99 | 1.71 |
| 3-down | −6.48 | 8.95 | 4.09 | −16.50 | 15.34 | 1.48 | 20.59 | 13.86 | −1.48 |

Figure 13:
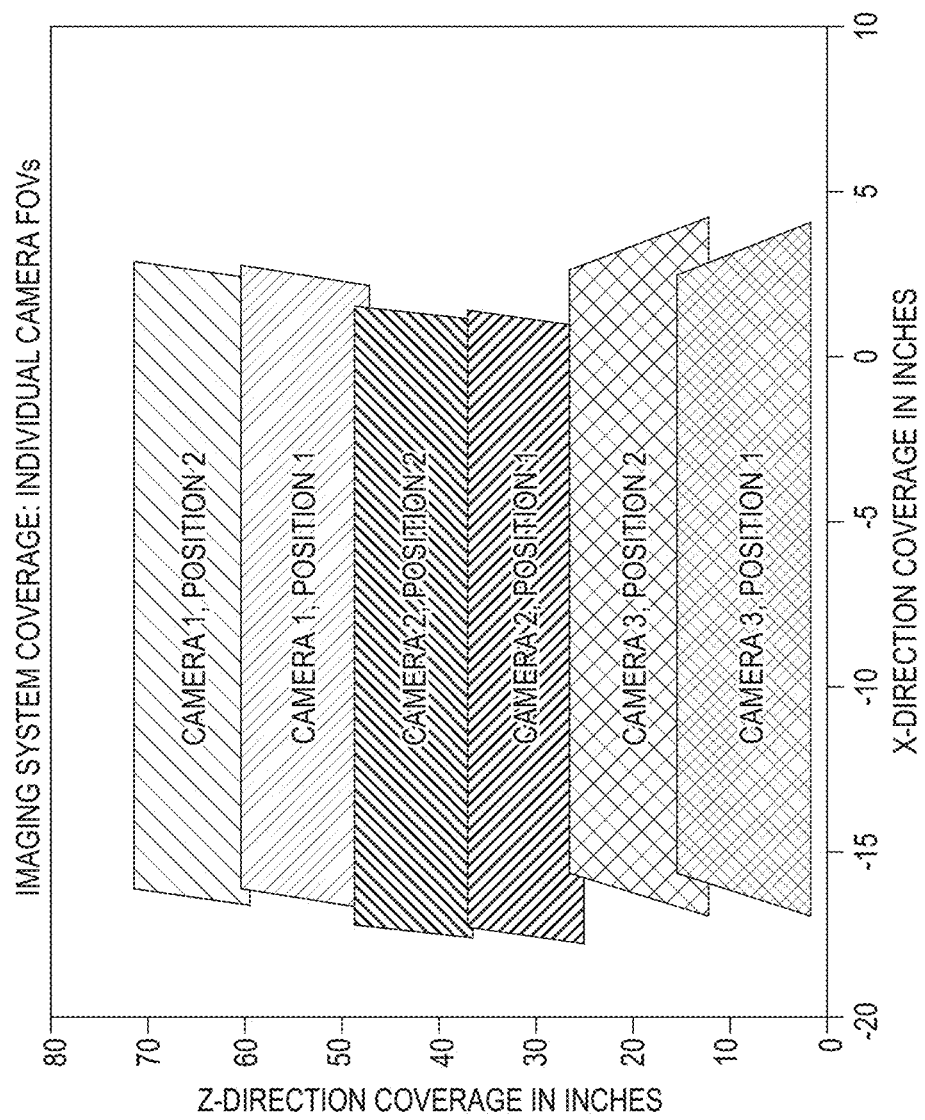
FIG. 13 illustrates a representation of a reconfiguration of the image capture assembly.

To derive a modified configuration of the image capture assembly 22, an Excel tool was built that takes inputs from Table 1 and derives a set of parameters for FOVs, camera mounting positions, and translation amount. These parameters could then be fed to a programmable control unit, such as components 76, 78, that adjusts the configuration of the image capture assembly 22. In the prototype system, however, this was achieved through manual adjustment of the image capture assembly 22 based on these suggested parameters. While this was not an ideal solution, the changes implemented (increase FOV of camera 2, lower cameras 1 and 2, change translation amount by computed parameters) increased the coverage, as illustrated in FIG. 13, as well as improving the balance of overlap in Z etc. The reconfigured image capture assembly 22 met the requirements, such as coverage of maximal height, no gap, FOV at the range of 30 to 36 cm for imaging resolution, for the retail applications of interest. The settings could be further optimized by repeating the process.

Table 2 shows characteristics after reconfiguring the image capture assembly 22 according to the computed parameters.

TABLE 2

Example raw characteristics of the cameras in the image capture assembly for second iteration

| Camera | center X | center Z | max X | min X | max Z | min Z | FOV1 | FOV2 | Overlap in Z |
|---|---|---|---|---|---|---|---|---|---|
| 1-up | −6.77 | 65.13 | 2.97 | −16.30 | 71.70 | 58.45 | 19.27 | 13.25 | 2.05 |
| 1-down | −6.87 | 53.98 | 2.81 | −16.33 | 60.51 | 47.32 | 19.14 | 13.19 | 1.20 |
| 2-up | −7.99 | 42.16 | 1.6 | −17.35 | 48.52 | 47.08 | 18.96 | 12.86 | 1.70 |
| 2-down | −8.08 | 31.00 | 1.44 | −17.40 | 37.36 | 24.58 | 18.84 | 12.78 | 1.81 |
| 3-up | −6.46 | 19.93 | 4.25 | −16.66 | 26.39 | 12.40 | 20.86 | 13.99 | 2.88 |
| 3-down | −6.53 | 8.87 | 4.03 | −16.58 | 15.28 | 1.41 | 20.62 | 13.87 | −1.48 |

These experimental results demonstrate that the automated method is beneficial and accurate for characterizing and/or configuring an imaging system for retail applications.

Figure 14:
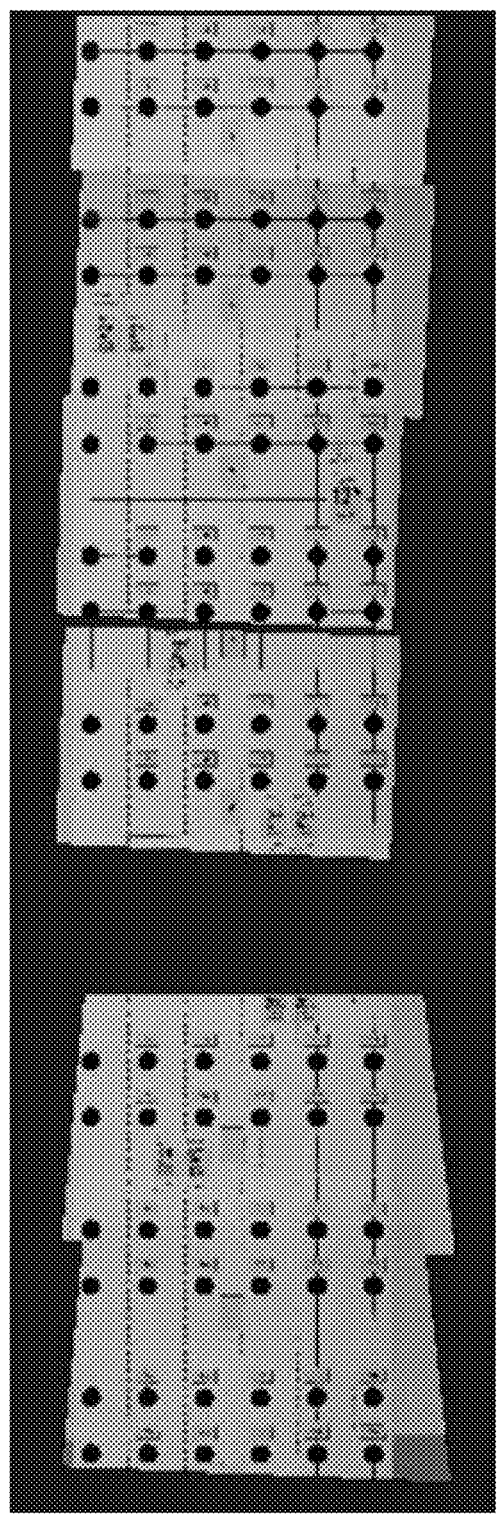
FIGS. 14 and 15 illustrate panoramas of the calibration target before and after reconfiguration of the image capture assembly generated from computed spatial profiles of the cameras.
Figure 15:
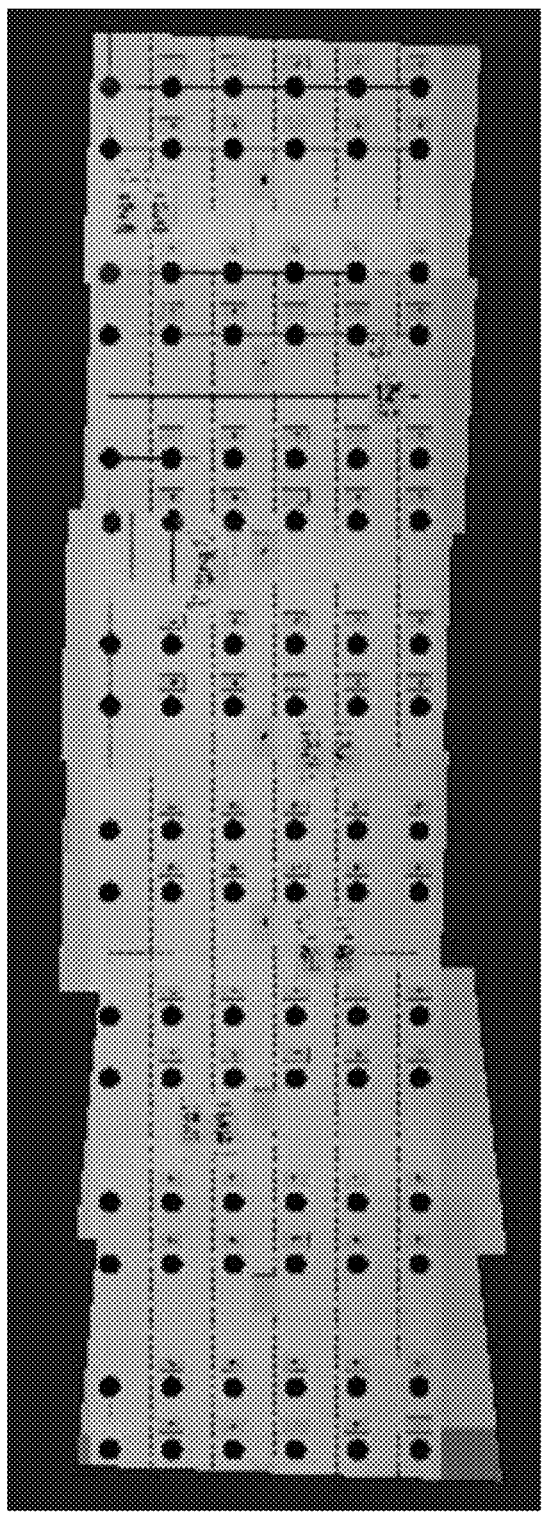

FIGS. 14 and 15 illustrate panoramas of the calibration target 140, before and after reconfiguration of the image capture assembly, which were generated from the computed spatial profiles of the cameras by applying them to the captured images. As will be appreciated, similar panoramas can be generated of a store shelf unit using the computed camera spatial profiles and may optionally be used in the generation of the store profile by stitching together multiple vertical panoramas.

As previously described above, this disclosure, as well as U.S. Patent Publication No. 2015/0363758, Published Dec. 17, 2015, by Wu et al., and entitled "STORE SHELF IMAGING SYSTEM", provides a system and method for profiling a spatial layout of product content, configuration and labeling in a retail store using one or more imaging systems on a robotic platform with appropriate resolutions for resolving features such as barcodes. The system described with reference to FIGS. 1-15 includes a mobile platform, a multi-resolution imaging module, a master control and data processing module and an optional offline image processing and profile generation module. One function of the system is to capture and process product labeling and tagging images including location data as the robot moves throughout a retail store to construct an accurate map of the floor layout and product locations in the retail store.

Described now is an improved imaging system and method for data acquisition from a multiple camera system that allows for data capture from a continuous motion robotic platform. The imaging system performs redundant image capturing allowing for correction of optical problems to reduce or eliminate the need to stop and take multiple pictures in a fixed location under different conditions, thereby speeding up the overall profiling process. In addition, the imaging system may use a low-resolution, wide-angle imager to capture a single image of an entire planogram at once to avoid stitching defects from high-resolution images. The multi-resolution imaging architecture provided herein can also be used to scan at different rates depending on the requirements mission. Some features of the continuous motion imaging processing system include configurability of the system for various shelf arrangements and various image acquisition requirements, such as resolution, illumination, etc. The continuous motion imaging system captures and processes images using a continuous motion robotic assembly, thereby avoiding many of the positional errors inherent in a robotic stop and go system.

Figure 16:
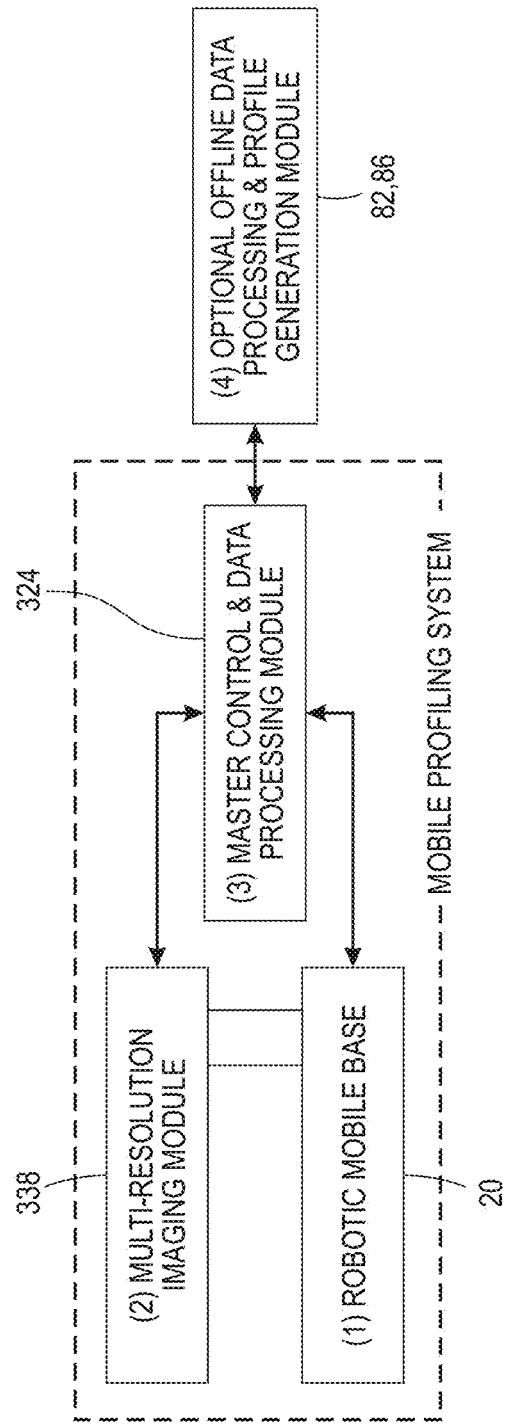
FIG. 16 is a block diagram of a continuous motion mobile store profile generation system according to one exemplary embodiment of this disclosure.

With reference to FIG. 16, an exemplary embodiment of a continuous motion robotic system and method for retail store profiling of display regular price tags, promotional price tags and facing location classification, is provided, the retail store profiling system including: (1) a robotic mobile base 20, (2) a multi-resolution imaging module 338, and (3) a master control & data processing module 324, with (4) an optional offline image processing and profile generation module (server) 82, 86. An image analysis system/method is added to the master control & data processing module previously described which calculates location correction values using the successive captured images and applies the corrections during the store profile generation to provide signage resolutions required at the shelf plane to identify individual shelf labels which are densely spaced on product displays. To increase the mission scan rate, the system captures images of sufficient quality for the most demanding image analysis case (barcode read) in parallel from relatively low cost components while the mobile base continuously moves. A multiresolution imaging system is provided to eliminate the need to perform high resolution image stitching and file handling as previously described. According to the exemplary imaging system, the high resolution system includes a plurality of separately controlled high resolution digital imagers oriented in an imaging column and providing image resolution of >=200 pixels per inch at the object plane which is sufficient for barcode detection, and the low resolution system includes a single, full fixture field of view (e.g., wide-angle) webcam imager with resolution at the object plane >=30 pixels per inch (<<200 ppi) for simultaneously capturing full planogram images.

According to another exemplary embodiment, the system and method also provides an option to run faster missions when only low resolution imaging is needed for selected analytics.

As previously described with reference to FIGS. 1-15, the Robotic Mobile Base is an autonomous robotic vehicle that has large area environment mapping, navigation and localization (position and orientation) reporting capabilities and communicates with the Master Controller Module via a bi-directional interface. To enable mission setup, the Robotic Mobile Base 20 has the capability to be "driven" around a facility and generate a 2D (or 3D) map of the store layout. This map file is then used as input to the mission planner function in the Master Controller Module 324 which allows a user and algorithms to define the scan areas and desired mission path, and calculates interface instructions for the Robotic Mobile Base 20. With mission details provided by the Master Controller Module 324, the Robotic Mobile Base 20 autonomously navigates and moves the profiling system along the prescribed path with prescribed motion and reports back its arrivals and actual positions and orientations at requested points along the path, such as points that coincide with image captures. The Robotic Mobile Base 20 has other embedded functionality to detect dynamic obstructions in its path and stop the unit and other required operational capabilities. The critical capability of the Robotic Mobile Base 20 in the profiling system is accurate localization (position and orientation) reporting back to the Master Controller Module 324 so that dense layout of objects on store displays can be properly resolved/detected in the resulting analyses. It is learned through practice that current mobile base reporting position and orientation accuracy capability at some viable cost points is insufficient for the size of objects in some retail environments to enable the robotic base to operate and report its localization under continuous motion during scanning. Described now is a modified version of the store profile generation system previously described with reference to FIGS. 1-15, the modified system providing continuous motion of the robotic base during scanning.

Further details of the continuous motion system and method will now be described.

Figure 17:
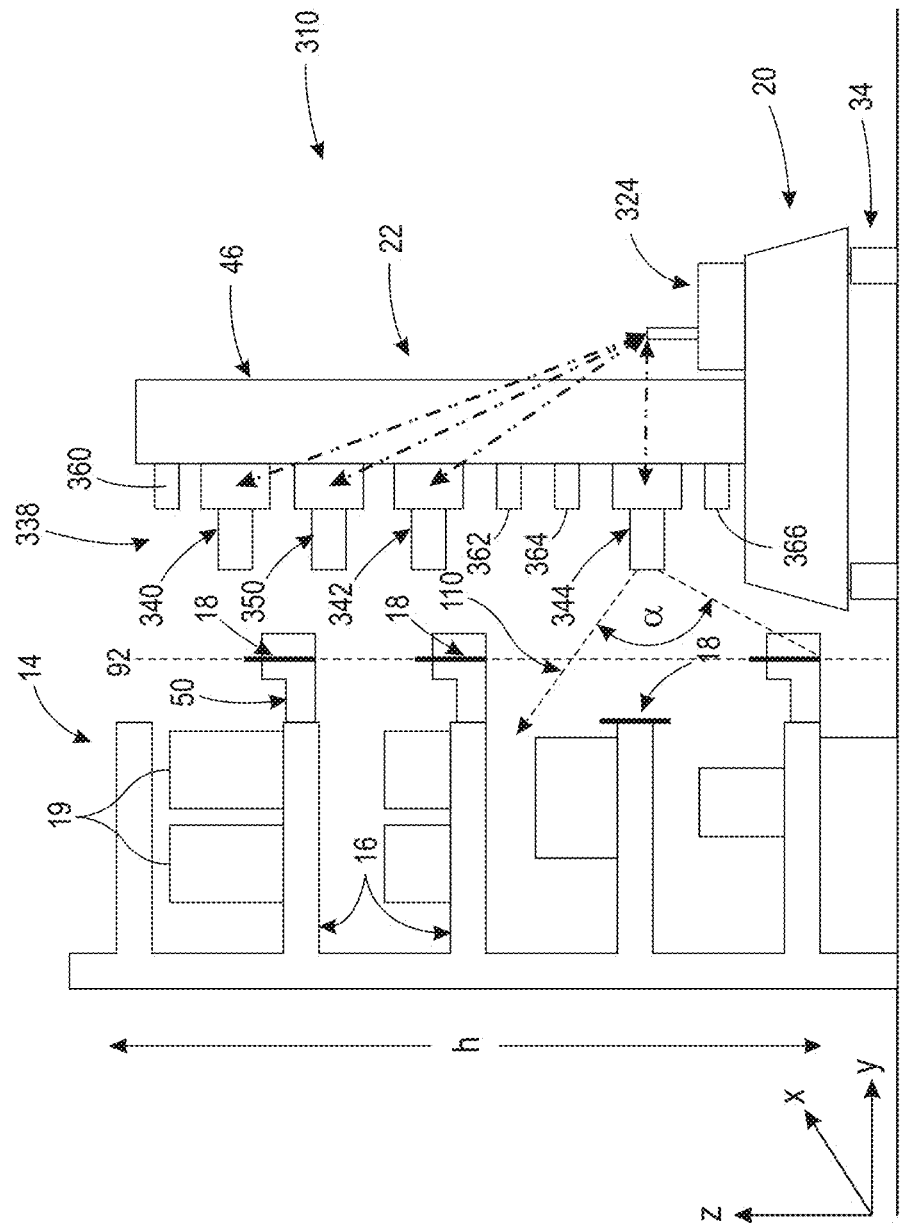
FIG. 17 is a schematic elevational view of a continuous motion mobile store profile generation system according to an exemplary embodiment of this disclosure.
Figure 18:
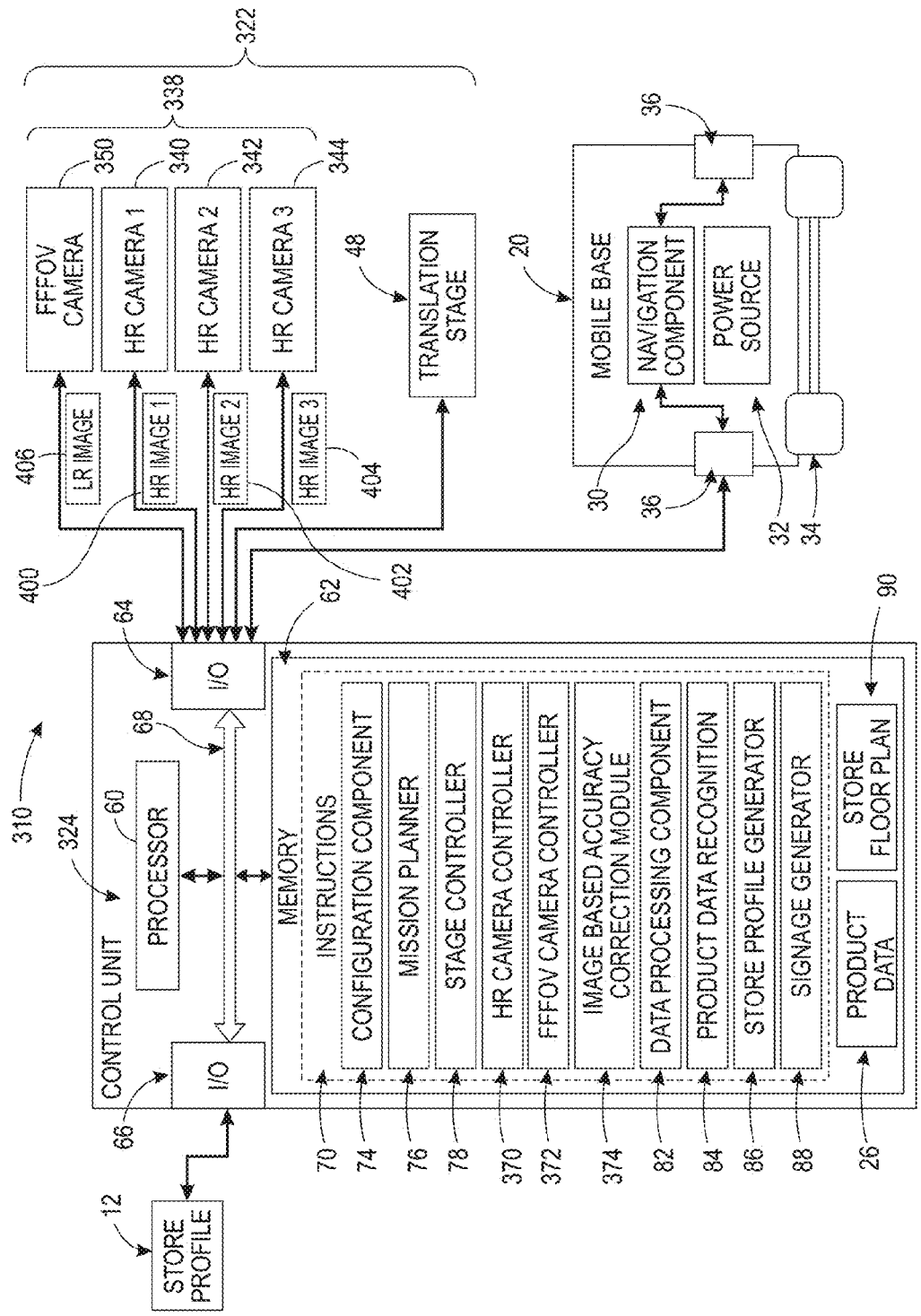
FIG. 18 is a functional block diagram of the continuous motion mobile store profile generation system in FIG. 17.

With reference to FIGS. 17 and 18, the exemplary continuous motion profile generation system 310 includes a mobile base 20, an image capture assembly 322, and a control unit 324, which are moveable as a unit around the product facility. The exemplary system 310 captures images within a product facility, such as a retail store, with the image capture assembly 322 at a sequence of locations of the mobile base 20, extracts product-related data 26 (e.g., printed barcodes and/or text from the captured product price labels) and location information from the images and the mobile base location, and constructs a store profile 12 (e.g., a 2D map, as discussed above) which defines a spatial layout of locations of the shelf labels 18 within the store.

The mobile base 20 serves to transport the image capture assembly 22 around the product facility and may be fully-autonomous or semi-autonomous. In one embodiment, the mobile base 20 is responsible for navigating the system 310 to a desired location with desired facing (orientation), as requested by the control unit 324, and reporting back the actual location and facing, if there is any deviation from the request. As illustrated in FIG. 18, in a fully-autonomous mode, the motorized mobile base 20 may include a navigation component 30 and an associated power source 32, such as a battery, motor, drive train, etc., to drive wheels 34 of the of the mobile base in order to move the system 310 to a desired location with desired facing according to a request from the control unit 324. The navigation component 30 may be similarly configured to the control unit 324 and may include memory and a processor for implementing the instructions provided by the control unit and reporting location and orientation information back to the control unit. Position and/or motion sensors 36 provide the navigation component 30 with sensing capability to confirm and/or measure any deviation from the requested location and orientation. These may be used by the navigation component for identifying the location, orientation, and movement of the mobile base for navigation and for store profile generation by the control unit. One suitable mobile base which can be adapted to use herein is a Husky™ unmanned ground vehicle obtainable from Clearpath Robotics Inc., 148 Manitou Dr., Kitchener, Ontario N2C 1L3, Canada, which includes a battery-powered power source.

In a semi-autonomous mode, the mobile base 20 is pushed by a person (e.g., as a cart), and thus the power source and optionally also the navigation component may be omitted. In some embodiments, the navigation component and sensors may be used in the semi-automated mode to confirm and/or measure any deviation from a requested location and orientation (e.g., by using voice feedback to confirm the aisle/shelf information or using image features of the scene).

The image capture assembly 322 includes an imaging component 338 which includes one or more high resolution (HR) image capture devices, such as digital cameras 340, 342, 344, that are carried by a support frame 46. In addition, the image capture assembly includes a low resolution (LR) full fixture field of view (FFFOV) digital camera 350. The image capture devices capture digital images, such as color or monochrome photographic images. The support frame may be mounted to the mobile base 20 and extend generally vertically (in the z-direction) therefrom (for example, at an angle of from 0-30° from vertical, such as from 0-20° from vertical). The HR resolution cameras are configured to capture images of a full height h of the shelf unit, or at least that portion of the height h in which the labels 18 of interest are likely to be positioned throughout the facility. The FFFOV camera is configured to capture a full height image of the shelf unit, and at least a portion of the width.

One or more of the camera(s) 340, 342, 344 may be moveable, by a suitable mechanism, in one or more directions, relative to the support frame 46 and/or mobile base 20. In one embodiment, at least one of the HR cameras 340, 342, 344 has a first position and a second position, vertically-spaced from the first position, allowing the camera to capture images in the first and second positions. In the embodiment illustrated in FIG. 17, for example, the support frame 46 includes a translation stage for moving one or more of the camera(s) in at least one direction, such as generally in the z (vertical) direction. The direction of movement need not be strictly vertical if the support translation stage is mounted to an angled support frame, as noted above. Optionally, the translation stage provides for rotation of one or more of the cameras in the x,y plane and/or tilting of one or more of the cameras, relative to the translation stage/support frame. In another embodiment, the cameras, and/or their associated mountings, may provide the cameras with individual Pan-Tilt-Zoom (PTZ) capability. The pan capability allows movement of the field of view (FOV) relative to the base unit in the x direction; the tilt capability allows the field of view to move in the z direction; the zoom capability increases/decreases the field of view in the x,z plane (which may be measured in units of distance, such as inches or cm, or angle $\alpha$, as illustrated in FIG. 17). In some embodiments, only some, i.e., fewer than all, of the cameras are moveable and/or have PTZ capability. The incremental movement of the mobile base 20 allows images to be captured along the length of the shelf unit 14 (in the x direction).

The exemplary control unit 324 provides both control of the system and data processing. The control unit 324 includes one or more dedicated or general purpose computing devices configured for performing the method described in FIG. 7 as well as methods now described to perform continuous movement and operate the HR cameras and FFFOV camera(s) independently. The computing device may be a PC, such as a desktop, a laptop, palmtop computer, portable digital assistant (PDA), server computer, cellular telephone, tablet computer, pager, combination thereof, or other computing device capable of executing instructions for performing the exemplary method. As will be appreciated, although the control unit 324 is illustrated as being physically located on the mobile base 20 (FIG. 17), it is to be appreciated that parts of the control unit may be in the image capture assembly 323 or located on a separate computer remote from the mobile base and image capture assembly.

The control unit 324 illustrated in FIG. 18 includes a processor 60, which controls the overall operation of the control unit 324 by execution of processing instructions which are stored in memory 62 communicatively connected with the processor 60. One or more input/output interfaces 64, 66 allow the control unit to communicate (wired or wirelessly) with external devices. For example, interface 64 communicates with cameras 340, 342, 344, 350 to request image capture, and/or adjustments to the PTZ settings, and to receive captured digital images from the cameras; with translation stage, where present, to adjust camera position(s); with mobile base 20 for movement of the system as a whole, relative to the shelf unit, and the like. Interface 66 may be used for outputting acquired or processed images, a store profile 12, and/or information extracted therefrom, such as to an external computing device and/or a printer (not shown) for printing and/or packaging sale signage in an appropriate order to match the store profile.

The various hardware components 60, 62, 64, 66 of the control unit 324 may be all connected by a bus 68.

The memory 62 may represent any type of non-transitory computer readable medium such as random access memory (RAM), read only memory (ROM), magnetic disk or tape, optical disk, flash memory, or holographic memory. In one embodiment, the memory 62 comprises a combination of random access memory and read only memory. In some embodiments, the processor 60 and memory 62 may be combined in a single chip. The interface 66, 68 allows the computer to communicate with other devices via a wired or wireless links or by a computer network, such as a local area network (LAN) or wide area network (WAN), or the internet, and may comprise a modulator/demodulator (MODEM), an electrical socket, a router, a cable, and and/or Ethernet port. Memory 62 stores instructions for performing the exemplary method as well as the processed data 12.

The digital processor 60 can be variously embodied, such as by a single-core processor, a dual-core processor (or more generally by a multiple-core processor), a digital processor and cooperating math coprocessor, a digital controller, or the like. The digital processor 60, in addition to controlling the operation of the computer 62, executes instructions stored in memory 62 for performing the method outlined in FIGS. 7 and/or 11 as well as methods now described for performing continuous motion and/or image based accuracy correction.

The processor 60 executes instructions 70 stored in memory 62 for performing the methods as described herein. In the illustrated embodiment, the instructions include a configuration component 74, a mission planner 76, a translation stage controller 78, a HR camera controller 370, a FFFOV camera controller 372, an image based accuracy correction module 374, an image data processing component 82, a product data recognition component 84, a store profile generator 86, and a signage generator 88. Fewer than all these components may be included in some embodiments. In other embodiments, some or all of the components may be located on a separate computing device, i.e., one which is not carried by the mobile base, as discussed above.

The configuration component 74 is used prior to a mission to configure the image capture assembly 22 (e.g., determine FOV and position(s) of the camera(s) and to provide a spatial characterization of the image capture assembly, such as a spatial profile for each camera. Each camera may have at least one camera spatial profile. A camera may have two or more spatial profiles if the camera is to be moved, relative to the mobile base, and/or its FOV adjusted, for acquiring more than one image at the same mobile base location. The camera spatial profile may be a mapping between pixel location and a location in an x,z plane to enable a mapping between pixels of each image captured at a respective camera position and a position in the x,z plane corresponding to a portion of a shelf face where the images are captured.

The mission planner 76 has access to a store floor plan 90 (layout of aisle and shelves and its facing) and the purpose of each mission. A mission may be for example, to capture all price tags throughout the store, or limited to only a part of the store, etc. Using the information in the store floor plan 90, the mission planner determines the path that the mobile base 20 should follow and communicates with the mobile base to provide the path and appropriate stop positions (where the images should be acquired by the image capture assembly). The instructions may be provided to the mobile base in a step-by-step fashion or in the form of a full mission.

The translation stage controller 78 determines the translations of the translation stage to achieve desired camera positions and communicates them to the translation stage. The HR camera controller 370 determines the camera parameters (e.g., shutter speed, aperture, ISO number, focal length, . . . ) and optionally position parameters (e.g., pan, tilt, zoom, or vertical translation amount . . . ) of the cameras in the image capture assembly for each position that requires image acquisition. These parameters may be fixed throughout the mission and/or adjusted dynamically based on current location information of the mobile base (e.g., distance to the shelf to be imaged, the facing angle, height of the shelf . . . ). As will be appreciated, translation stage controller 78 and HR camera controller 370 may form parts of a single component for controlling the acquisition of images by the image capture assembly 22.

The image data processing component 82 processes the images acquired by all the cameras and uses the mapping provided by the configuration component and position information provided by the mobile base to map pixels of the captured image to locations in 3D space.

The product data recognition component 84, which may be a part of the image data processing component 82, analyses the processed images for detecting price tag locations, extracting product data 26, such as price tag data, and performs image coordinate conversion (from pixel position to real-world coordinates).

Outputs of the data processing component 82 and/or product data recognition component 84 may be used by the store profile generator 88 to determine the store profile 12 (e.g., the real-world coordinates of detected and recognized UPC codes). In some cases, outputs of the data processing component 82 and/or product data recognition component 84 are used by the translation stage controller 78 and/or HR camera controller 370 and FFFOV camera controller 372 to determine what should be the appropriate camera parameters and/or position parameters for the next image capture. Some outputs of the data processing component 82 and/or product data recognition component 84 may be used by the mission planner 76 to determine the next positional move for the mobile base 20.

Multi-Resolution Imaging Module (338)

The function and requirements of the Imaging Module 338 is to capture a series of images of shelf display areas with the necessary image quality and resolutions required for acceptable capture rates of signage (with barcodes) and product facing detection in real retail environments while minimizing cost, power, mission times, computation and file handling requirements, etc. To provide faster mission times, images are captured while the mobile base is moving at a sufficient continuous speed with relatively low cost components to achieve other system requirements. The exemplary embodiment previously described with reference to FIGS. 1-15 and disclosed in U.S. Patent Publication No. 2015/0363758, by Wu et al., published Dec. 17, 2015, and entitled "STORE SHELF IMAGING SYSTEM" remain valid and can be supplemented to extend the capabilities of the store shelf imaging system and method. Specifically, the previously described store shelf imaging system and method includes a multi-resolution imaging module which cooperates to read barcodes associated with product labels. The exemplary store shelf imaging system now described includes a separately controlled High Resolution Imaging Column for signage with barcode recognition and a Low Resolution full field of view imager for product facing recognition, where a parallel distributed micro-controller arrangement is used for simultaneous imager control, image download and optional localized image analysis and processing.

1. High Resolution Imaging System for Signage with Barcode Recognition

Figure 19A:
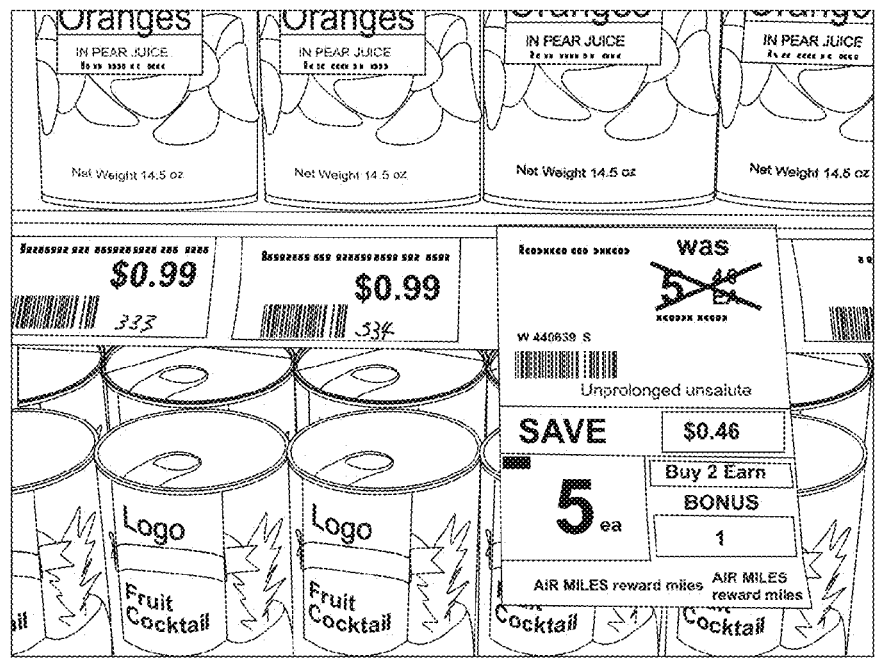
FIGS. 19A and 19B show examples of typical (a) shelf regular and promotional signage; (b) pegboard signage.
Figure 19B:
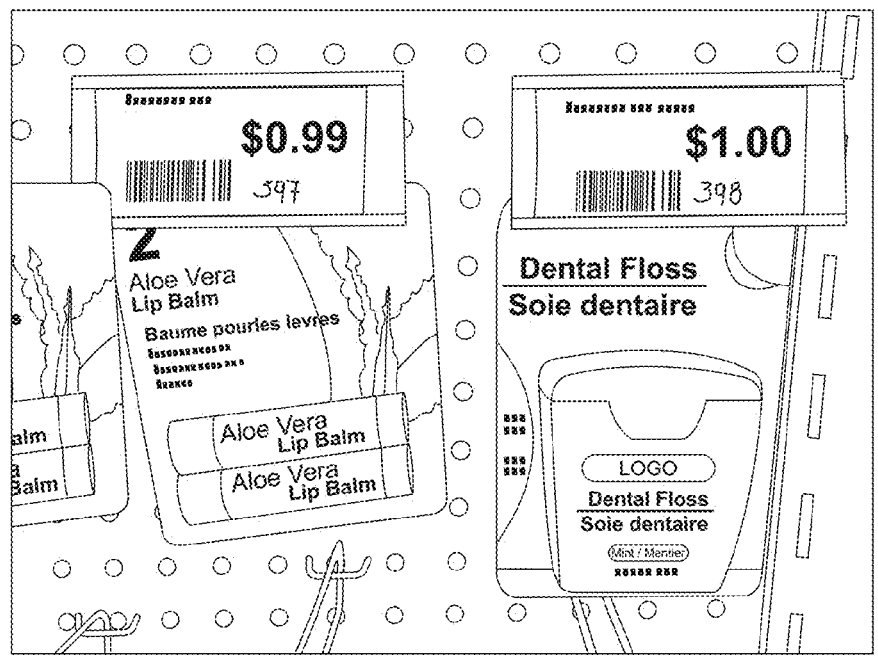

In targeted retail environments, regular display and promotional price tag signage are commonly found on shelf edges underneath the product facing locations as shown in FIG. 19A and in holders at the top of pegboard hooks of various depths displaying products as shown in FIG. 19B, as well as other fixture types.

Printed 1D barcode widths on retail display signage for regular price tags and promotional price tags are commonly observed to be on the order of 20-25 mm (~1") width encoding a variety of standards schemes such as EAN-13, etc. Experimentation has quantified that a minimum image resolution at the object plane to successfully detect and decode the barcodes with image analysis in this size range is on the order of >=200 ppi. The minimum required resolution can also be approximated theoretically via the following reasoning: (1) EAN-13 for SKU has about 35 bars in the SKU, (2) EAN-13 uses 4 different bar-widths for encoding, and (3) typical (or minimal) width of the SKU barcode is about 1 inch. Therefore, the minimum resolution required is 35×4=140 ppi for a monochrome sensor. For a color sensor (camera), some loss of resolution is inevitable due to the use of the Bayer pattern in the imager and, conservatively, the resolution requirement is doubled (i.e., 280 ppi). However, in practice it is found that >=200 ppi is sufficient from extensive tests performed if the images of barcodes are in-focus. The formula, $$\text{Min. resolution} \approx \frac{(\text{Max \# of bars in the } SKU \text{ barcode}) \times (\text{\# different barwidths } n \text{ the coding scheme})}{\text{Min. width of the barcode}} \times (1.5 \sim 2),$$

provides a good rule of thumb for determining the minimum resolution.

A. Field of View, Overlap/Redundancy and Depth of Focus

Due to the observed non-systematic nature of the vertical location and number of shelves and pegboard hooks in displays throughout an entire aisle or store, there are advantages associated with reduced cost and complexity to simply provide an imaging "column" including: full coverage of the entire vertical display field of view where a barcode tag may be located, which is typically 6-7' above the floor for many retail environments; sufficient resolution at the object plane as described above; sufficient depth of focus for pegboard hooks of various depths with respect to normal shelf edge location; and sufficient illumination and optical settings during image capture while moving to provide sufficient image quality for recognition. To provide an imaging "column" of sufficient resolution with minimum number of low cost imagers, n digital cameras are arranged vertically and at an appropriate focal distance and field of view to cover the desired maximum display signage height. Furthermore, due to variations in the robot position with respect to the target position the imagers' vertical and horizontal fields of view with respect to the object plane will vary so overlap in the captured images vertically and horizontally is built in to the system to account for these variations so there are no "gaps" in captured display areas where a signage barcode is not captured sufficiently to be recognized in at least one image.

In addition to this minimum requirement of FOVs, the exemplary embodiment also specifies a larger overlap in the horizontal direction (e.g., redundancy) to ensure there are at least two opportunities provided in the sequence of images for each tag to be recognized taken at different optical vantage points. Experimental results have shown this approach to be effective in mitigating glare issues and increases service recognition rates. To enable continuous motion image capture for acceptable mission times and meet the other imaging requirements for quality and redundancy previously described, the imager control and image download for the 1-to-n devices is parallelized by providing 1-to-n respective micro-controllers with associated file storage for each device. With this approach, the entire captured and downloaded image system duty cycle coordinated by the Master Controller Module 324 can be achieved quickly, for example, in <=3 seconds, according to the exemplary embodiment described, which is an enabler for the desired horizontal redundancy.

B. Embodiment Coordinated Critical Parameters (CPs)

An exemplary embodiment of a high resolution imaging system for signage with barcode detection under continuous motion as described herein has been developed, implemented and tested with coordinated parameters as shown in Table 3 below.

TABLE 3

Coordinated CPs of one embodiment of a High Resolution Imaging System for Signage with Barcode Detection under Continuous Motion with consumer grade, low cost imagers

| Name/Description | Spec/Requirement | Min | Nom | Max | 2 * Sigma | units |
|---|---|---|---|---|---|---|
| Label Imageable FoV-V (floor ref.) | | | | 2133.6 (7') | | mm |
| Label Mission Rate/speed | | 60 | | | | mm/s |
| Label imager model | Canon EOS Rebel SL1 DSLR | | | | | |

TABLE 3-continued

Coordinated CPs of one embodiment of a High Resolution
Imaging System for Signage with Barcode Detection under Continuous Motion
with consumer grade, low cost imagers

| Name/Description | Spec/Requirement | Min | Nom | Max | 2 * Sigma | units |
|---|---|---|---|---|---|---|
| Label Imager Lens | 18-55 mm; f/3.5-5.6 | | | | | |
| Shutter speed | 1/640 | | 1/640 | | | |
| Aperture | camera controlled | | | | | |
| Focal Length | | | 35 | | | mm |
| Label image resolution at object plane-H | | 250 | 266 | 283 | | ppl |
| Label Imaging focal distance to tgt | | | 863.6 (34") | | | mm |
| Label image FoV-V | | 309.9 (12.2") | 330.2 (13") | 350.5 (13.8") | | mm |
| Label image FoV-H | | 464.9 (18.3") | 495.3 (19.5") | 525.8 (20.7") | | mm |
| Label image Overlap-V | | 6.1 (0.24") | 25.4 (1") | 44.7 (1.8") | | mm |
| Label Imager-Imager Spacing-V | | | 304.8 (12") | | | mm |
| Label image Overlap-H (redundancy) | | 63.5 (2.5") | 190.5 (7.5") | | | mm |
| Label image capture rate (redundancy) | | | 304.8 (12") | | | mm/capture |
| Label image capture + download time | | | 2.5 | 3.0 | | sec |
| Illumination intensity range | | 1200 | 1400 | | | Lux |

2. Low Resolution Imaging System for Product Facing Recognition

In addition to regular and promotional tag store profiling, display facing profiling capability is provided. Display facing profiling involves providing full planogram field of view images to either an external service or an internal image analysis processing module that will identify actual products and their locations on a display or otherwise classify a facing location as "empty". Product identification is typically done via image processing techniques comparing the segmented product images from the store scan with a product reference image library.

For the product facing recognition function, lower resolution images on the order of >20 ppi at the object plane is sufficient. This is an order of magnitude lower than the >=200 ppi requirement for the barcode detection images and process, which requires the High Resolution Imaging System.

A. Field of View, Computation Resources and Image Quality

Full vertical and horizontal field of view images from the store are typically required for appropriate display sections (e.g., planogram widths) for this function. According to the exemplary embodiment described, the requirement is to cover displayed products 0-8 feet high and planogram typical widths of 2, 4, 6 & 8 feet. These images could be generated by stitching multiple high resolution images together vertically and horizontally from the high resolution system, or by stitching multiple low resolution images together vertically and horizontally or only vertically if the fields of view were acceptable in width but not vertically to cover the 0-8 feet product facing service requirement. In practice there are several issues with stitching images together to generate the full field of view images for this analysis: robot position errors for successive images can cause discontinuities or distortions in the stitched image that are expected to reduce the recognition rates for product identification, and additional computing processing time and memory resources are required. In addition, a physical constraint is that any separate imager(s) for capturing these images must be able to operate at a focal distance close enough to the object plane for the high resolution imaging system to capture images for all profiling analyses to be acquired in a retail store during the same mission. The exemplary embodiment provided here includes a separate, single large field of view imager with distortion correction that captures the full field of view at required resolutions without the need for stitching smaller images in the vertical direction. This approach has an efficiency advantage for image capturing and handling of files, and provides the valuable option of running a faster low resolution only scan mode for the service.

B. Embodiment Coordinated Critical Parameters

An exemplary embodiment of a low resolution imaging system for product facing detection under continuous motion has been developed, implemented and tested with parameters as shown in Table 4 below.

TABLE 4

Coordinated CPs of one embodiment of a Low Resolution
Imaging System for Product Facing Detection under Continuous Motion with
consumer grade, low cost imager.

| Name/Description | Spec/Requirement | Min | Nom | Max | 2 * Sigma | units |
|---|---|---|---|---|---|---|
| Product Imageable FoV-V (floor ref.) | | | | 2438.4 (8') | | mm |
| Product Mission Rate/speed | | 60 | | TBD | | mm/s |
| Product imager model | GoPro Hero 4 Silver | | | | | |

TABLE 4-continued

Coordinated CPs of one embodiment of a Low Resolution Imaging System for Product Facing Detection under Continuous Motion with consumer grade, low cost imager.

| Name/Description | Spec/Requirement | Min | Nom | Max | 2 * Sigma | units |
|---|---|---|---|---|---|---|
| Product imager shutter speed | Auto | | | | | |
| Product image lens focal length | | | 14 | | | mm |
| Product imager lens aperture | f/2.8 | | | | | |
| Product image resolution at object plane-H | average | 20 | 30 | | | ppi |
| Product image resolution at object plane-V | average | 20 | 24 | | | ppi |
| Product imaging local dist to tgt | | | 889 (35") | | | mm |
| Product Imager CL dist from floor | | | 1282.7 (50.5") | | | mm |
| Product Image FoV-H | at field centerline | | 1905 (75") | | | mm |
| Product Image FoV-V | at field centerline | | 3175 (125") | | | mm |
| Product Image FoV-V from floor | | | 2870.2 (113") | | | mm |
| Illumination intensity range | | 1200 | 1400 | | | Lux |

Figure 20:
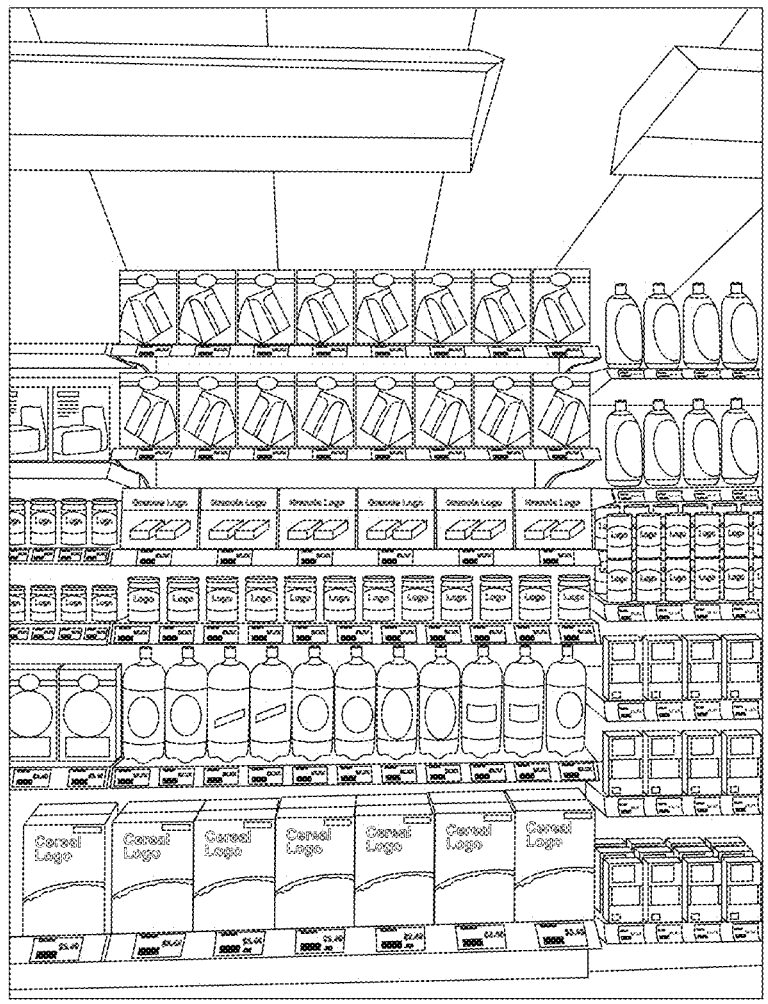
FIG. 20 shows a corrected scan image from a low resolution imaging system sufficient for product facing recognition analysis according to an exemplary embodiment of this disclosure.
Figure 21:
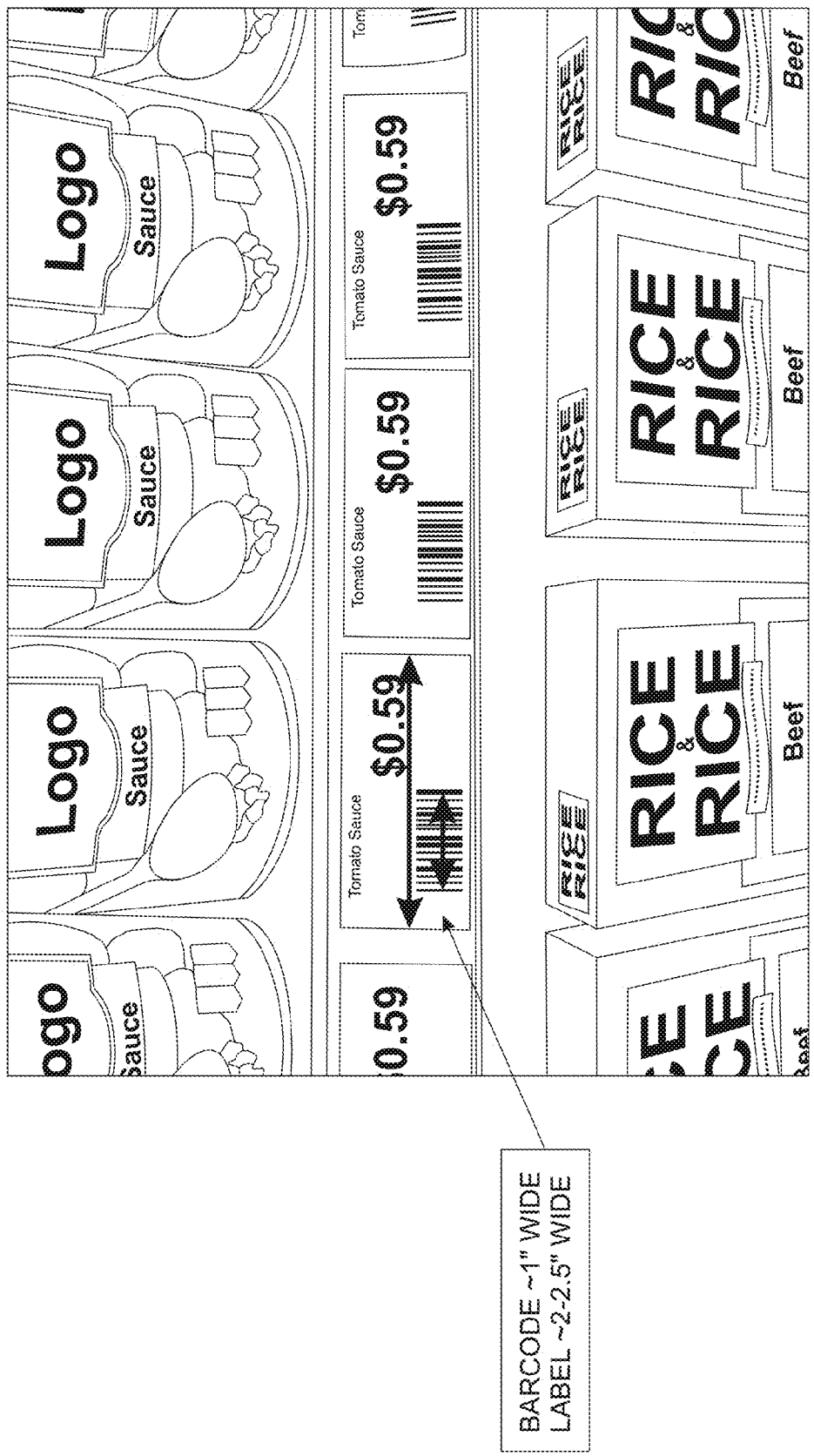
FIG. 21 shows an example of densely packed labels on a retail store shelf.

FIG. 20 shows a sample corrected scan image capturing a full planogram width.

3. Master Control & Data Processing Module (324)

This module includes the Mission Planning and Route Controller Module 76; Imaging Controller Module 370, 372; and Image and Data Processor 60. The Mission Planning and Route Controller Module allows a user to interact with an application to easily lay out the scan mission(s) paths and objectives and automates the generation of the corresponding instructions and necessary communications with the robotic mobile base to complete the prescribed mission.

These functions are modified for the continuous motion scanning exemplary embodiment. The Imaging Controller Module 370, 372 coordinates the settings and control of the imaging systems, on-board illumination source(s) and image file handling with the rest of the system to provide parallel control and file download of each imager, a multi-resolution imaging system and continuous motion imaging. The Image and Data Processor Module includes an Imager Spatial Characterization Module 74 which captures calibration information for the imaging systems to enable refined conversion of spatial information in pixel coordinates with real world coordinates; Image Processing Modules 82, 370, 372 which detect, locate and classify the required objects in the images such as signage UPC codes, promotional signage and product facings; Image-Based Accuracy Correction Module 374, which conducts image analysis on successive image columns to generate correction values to the robotic position and angle reporting values necessary for achieving required overall accuracy of the profiling system; and Data Analysis 82 and Profile Generation Module 86 which integrates all of the spatial data and corrections required with the outputs of the image analysis to generate the store profiles, or optionally transfer all or selected images and data off the system for final analysis and profile generation.

A. Image-based Accuracy Correction Module (374)

This correction method and system are disclosed in co-pending U.S. patent application Ser. No. 15/294,937, filed Oct. 17, 2016, by Venable et al., and entitled "STORE SHELF IMAGING SYSTEM AND METHOD", which is incorporated by reference herein in the context of a full system solution as part of the Master Control and Data Processing Module. In practice, such a solution may be required to meet the requirements of tag size and spacing commonly observed in actual retail environments. An advantaged aspect of this system embodiment is the corrected position values can be applied to the acquired data in the processing module to correct the profile generation processing and output, and do not need to be fed back into the robotic mobile base for control and update purposes, thus maintaining a simpler interface with the robotic mobile base.

The image analysis-based system and method improve the reporting of location and orientation of indoor robots where Global Positioning systems are inaccessible and standard mapping and localization algorithms (e.g. SLAM) do not provide the required accuracy.

In retail robotics applications, autonomous robots traverse a store performing one or more missions that involve analysis of the store shelf contents. As previously described, one such mission is to read the barcodes that are present on the shelf edges; another mission might be to determine empty store shelves for restocking. Such missions may require capturing high resolution images of the shelves for reading barcodes; capturing low resolution images for product identification by image analysis, or using depth information sensors such as LIDAR, or Kinect to identify "gaps" in the product presentation (missing products).

In any of these missions it is imperative that the location and orientation of the robot is well known when data is captured so the analytics can identify the location of items along the aisle (geotag) accurately. According to an exemplary embodiment, the autonomous robots use an algorithm based on the SLAM (Simultaneous Localization and Mapping) architecture to simultaneously understand the location of the robot and update the "store map". This allows a device to be constantly updating its view of the environment and be able to handle changes in the environment. However, this algorithm makes heavy use of statistical algorithms applied to noisy sensor data and does not meet the high positional accuracies required by the retail robotics missions. One uses SLAM in combination with an appropriate path planning algorithm to move the robot to a specified point on the store map (technology provided by the robot vendor), but there are limits to how accurate the robot can achieve the desired location.

Figure 22:
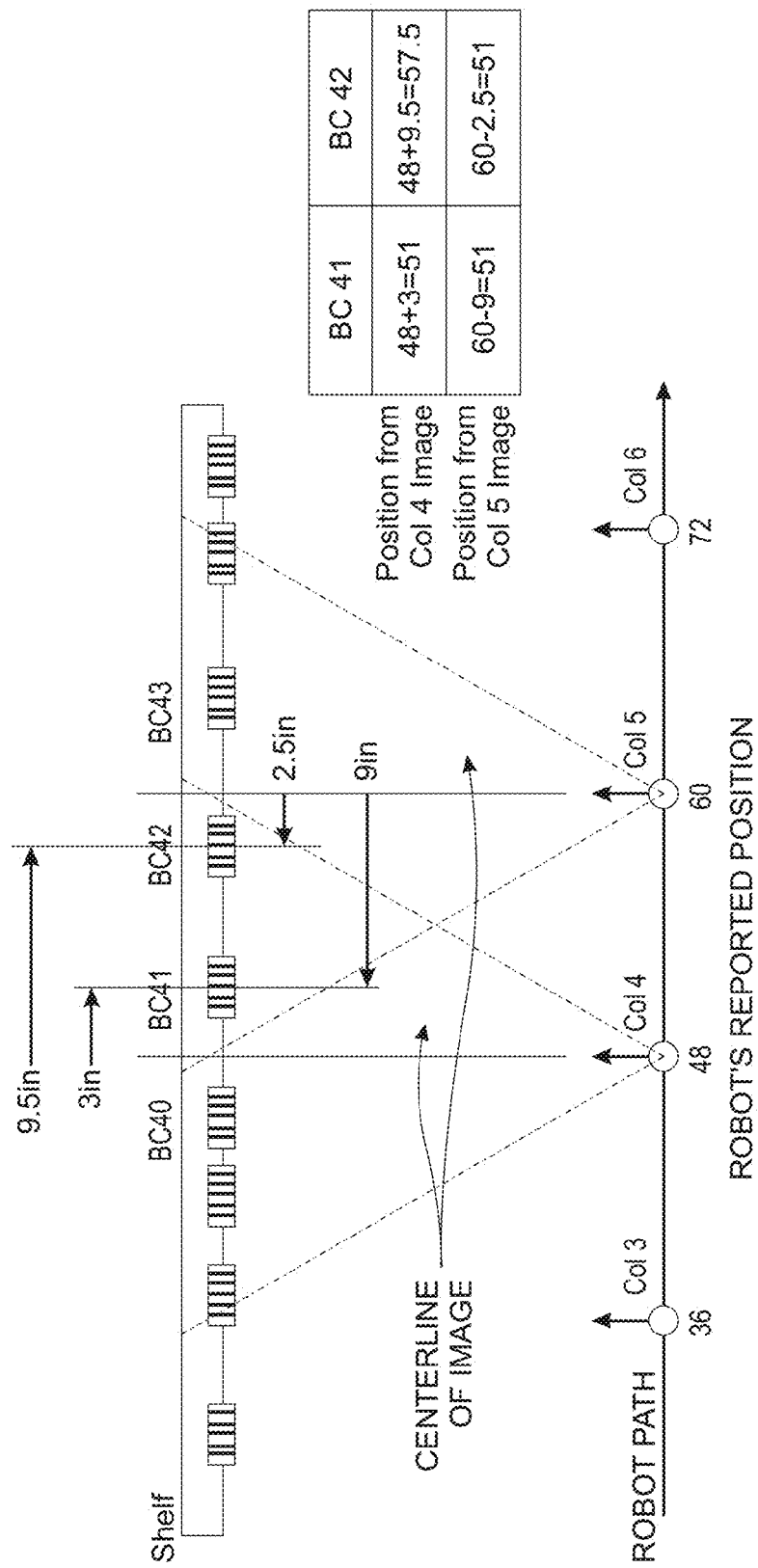
FIG. 22 is a diagram showing an ideal case where localization and orientation are ideal and the resulting evaluated locations of barcodes visible from adjacent images exactly align.
Figure 23:
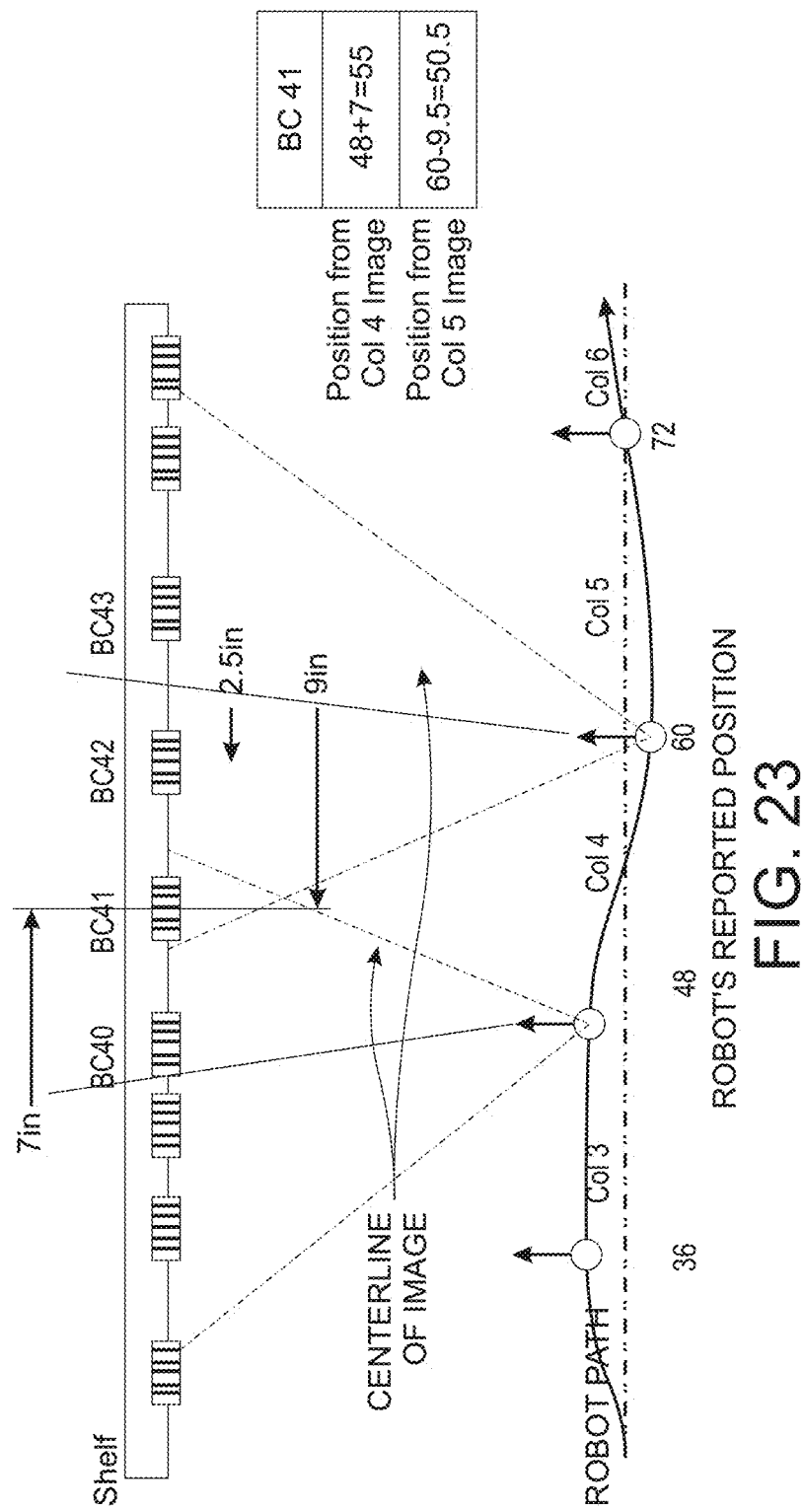
FIG. 23 is a diagram showing a real world case where localization and orientation are not accurate and results in an error in barcode localization of 4.5 inches.

For example, in the case of barcode reading, an exemplary robot takes high resolution images approximately every 12 inches; for the given optics this allows a horizontal overlap between successive images of about 6 inches; because of the large overlap many barcodes will be visible in two successive images (on the right of the first image and on the left of the second image). This is done intentionally so that if glare makes a barcode unreadable in one image, it may be readable in the next. If the robots orientation is off by just one degree from expected then the evaluated position of the barcode can be off by 0.5 inch; if the location of the robot down the aisle is off by an inch then the detected barcode location will be off by an inch; if the distance to the shelf is off by 2 inches, the barcode location can be off by another 0.5 inch. Combining the errors together can easily yield an error in the evaluated position of the barcode of +/−2 inches or more. If the same barcode is visible in two successive frames and the geotagging errors are significant, then the system will not realize the barcode is the same and will consider it two separate barcodes of the same kind, e.g., same UPC. This is called a product facing error (the system sees more product barcodes than it should) and causes errors in the data analytics to be performed on the captured data, e.g., compliance testing. In our prototype systems this has been a frequent problem. Orientation errors have been up to 4 degrees, and positional errors up to 3 inches. The figures described below illustrate this problem. FIG. 22 shows the ideal case where localization and orientation are ideal and the resulting evaluated location of barcode visible from adjacent images align exactly; FIG. 23 shows the real world case where localization and orientation are not accurate and results in an error in barcode localization of 4.5 inches.

Simply speaking, the autonomous robot cannot reliably report its location and orientation to the high accuracy that is needed for reliable analysis of the data captured during the mission using SLAM alone. Provided herein is a technique based on image analysis that allows more accurate tracking and correcting for the robot motion down the aisle as opposed to distance from the aisle or orientation. Distance to the aisle and orientation can be measured using the LIDAR or other sensors, but travel down the aisle, according to an exemplary embodiment, has relied on accurate wheel encoder monitoring which is susceptible to many errors (tire pressure, slippage, etc.).

Two new techniques are presented here that are based on low resolution images captured by the system to determine the actual distance travelled down the aisle. These images can be obtained from the high resolution cameras 340, 342 or 344 or from the low resolution webcam 350.

A.1. Image Correlation

The first technique is based on image correlation and the associated algorithm is described below:

1) Determine the field of view of the cameras (FOV) as part of system setup. For example, according to one exemplary embodiment, the cameras we are using have a FOV of ~18.5 inches, i.e., each image captures about 18½ inches of shelf space horizontally.

2) At each imaging location $X_i$ down the aisle record the distance down the aisle as measured by the robot, i.e., the SLAM-based measurement. Let the distance between the last imaging location $X_{i-1}$ and the current imaging location $X_i$ be defined as $\delta_i = X_i - X_{i-1}$.

3) Generate low resolution grayscale images from the current imaging location $l_i$ and the previous imaging location $l_{i-1}$; in the POC (Proof-Of-Concept) implementation 256× 256 images were used.

Figure 24A:
FIGS. 24A and 24B show an example of the image alignment using only the robots reported position.
Figure 24B:

4) Given the field of view of the cameras (FOV), overlap the images $l_i$ and $l_{i-1}$ such the centers of the two images are separated by what the robot thinks was the separation between imaging points, i.e., $\delta_i$. There will be a significant overlap between the images defined as $\sigma = W - \delta_i$. where W, H are the width and height of the images, respectively. FIGS. 24A and 24B show two images positioned with the overlap a, FIG. 24A shows the images separated vertically to show the full images; and FIG. 24B shows the images overlapping. If distance $\delta_i$ was accurate, a very good alignment would be indicated between the overlapping images. In this case, it is seen there is an error in the $\delta_i$ value.

5) Now perform a cross correlation-like function between the two shifted images where the algorithm slides one image over the other and looks for the minimum of the sum of differences.

$$F(s) = \sum_{x'=-s}^{s} \sum_{y=0}^{H-1} \text{ABS}(X'_{i+1}(x' + W - \frac{\sigma}{2}, y) - X'_i(x' + \frac{\sigma}{2}, y))$$

Where the images align exactly, the resulting value will be close to 0. Therefore, the value of s that corresponds to the minimum of the F(s) will correspond to the best alignment between the images, $S_{opt}$. Note that for some shelves, where the number of product facings is large, it is possible to have multiple minimum of F(s). Furthermore, there exist noises intrinsically in the imaging system. Therefore, a preferred embodiment of this correlation step is to take average or median value of all values from applying the search of $S_{opt}$ on all images available from one imaging position and/or limit the search range of $S_{opt}$ with a priori information such as the known specs of the robot.

Figure 25:
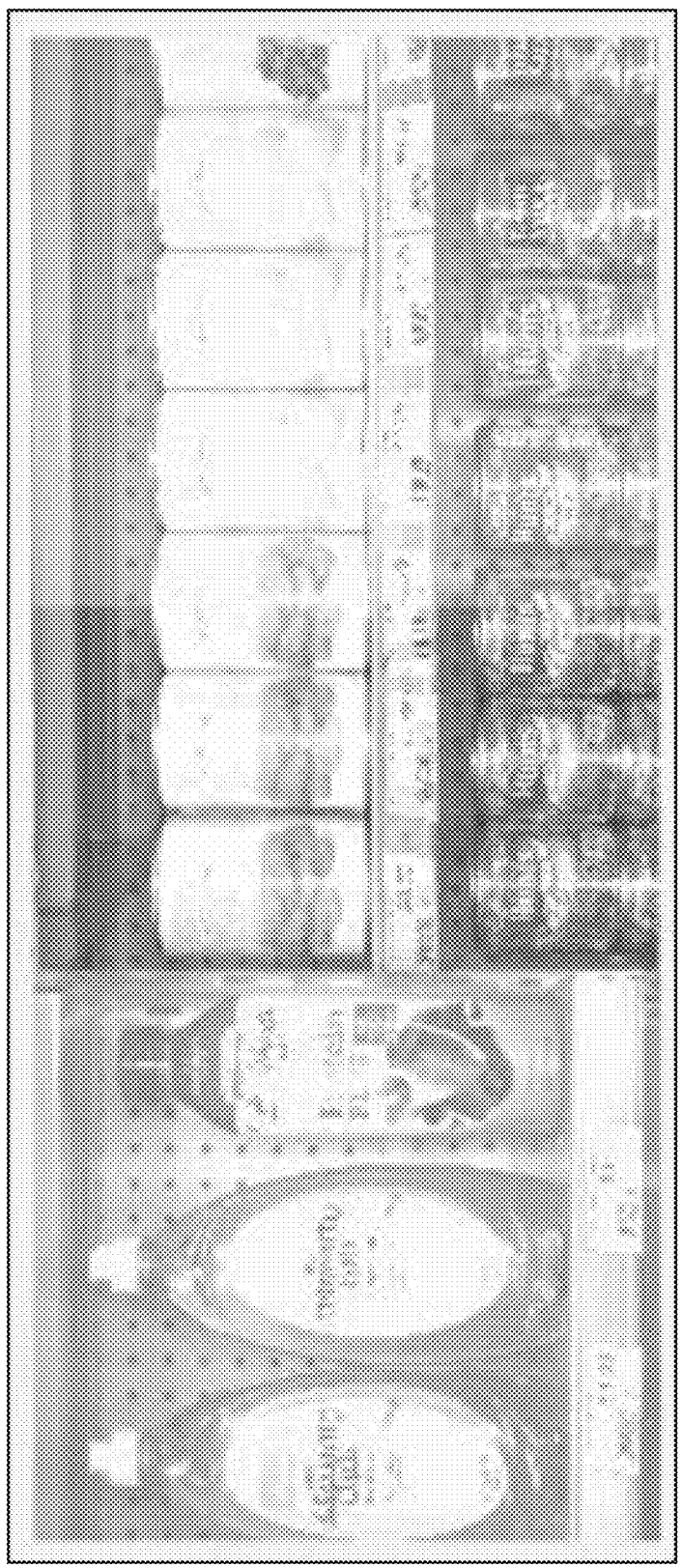
FIG. 25 shows an example of image alignment using image-based accuracy correction according to an exemplary embodiment of this disclosure.

FIG. 25 shows the overlapping images after the correlation algorithm is applied. The algorithm calculated a −0.51 inch shift was necessary to "align" the images; this shift value can be used to correct the robots understanding of its location and hence better localize the detected barcodes.

6) Apply the calculated shift to correct the robots estimate of its location.

Figure 26:
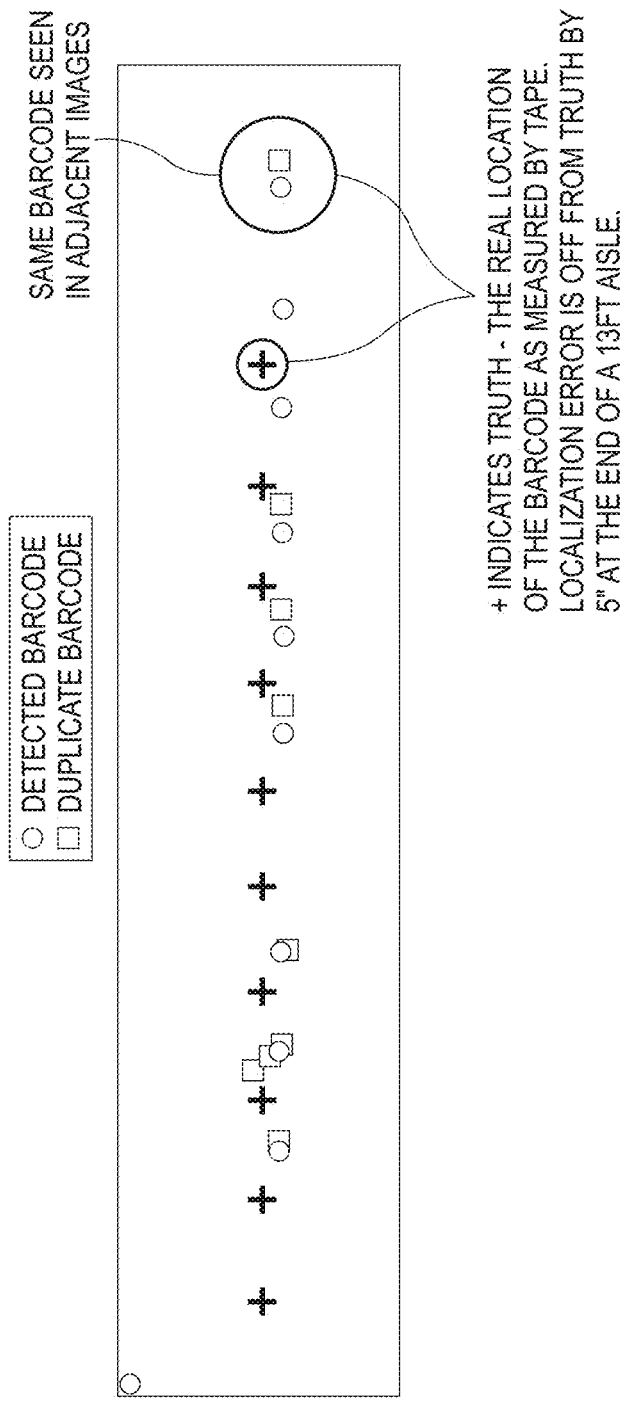
FIG. 26 is a diagram showing the location of detected barcodes without any correction to localization.
Figure 27:
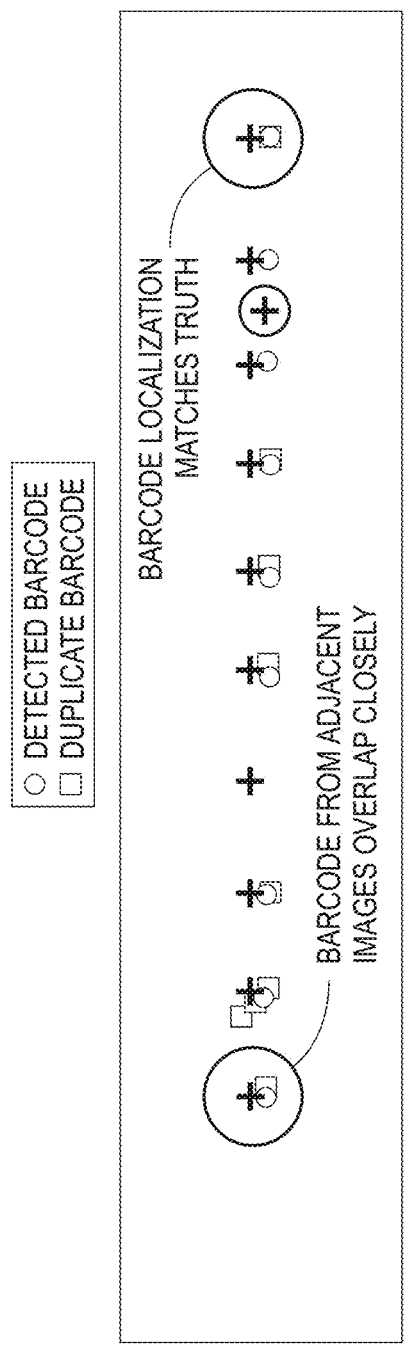
FIG. 27 is a diagram showing the same dataset shown in FIG. 26, except using the image-based accuracy correction system/method according to an exemplary embodiment of this disclosure.

This algorithm has been implemented and shown to improve the localization accuracy of the barcode detection. FIG. 26 shows the location of detected barcodes without any correction to localization. The circles and squares represent detected barcodes along the aisle—a square indicates a barcode the system software decided was a duplicate of a circle code; the '+' symbols represent actual truth—the actual physical location of the barcodes along the aisle as measured by a tape measure. The circles draw attention to a few positioning errors. FIG. 27 shows the same dataset but using the correlation correction described in this disclosure. Clearly, localization errors are significantly reduced.

Also, there may be some advantage to performing some pre-filtering on the images to remove "flat" areas that might bias the results.

Although this technique works very well, it is suspected that it may be less effective in the presence of shelf noise, e.g., where products are not all fully faced (at shelf edge) but some products are pushed back from the shelf edge. In those cases, the binocular disparity evident in the two images may reduce the effectiveness of correlation.

A.2. Harris Corners Detection

Figure 28:
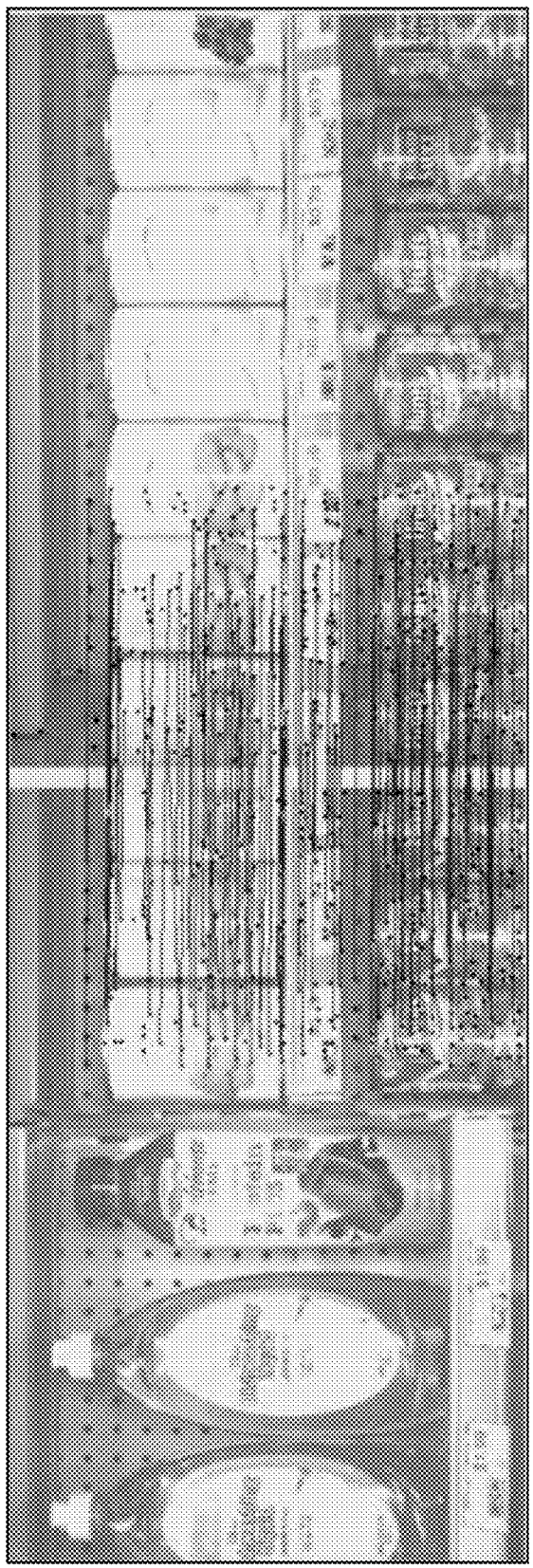
FIG. 28 shows corners of two images which correspond to each other, the corners identified using a Harris Corners Detector.
Figure 29:
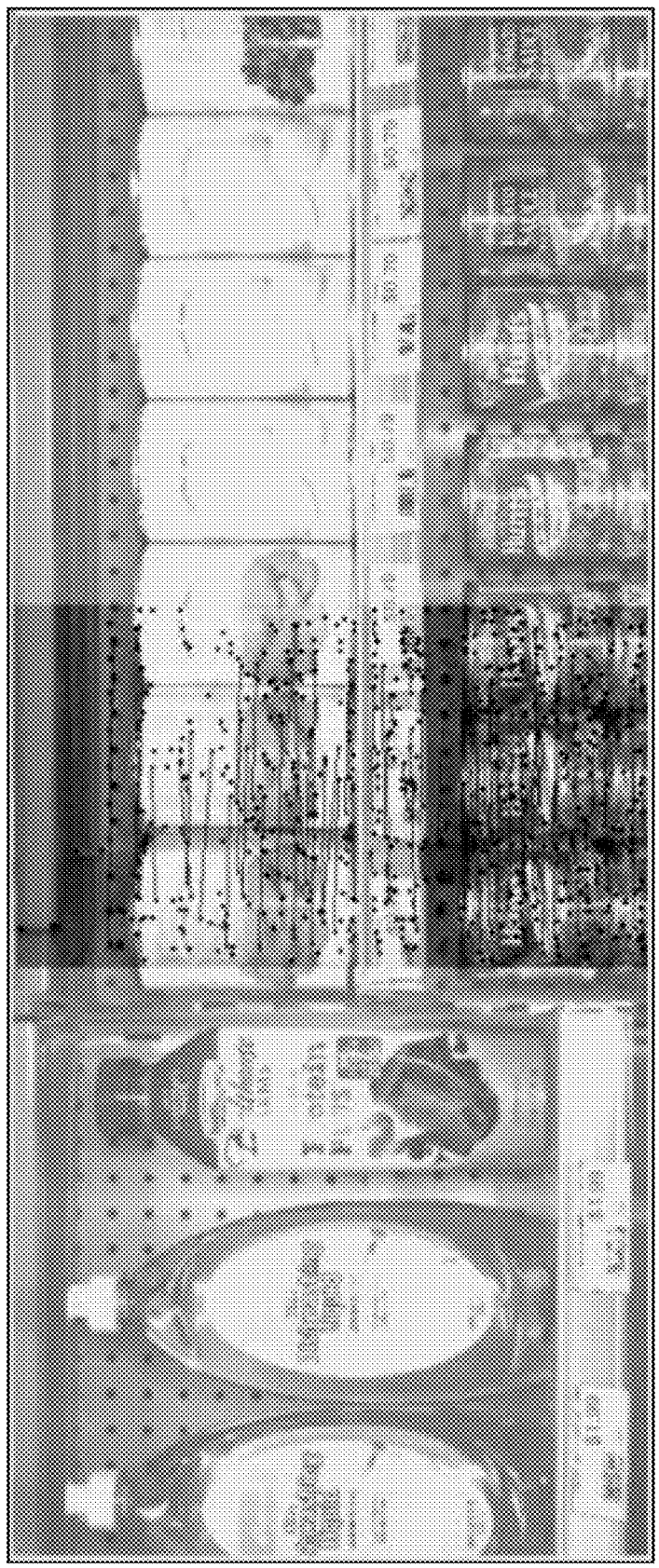
FIG. 29 shows the alignment of the two images shown in FIG. 28 using Harris Corners Alignment.
Figure 30:
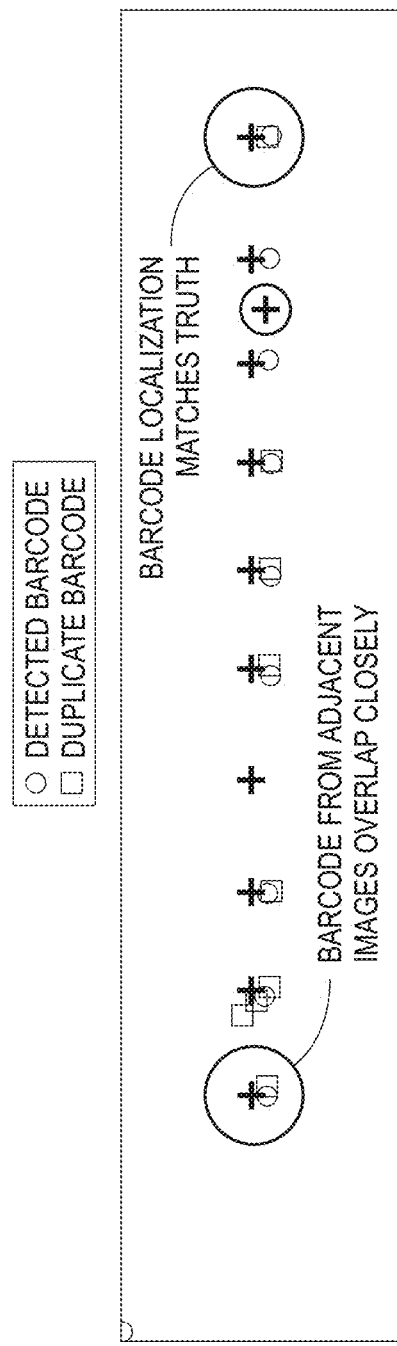
FIG. 30 shows the results for the Harris Corners correction applied to the two images shown in FIG. 28.

The second technique and associated algorithm uses a Harris Corners Detector function to identify points of interest, i.e., corners, in the right-most side of the left image, and in the left-most side of the right image. Then, the algorithm identifies which detected corners in both images correspond to each other, as shown in FIG. 28. This is done using a neighborhood comparison algorithm. This is made more efficient because it is known that the shift is mostly horizontal, therefore, corners that are separated by a significant vertical distance do not need to be compared. Horizontal separations are then histogrammed to determine the most frequent separation and define that as the correction to the distance between the images. According to an exemplary embodiment, 512×512 is used as the low res image size for this technique as corners appear to be lost at 256×256 (which is the image size used in the image correlation method discussed above). FIG. 30 shows the results for Harris Corners correction associated with the aligned images shown in FIG. 29—nearly identical to the correlation result.

While a Harris Corners detector is described herein, other feature detectors are also within the scope of this disclosure, including, but not limited to, SIFT, SURF, etc.

Both the image correlation and the Harris Corners techniques work very well. It is expected that Harris Corners will do slightly better in the presence of shelf noise.

Accurate positional understanding is an enabler for the data analytics applied to barcode data as well as gap identification from LIDAR measures. The robot simply has to know where it is for any collected data to make sense. These techniques seem to provide the positional accuracy required, thus enabling the value proposition of the analytics. Use of these disclosed techniques also enables the reduction of the system cost.

Optional Offline Data Processing and Profile Generation Module

The Optional Offline Data Processing and Profile Generation Module provides the ability to pass all or a selected set of the acquired data (e.g., images with location information, or product data and location information), to an offline computing resource to generate the store profiles and perform further analysis.

Start/Stop Vs Continuous Motion Imaging and Impacts on Vision System, Mission Time and Recognition Rates:

Previous internal embodiments of a prototype system used start/stop motion and image capture was done while the system was stationary. Mitigating glare issues was accomplished by capturing redundant images with illumination on and off successively in the same location and pose. The previous approach reduced special requirements for the imaging system in order to take sharp, in-focus images with the required >=200 ppi resolution at the object plane in order to achieve acceptable barcode recognition rates, however the mission time to complete a typical store scan with this approach was considered prohibitive (e.g. at ~10 sec every foot of scan path). In order to significantly reduce mission time by a factor of 5×, the shelf Imaging System described herein was further developed to take high resolution images with imagers while under continuous motion at a minimum of 60 mm/s in the scan direction. This required combination of much faster shutter speeds, onboard illumination, optimized optical set points for minimizing the number of cameras, maximizing depth of field latitude and recognition rates, and parallel imager micro-control and image download to achieve the mission time and desired recognition rates for the solution with relatively lower cost components. In addition, by combining the optimum level of illumination with different orientations of the imagers relative to a specific object (e.g. label) over successive images, glare mitigation performance was improved compared with the previous on/off illumination mode used at the same position on successive images, resulting in improved bar code recognition rates.

Multi-Resolution Imaging System to Enable Multiple Mission Modes and Rates:

As described above with reference to FIGS. 1-15, a multi-resolution system is provided as was disclosed in U.S. Patent Publication No. 2015/0363758, by Wu et al., published Dec. 17, 2015, and entitled "STORE SHELF IMAGING SYSTEM", which used a low resolution imaging system to find regions of interest as input to guide a high resolution imaging system for object detection, according to an exemplary embodiment. According to another exemplary embodiment described herein with references to FIGS. 16-30, the multi-resolution imaging system includes a high resolution imaging column with resolutions at the object plane of >=200 ppi for object detection with barcode read and other potential image-readable information (e.g., text) and a lower resolution full field of view webcam with resolution at the object plane of >=20 dpi (<<200 ppi) for product facing detection and future object classification where barcode read and recognition is not required/used.

This has the advantage of separating and optimizing the image handling & analysis process for the high resolution versus low resolution image analyses to maximize throughput and efficiency for when all analytics modes are run during the same mission. The lower resolution imager also enables the system option to run a lower resolution-only mission mode at a faster rate/speed of scan to further reduce mission time for a lower resolution-only mode. A full field of view imager module has the additional advantage of eliminating the need to stitch images together to conduct planogram-level image analysis for product facing detection or other object classification analysis, thus avoiding the extra computation time and resources required to stitch images and image quality errors in the stitched images due to robot positional errors.

Other attributes associated with the Multi-Resolution Imaging System include barcode recognition capability achieved without a priori knowledge of location of tags (full column coverage) to provide scan coverage for a wide variety of fixture types including common shelves and pegboard displays of various depths; barcode recognition with low cost components and no additional actuation controls required for the imagers (consumer-grade imagers, no pan-tilt-zoom actuation, robust to expected robotic positioning errors; and barcode recognition and lower image capture and file download duty cycle time achieved under continuous motion of >=60 mm/s which enables meeting service mission time requirements and mitigates optical glare failure modes. The addition of parallel imager microcontrollers to support continuous motion also provides the option to parallelize and perform some or all of the image analysis and processing on board the system. A separate low resolution imaging system with single, full field of view (e.g., wide-angle) imager eliminates the computation resources and IQ errors associated with stitching images together to generate a planogram image for analysis; and provides the option of running a low-res only mission at a faster speed which aligns with expected faster rate of change of the analysis content. In other words, a user of the system can potentially run a low-res mission more frequently due to shorter mission times.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A store profile generation system comprising:
a robotic mobile base including an operatively associated primary navigation component configured to determine a location of the robotic mobile base within a retail environment, the retail environment including a plurality of product display units arranged in a plurality of aisles, each product display unit including a plurality of product display fixtures, a plurality of products arranged on one or more of the product display fixtures, and a plurality of tags attached to the product display fixtures, each tag including product-related data including a barcode associated with a respective product proximately located on the product display fixture near the tag;
a high resolution (HR) digital image capture assembly mounted on the robotic mobile base, the HR digital image capture assembly including a plurality of high resolution (HR) digital image capture devices configured at a first resolution and a first field of view (FOV) to acquire HR digital images of the product display units;
a low resolution (LR) digital image capture device configured at a second resolution and a second FOV to acquire LR digital images of the product display units, the second resolution less than the first resolution associated with the HR digital image capture devices and the second FOV horizontally wider and vertically higher than the first FOV associated with the HR digital image capture devices; and
a master control unit operatively associated with the robotic mobile base, the plurality of HR digital image capture devices; and the LR digital image capture device, the master control unit including an operatively associated memory configured to store instructions and an operatively associated processer configured to execute the instructions, the master control unit instructions configured to process the acquired HR digital images from the plurality of HR digital image capture devices and the acquired LR digital images from the LR digital image capture device at one or more sequential locations of the robotic mobile base along one or more of the plurality of aisles, the process using the acquired HR digital images to identify the barcodes associated with the plurality of tags and generate a store profile indicating locations of the plurality of tags and their respective products in the retail environment, and the process using the acquired LR digital image to generate a full planogram image of the product display units, the full planogram image including a display facing profile indicating the presence or non-presence of the plurality of products and their respective locations in the retail environment,
wherein the master control unit is configured to perform image-based accuracy corrections of a location of the robotic mobile base reported by the primary navigation component operatively associated with the robotic mobile base, and wherein the image-based accuracy correction includes processing two sequentially acquired digital images of a product display unit which include an overlapping portion and a non-overlapping portion, and determining a shift distance associated with aligning the overlapping portions of the two sequentially acquired digital images, the shift distance applied to the location of the robotic mobile base reported by the primary navigation component operatively associated with the robotic mobile base to generate a corrected location of the robotic mobile base.

2. The store profile generation system according to claim 1, wherein the robotic mobile base, HR digital image capture assembly, LR digital image capture assembly and master control unit operate in one or both of a continuous movement mode and a stop/go movement mode.

3. The store profile generation system according to claim 1, wherein the product display fixtures includes one or more of shelving and pegboards.

4. The store profile generation system according to claim 1, wherein the master control unit instructions are configured to acquire the HR digital images at a first sequence of locations with the robotic mobile base traveling at a first speed and acquire the LR digital image at a second sequence of locations with the robotic mobile base traveling at a second speed, the second speed greater than the first speed.

5. The store profile generation system according to claim 1, wherein the master control unit instructions are configured to use a spatial characterization of one or both of the plurality of HR digital image capture devices and the LR digital image capture device to generate the locations of the plurality of tags and their respective products, the spatial characterization mapping locations of pixels associated with acquired HR digital images and/or acquired LR digital images to locations in a real space.

6. The store profile generation system according to claim 1, wherein the master control unit generates an order for a set of replacement tags based on the generated store profile.

7. The store profile generation system according to claim 1, wherein the image-based accuracy correction performs one or more of a cross correlation function between the two sequentially acquired digital images to calculate the shift distance and a Harris Corners Detector function to identify a most frequent shift distance associated with the two sequentially acquired digital images.

8. The store profile generation system according to claim 1, further comprising:
a plurality of distributed controllers, each of the distributed controllers operatively associated with one of the plurality of HR digital image capture devices and operatively associated with the master control unit, the distributed controllers configured to operate in parallel and independently drive a respective digital image capture device, store acquired digital images of the product display units, and communicate the stored acquired digital images of the product display units to the master control unit.

9. The store profile generation system according to claim 1, further comprising:
one or more lamps attached to the robotic mobile base and configured to illuminate the product display units.

10. The store profile generation system according to claim 1, wherein the system is configured to control a focal distance and illumination associated with one or more of the plurality of HR digital image capture devices and the LR digital image capture device.

11. The store profile generation system according to claim 1, wherein the first resolutions associated with the plurality of HR digital image capture devices is 200 ppi (pixels per inch) or greater, and the second resolution associated with the LR digital image capture device is less than 200 ppi and equal to or greater than 20 ppi.

12. The store profile generation system according to claim 1, wherein the primary navigation component is configured to provide the location of the robotic mobile base with a positional error substantially equal to or greater than +/−40 mm and a secondary navigation component is configured to generate the image-based corrected location of the robotic mobile base with a positional error less than +1-40 mm.

13. A store profile generation method performed with the store profile generation system of claim 1, the method comprising:
moving the robotic mobile base around the retail environment;
the digital image capture assembly acquiring digital images of the product display units at a sequence of locations of the robotic mobile base; and
a plurality of distributed controllers, each of the distributed controllers operatively associated with one of the plurality of digital image capture devices and operatively associated with the master control unit, the distributed controllers configured to operate in parallel and independently drive a respective digital image capture device, store acquired digital images of the product display units, and communicate the stored acquired digital images of the product display units to the master control unit.

14. A store profile generation system comprising:
a robotic mobile base including an operatively associated primary navigation component configured to determine a location of the robotic mobile base within a retail environment, the retail environment including a plurality of product display units arranged in a plurality of aisles, each product display unit including a plurality of product display fixtures, a plurality of products arranged on the product display fixtures and a plurality of tags attached to the product display fixtures, each tag including product related data including a barcode associated with a respective product proximately located on the product display fixture near the tag;
a digital image capture assembly mounted on the robotic mobile base, the digital image capture assembly including a plurality of digital image capture devices vertically arranged to acquire digital images of the product display fixture and cover an entire vertical height of the product display fixture;
a plurality of distributed controllers, each of the distributed controllers operatively associated with one of the plurality of digital image capture devices and operatively associated with a master control unit, the distributed controllers configured to operate in parallel and independently drive a respective digital image capture device, store acquired digital images of the product display units, and communicate the stored acquired digital images of the product display units to the master control unit;
a secondary navigation component, the secondary navigation component configured to perform an image-based accuracy correction of a location of the robotic mobile base along an aisle of the retail environment reported by the primary navigation component operatively associated with the robotic mobile base, the image-based accuracy corrections including processing sequentially acquired digital images of a product display unit which includes an overlapping portion and a non-overlapping portion, and determining a shift distance associated with aligning the overlapping portions of the two sequentially acquired images, the shift distance applied to the robotic mobile base location reported by the primary navigation component operatively associated with the robotic mobile base to generate a corrected location of the robotic mobile base.

15. The store profile generation system according to claim 14, wherein the image-based accuracy correction performs one or more of a cross correlation function between two sequentially acquired digital images to determine the shift distance and a Harris Corners Detector function to identify a most frequent shift distance associated with the two sequentially acquired digital images.

16. The store profile generation system according to claim 14, wherein the master control unit instructions are configured to use a spatial characterization of the plurality of digital image capture device to generate the locations of the plurality of tags and their respective products, the spatial characterization mapping locations of pixels associated with the acquired digital images to locations in a real space.

17. A store profile generation system comprising:
a robotic mobile base including an operatively associated primary navigation component configured to determine a location of the robotic mobile base within a retail environment, the retail environment including a plurality of product display units arranged in a plurality of aisles, each product display unit including a plurality of product display fixtures, a plurality of products arranged on one or more of the product display fixtures, and a plurality of tags attached to the product display fixtures, each tag including product related data including a barcode associated with a respective product proximately located on the product display fixture near the tag;
a high resolution (HR) digital image capture assembly mounted on the robotic mobile base, the HR digital image capture assembly including a plurality of high resolution (HR) digital image capture devices configured at a first resolution and a first field of view (FOV) to acquire HR digital images at the product display units;
a low resolution (LR) digital image capture device configured at a second resolution and a second FOV to acquire LR digital images of the product display units, the second resolution less than the first resolution associated with the HR digital image capture devices and the second FOV horizontally wider and vertically higher than the first FOV associated with the HR digital image capture devices; and
a master control unit operatively associated with the robotic mobile base, the plurality of HR digital image capture devices; and the LR digital image capture device, the master control unit including an operatively associated memory configured to store instructions and an operatively associated processer configured to execute the instructions, the master control unit instructions configured to process the acquired HR digital images from the plurality of HR digital image capture devices and the acquired LR digital image from the LR digital image capture device at one or more sequential locations of the robotic mobile base along one or more of the plurality of aisles, the process using the acquired HR digital images to identify the barcodes associated with the plurality of tags and generate a store profile indicating locations of the plurality of tags and their respective products in the retail environment, and the process using the acquired digital LR image to generate a full planogram image of the product display units, the full planogram image including a display facing profile indicating the presence or non-presence of the plurality of products and their respective locations in the retail environment,
wherein the product display units include one or more of shelving and pegboards,
wherein a secondary navigation component performs an image-based accuracy correction including processing two sequentially acquired images of a product display unit which include an overlapping portion and a non-overlapping portion, and determining a shift distance associated with aligning the overlapping portions of the two sequentially acquired digital images, the shift distance applied to the location of the robotic mobile base reported by the primary navigation component operatively associated with the robotic mobile base to generate a corrected location of the robotic mobile base, and
wherein the image-based accuracy correction performs one or more of a cross correlation function between the two sequentially acquired digital images and a Harris Corners Detector function to identify a most frequent shift distance associated with the two sequentially acquired digital images.

* * * * *